US007711689B2

(12) United States Patent
Kim

(10) Patent No.: US 7,711,689 B2
(45) Date of Patent: May 4, 2010

(54) METHODS AND APPARATUS FOR STORING, ORGANIZING, SHARING AND RATING MULTIMEDIA OBJECTS AND DOCUMENTS

(75) Inventor: Hong Suk Kim, Sunnyvale, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 195 days.

(21) Appl. No.: 11/521,116

(22) Filed: Sep. 13, 2006

(65) Prior Publication Data

US 2007/0011042 A1 Jan. 11, 2007

Related U.S. Application Data

(63) Continuation-in-part of application No. 10/346,552, filed on Jan. 17, 2003, now abandoned.

(51) Int. Cl.
*G06F 17/00* (2006.01)
(52) U.S. Cl. .................. 707/101; 707/103 R; 707/200; 715/853
(58) Field of Classification Search .................. 707/1, 707/100, 101, 103 R, 200; 709/220, 223, 709/252
See application file for complete search history.

(56) References Cited

U.S. PATENT DOCUMENTS 6,970,860 B1 * 11/2005 Liu et al. ..................... 707/3
2002/0091736 A1 * 7/2002 Wall ........................... 707/513

FOREIGN PATENT DOCUMENTS

WO  WO03/065251 A1 * 8/2003

OTHER PUBLICATIONS

Jin et al., Owl: A New Multimedia Data Splitting Scheme for Cluster Video Server, 2002, Computer Society, pp. 1-8.*
Pfeifer et al., Computation and Classical Artificial Intelligence, 2002, University of Zurich, pp. 1-5.*
Ruppel et al., Using a Semantic Network for Multimedia Objects to create HTML-based Virtual Tours, Univ. Of Munster, Germany, pp. 1-6.*
Candan et al., Collaborative Multimedia Systems: Synthesis of Media Objects, 1998, IEEE, pp. 433-457.*
Yong et al., Content-based Semantic Associative Video Model, 2002 IEEE, pp. 727-730.*

* cited by examiner

*Primary Examiner*—Fred I Ehichioya
(74) *Attorney, Agent, or Firm*—Crawford Maunu PLLC

(57) ABSTRACT

The present invention provides electronic methods and apparatus for storing and organizing access to restricted multimedia objects. This is accomplished using semantic networks by interactively defining a semantic network, identifying a relationship between nodes by associating a label with each semantic link, attaching multimedia objects to nodes and restricting user access to multimedia objects and/or the semantic network. The method allows users to access and edit the semantic network in a Java- or AJAX-based platform-independent software environment. The present invention further provides a method for rating semantic networks by allowing viewers to provide feedback regarding a semantic network's value or usefulness and then calculating a rating in accordance with the received feedback. The present invention further provides a method for linking semantic networks to build a knowledge base.

20 Claims, 50 Drawing Sheets

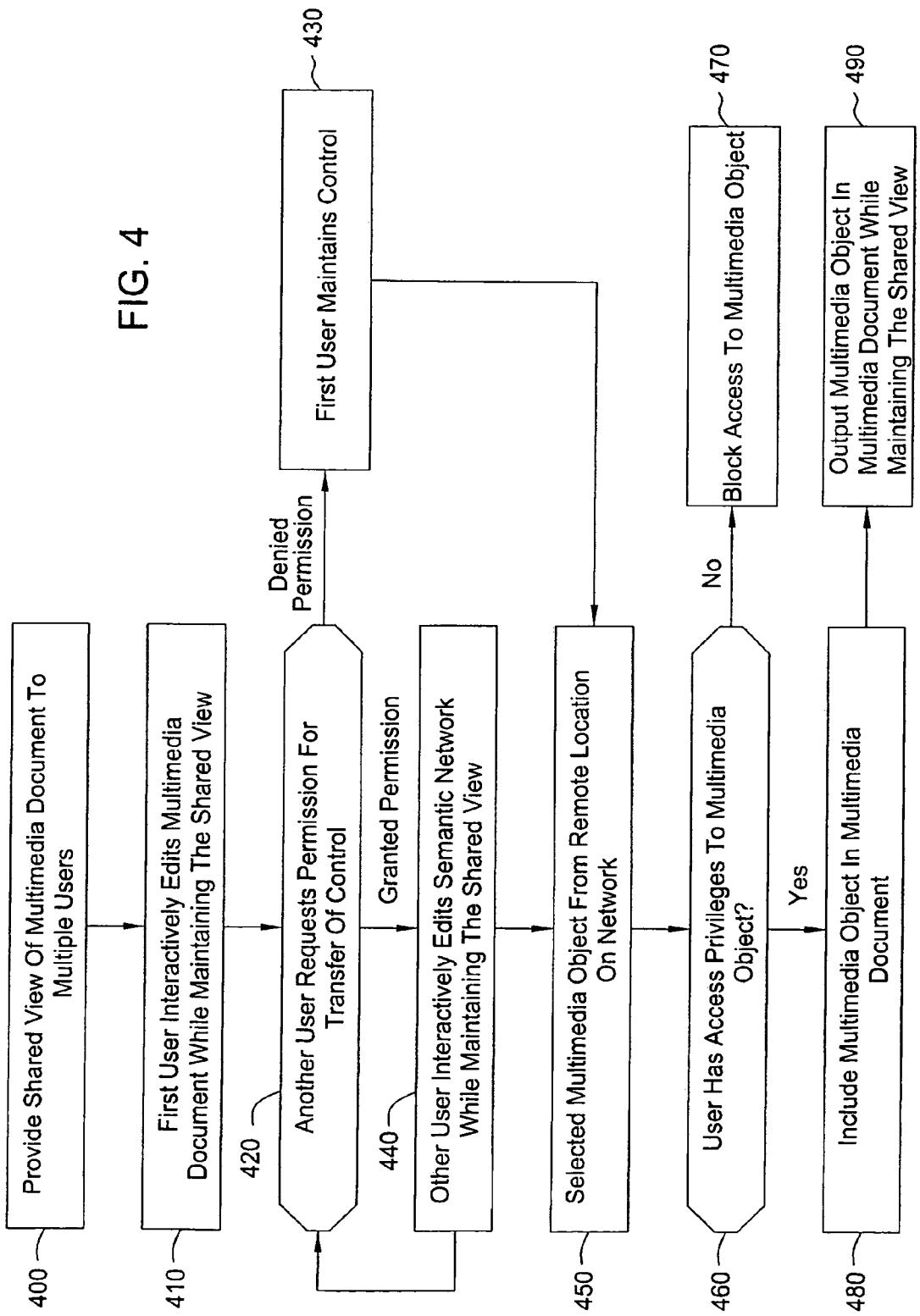

METHODS AND APPARATUS FOR STORING, ORGANIZING, SHARING AND RATING MULTIMEDIA OBJECTS AND DOCUMENTS

CROSS REFERENCE TO RELATED APPLICATIONS

This application is a continuation in part of U.S. patent application Ser. No. 10/346,552, filed Jan. 17, 2003, now abandoned, which is herein incorporated by reference in its entirety.

FIELD OF INVENTION

This invention relates to electronic methods and systems for storing, organizing, sharing and rating multimedia objects and documents, and in particular to methods and systems using semantic networks.

REFERENCE TO APPENDIX

An appendix listing source code for a reference embodiment was filed in the parent application Ser. No. 10/346,552 filed Jan. 17, 2003 and is fully incorporated herein as part of the specification. The appendix includes material subject to copyright protection. The copyright owner does not object to the facsimile reproduction of the appendix, as it appears in the Patent and Trademark Office patent file or records, but otherwise reserves all copyright rights.

BACKGROUND

Conventionally, users have been required to organize multimedia materials, such as image files, video clips, audio clips, and source documents, using tree-like directories with folders (e.g., Microsoft Windows). Nevertheless, recent research has revealed the power of using more flexible, non-hierarchical graphs or networks to organize materials, such as a concept map or semantic network. See, e.g., U.S. Pat. No. 5,506,937, "Concept Mapbased Multimedia Computer System for Facilitating User Understanding of a Domain of Knowledge," University of West Florida (the "'937 patent").

However, existing non-hierarchical systems, such as the system described in the '937 patent, have not adequately addressed the dimension of multiple-user, network-based collaborative authoring and viewing. For example, the '937 patent fails to provide simultaneous multi-user viewing and editing, restricted-access user privileges, and shared network libraries and resources. Moreover, it is desirable that such capabilities are provided in a light-weight, platform-independent software environment while incorporating an intuitive, informative, and well-integrated user interface.

SUMMARY OF THE INVENTION

Briefly, the present invention provides electronic methods and apparatus for storing and organizing access to restricted multimedia objects. This is accomplished using semantic networks by interactively defining a semantic network, identifying a relationship between nodes by associating a label with each semantic link, attaching multimedia objects to nodes and restricting user access to multimedia objects and/or the semantic network. In one aspect of the invention, pointer flags are included in semantic links to define hierarchical relationships. In a further aspect of the invention, an indication of the number and file type of multimedia objects attached to each node is provided.

The method preferably includes storing the semantic network in a relational database at a remote location on a network, allowing multiple users access to multimedia objects and the semantic network. The method allows users to access and edit the semantic network in a Java-based platform-independent software environment. In another aspect of the invention, the semantic network can be stored as a read-only snapshot image, such as a JPEG file or an interactive document, such as one published on a network and accessible via a Uniform Resource Locater.

The present invention further provides a method for multiple users to collaboratively store and organize multimedia objects by providing a shared view via a network while defining the semantic network, identifying the relationship between nodes, and attaching multimedia objects to nodes. The method permits a first user to interactively edit the semantic network, transfer control to a second user and allow the second user to edit the semantic network while maintaining the shared view. In a further aspect of the invention, the method comprises outputting multimedia objects, including displaying images and playing sound, while maintaining a shared view.

The present invention further provides a method for collaborative platform-independent authoring of multimedia documents, allowing a first user to edit a multimedia document, providing the first and a second user a shared view of the document via a network, permitting the first user to transfer control of the document to the second user, and allowing the second user to edit the document while maintain the shared view. The method also allows the ability to output multimedia objects while maintaining the shared view. These tasks are performed in a platform-independent Java-based software environment. The method further comprises restricting access to the multimedia document and multimedia objects based on a set of access privileges. In one aspect of the invention, multimedia documents and multimedia objects are stored at a remote location on a network. A further aspect comprises outputting the multimedia document as a read-only snapshot image, stored in a JPEG file or an interactive document.

The present invention further provides a method of rating multimedia documents by allowing viewers to provide feedback regarding a semantic network's value or usefulness and then calculating a rating in accordance with the received feedback.

The present invention further provides a method for linking semantic networks to build a knowledge base.

BRIEF DESCRIPTION OF THE DRAWINGS

FIG. 4 is a flow diagram illustrating a method for collaboratively authoring multimedia documents in a platform-independent software environment in accordance with a preferred embodiment of the present invention.

DETAILED DESCRIPTION OF PREFERRED EMBODIMENT

Preferred embodiments of the present invention will now be described in detail, with reference to the drawings.

A. Authoring

Figure 1:
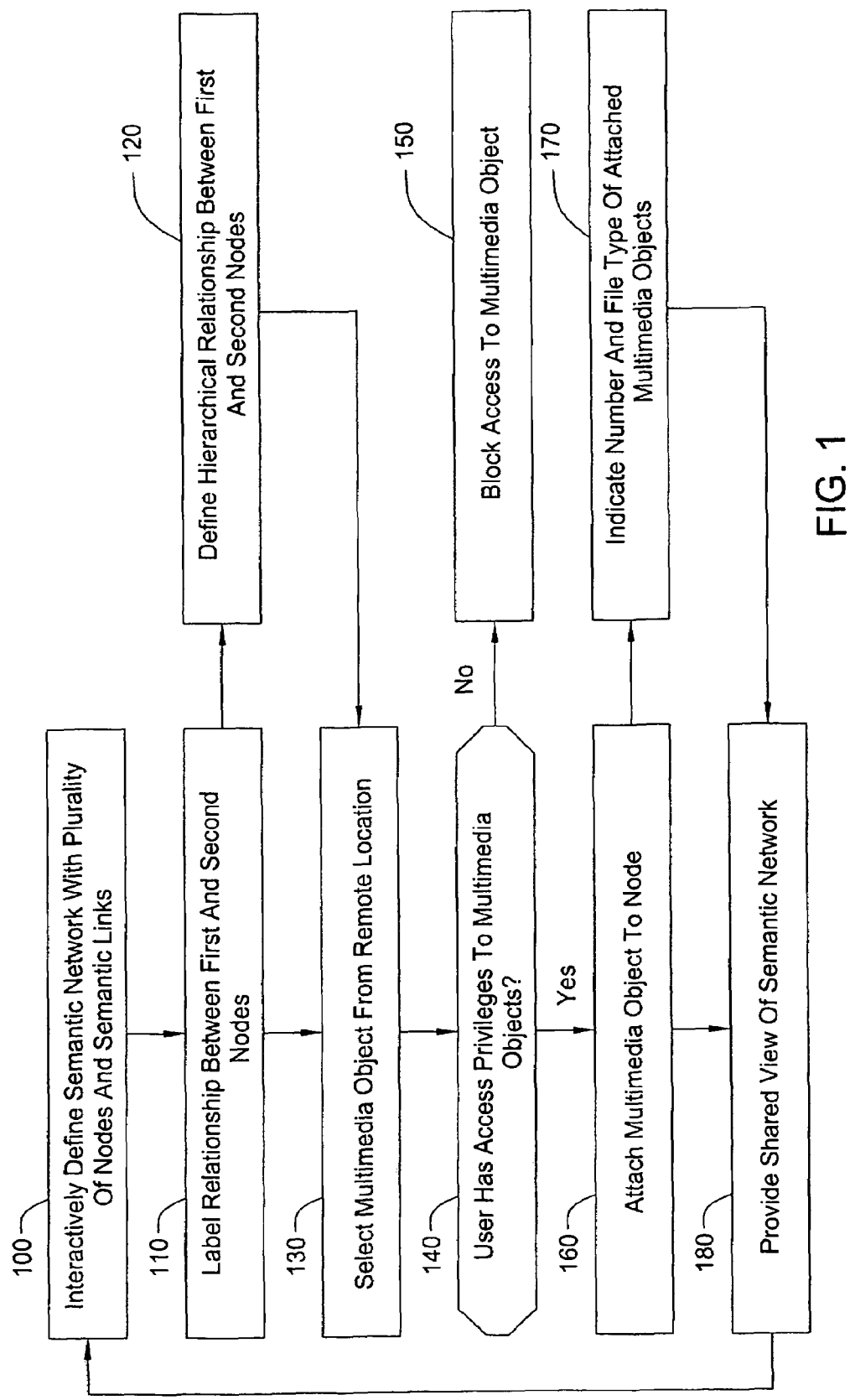
FIG. 1 is a flow diagram illustrating a method for organizing access to restricted multimedia objects using a semantic network, in accordance with a preferred embodiment of the present invention.

FIG. 1 is a flow diagram illustrating a method for organizing access restricted multimedia objects using a semantic network in accordance with a preferred embodiment of the present invention. Broadly, the authoring process consists of: 1) interactively creating a semantic network made up of a plurality of nodes; 2) connecting the nodes with semantic links which have various connection properties; and 3) attaching non-restricted multimedia objects to the nodes; wherein, all the foregoing tasks are performed while providing a shared view of the semantic network in a Java-based platform-independent software environment.

1. Node Creation and Manipulation

Figure 5A:
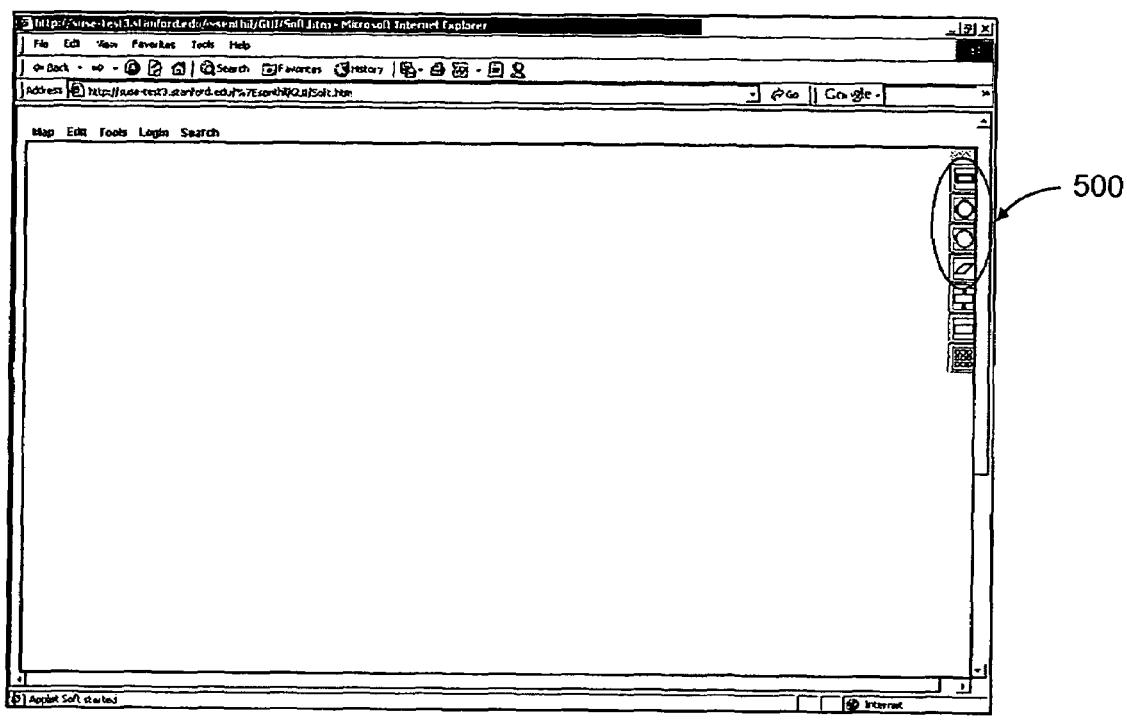
FIG. 5A illustrates rectangle, hexagon, circle, and parallelogram node icons.
Figure 5B:
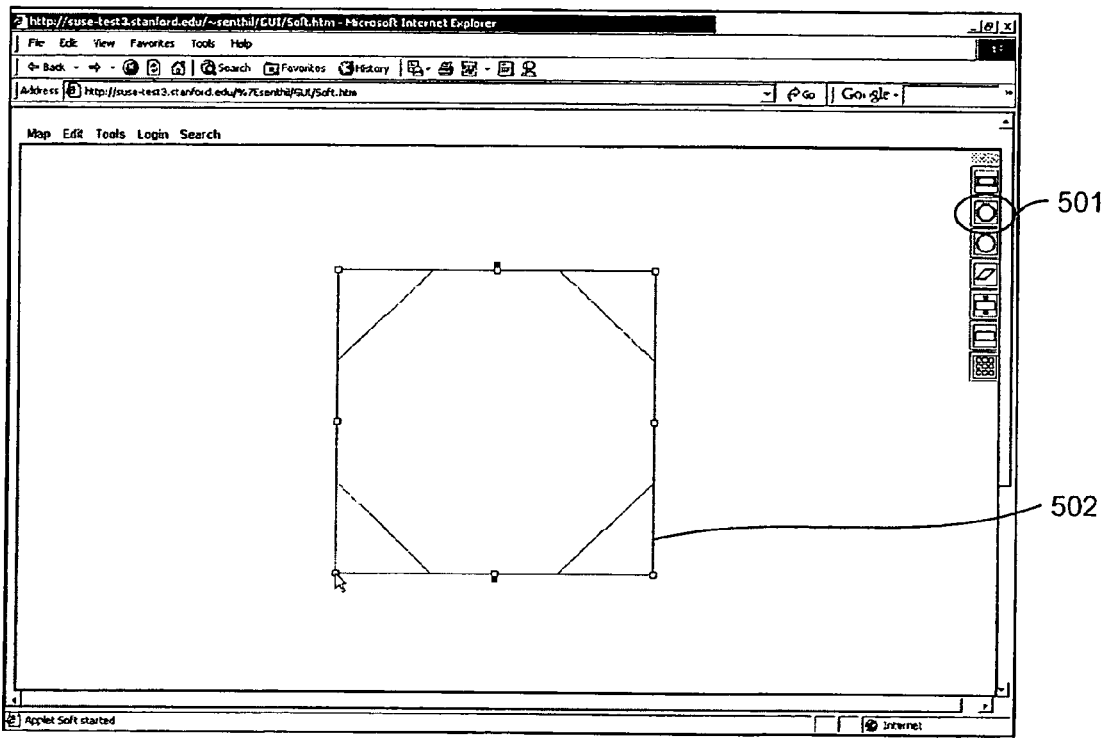
FIG. 5B illustrates creating a hexagon-shaped node.

At 100, a user interactively defines a semantic network by creating a plurality of nodes and connections between those nodes called semantic links. As illustrated in FIGS. 5A-5L, the user has several options about how to create and manipulate the nodes. Nodes are generic repositories of information. They can contain all types of information: text, images, files, and even URLs. As such, nodes are used to store and group different pieces of information together. FIG. 5A illustrates an embodiment of the invention that supports four types of nodes: rectangles, hexagons, circles, and parallelograms. All four types of nodes share the same functionality and can contain the same types of information. They are simply different visual representations of the same concept. A specific type of node can be created, by clicking on the desired node icon circled at 500 in FIG. 5A and then dragging the associated shape onto the semantic network. For example, by clicking on hexagonal node icon 501 in FIG. 5B and dragging the shape onto the semantic network, a user creates a hexagonal node, as illustrated at 502 in FIG. 5B.

Once a node is created, a user can manipulate the node in several ways in the preferred embodiment including changing color, adding text, and resizing and repositioning the node. By right-clicking on node 503 in FIG. 5C, a separate properties window will appear at 504.

(a) Changing Color

Figure 5C:
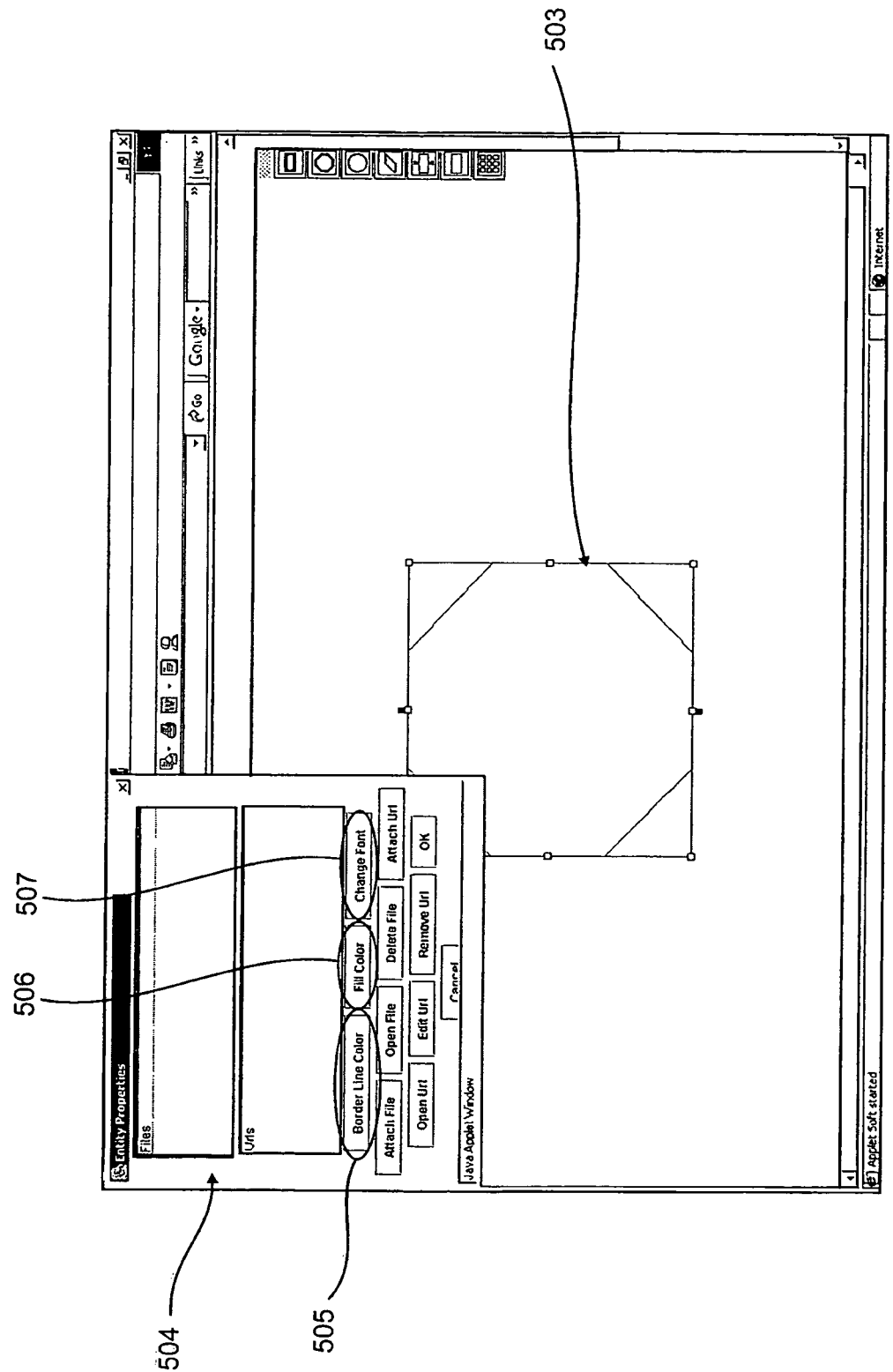
FIG. 5C illustrates a node properties window.
Figure 5D:
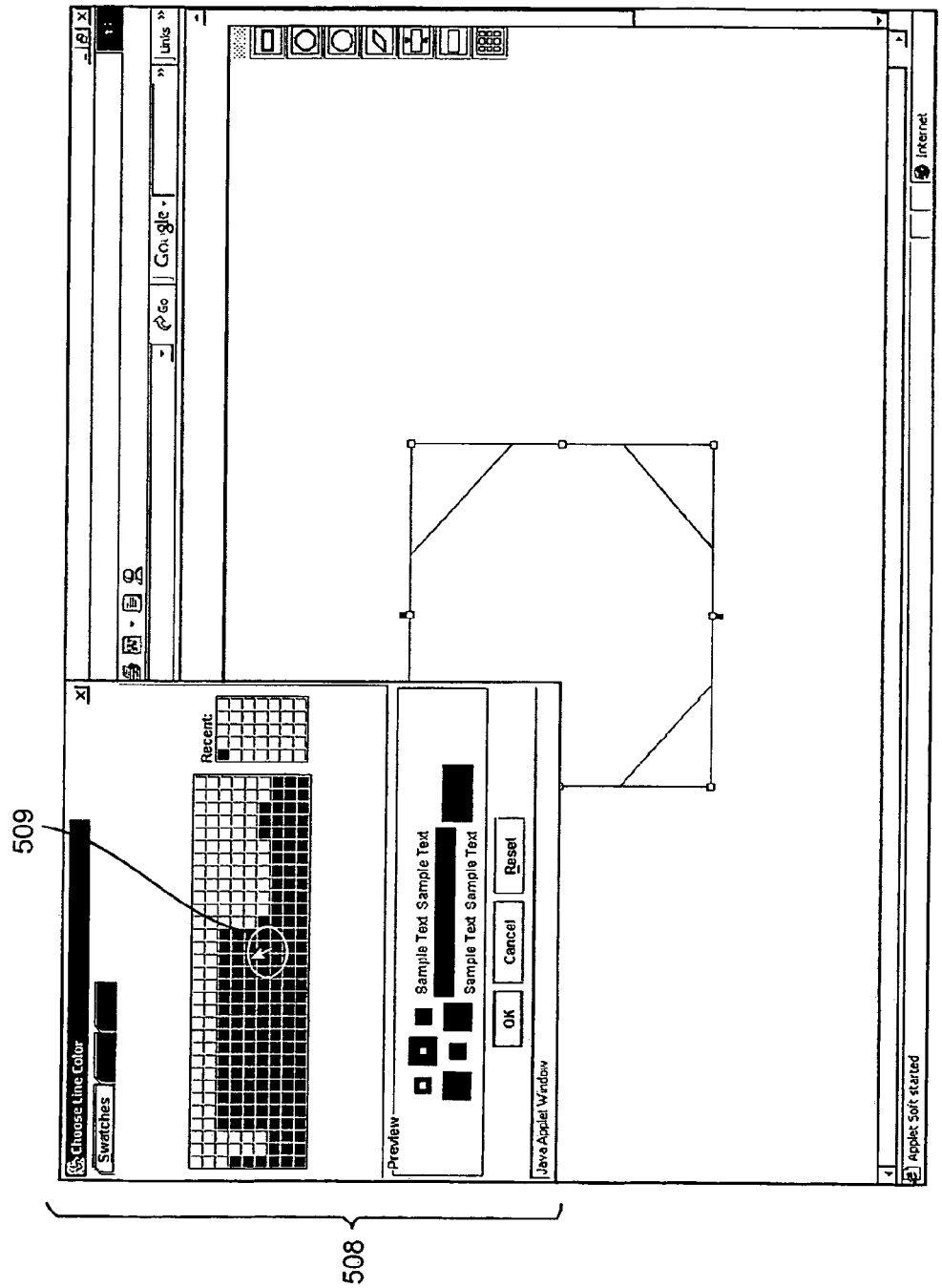
FIG. 5D illustrates selecting a color from the palette.

A user can change the border line color of the node by clicking on "Border Line Color" button 505 in properties window 504, as illustrated in FIG. 5C. This will bring up a separate color palette window, as illustrated at 508 in FIG. 5D, and the user can choose the desired color for the border line by moving cursor 509 to and clicking on the desired color. After the color is selected from general palette 508, the HSB and RGB mixture can then be fine-tuned and manipulated to produce the exact color desired. To adjust the HSB mixture, the user can click on HSB tab 510 in FIG. 5E which brings up the HSB control window at 511. Then the user can either move cursor 512 to and click on the desired HSB level or adjust the HSB level by adjusting the numbers in the boxes at 513. To adjust the RGB mixture, the user can click on RGB tab 514 in FIG. 5F which brings up the RGB control window at 515. Then the user can either use cursor 516 to adjust the sliding scale of the desired color at 517 or adjust the RGB levels by adjusting the numbers in the boxes at 518.

Figure 5E:
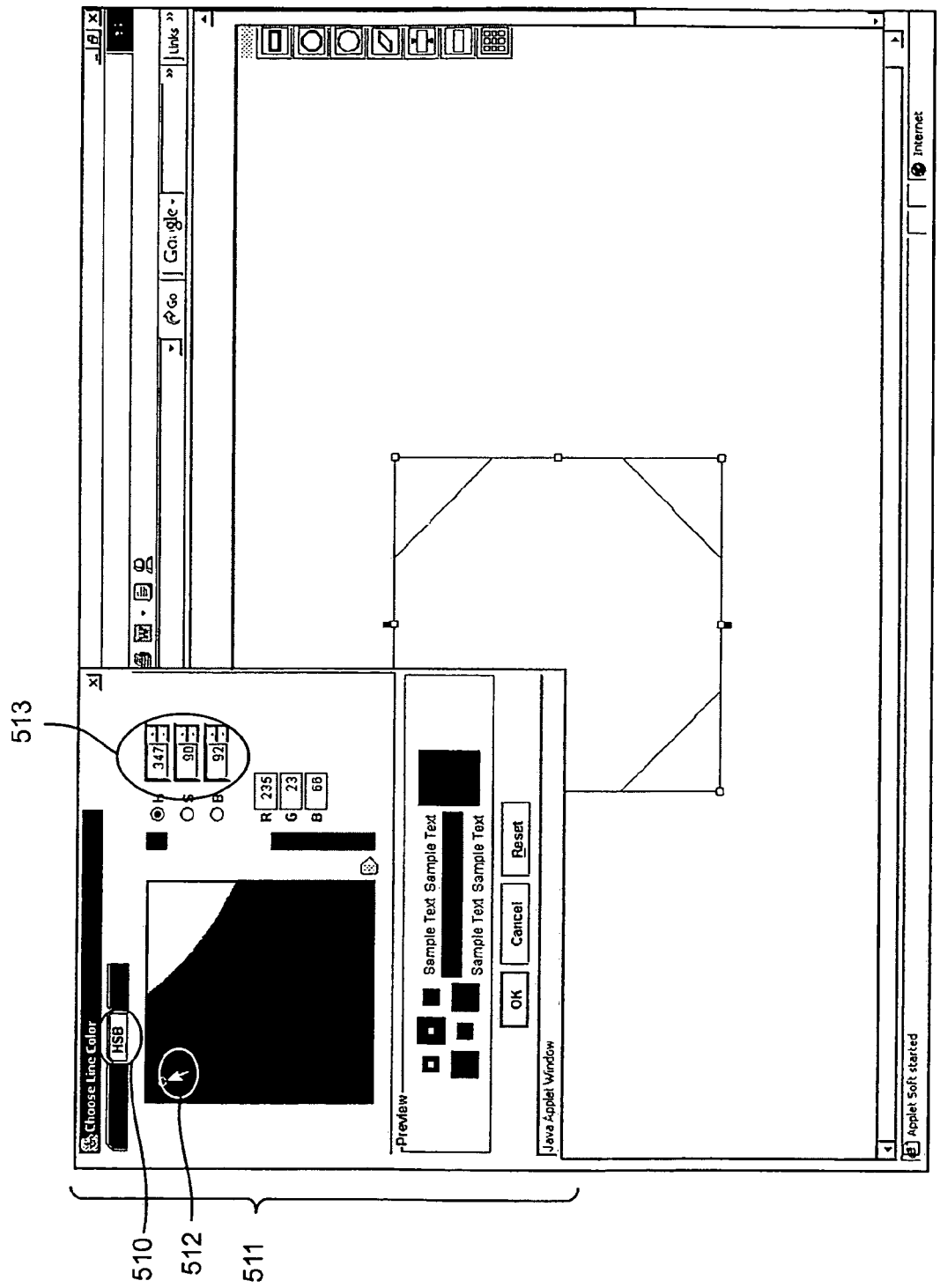
FIG. 5E illustrates changing the HSB color mixture.
Figure 5F:
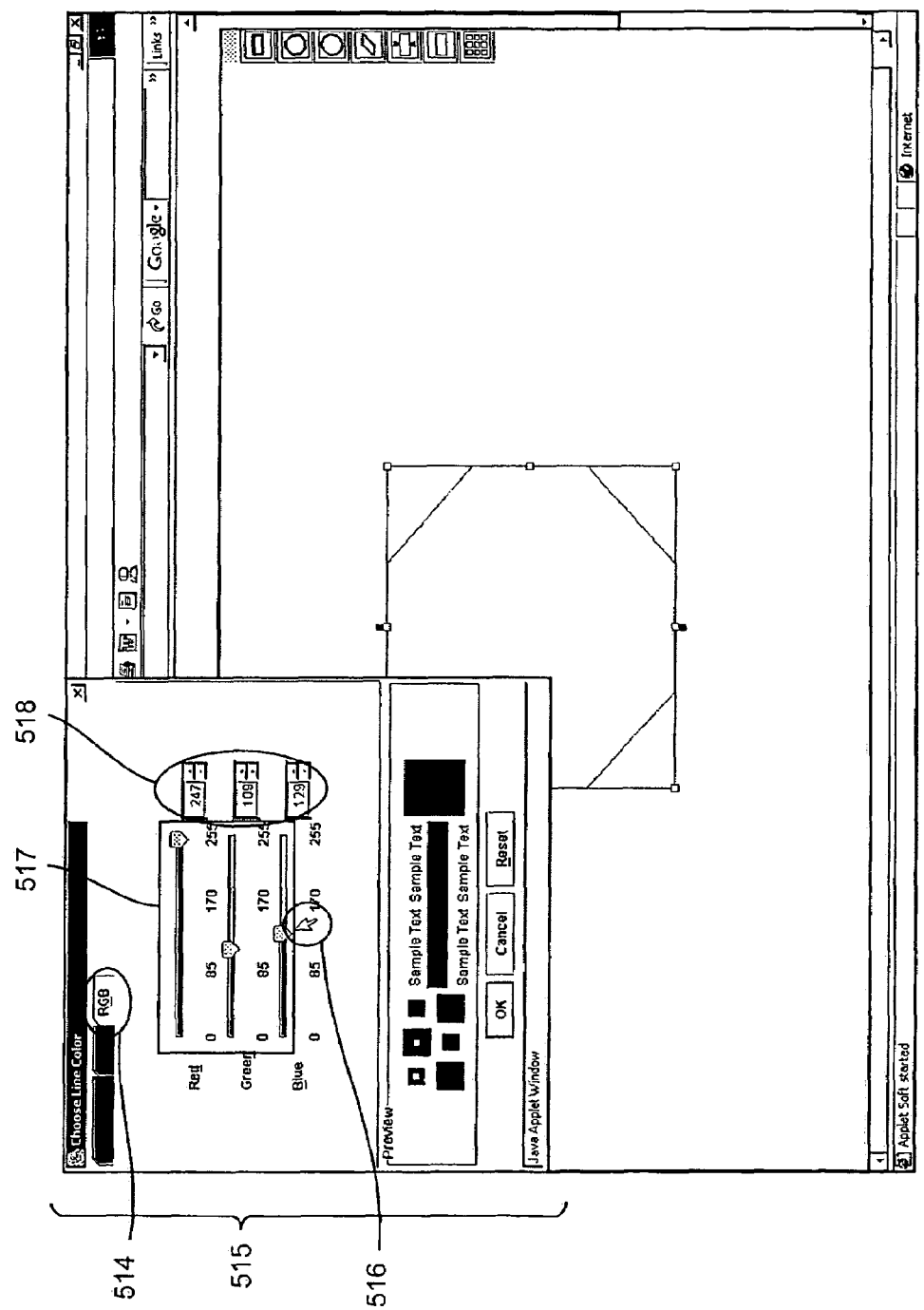
FIG. 5F illustrates changing the RGB color mixture.
Figure 5G:
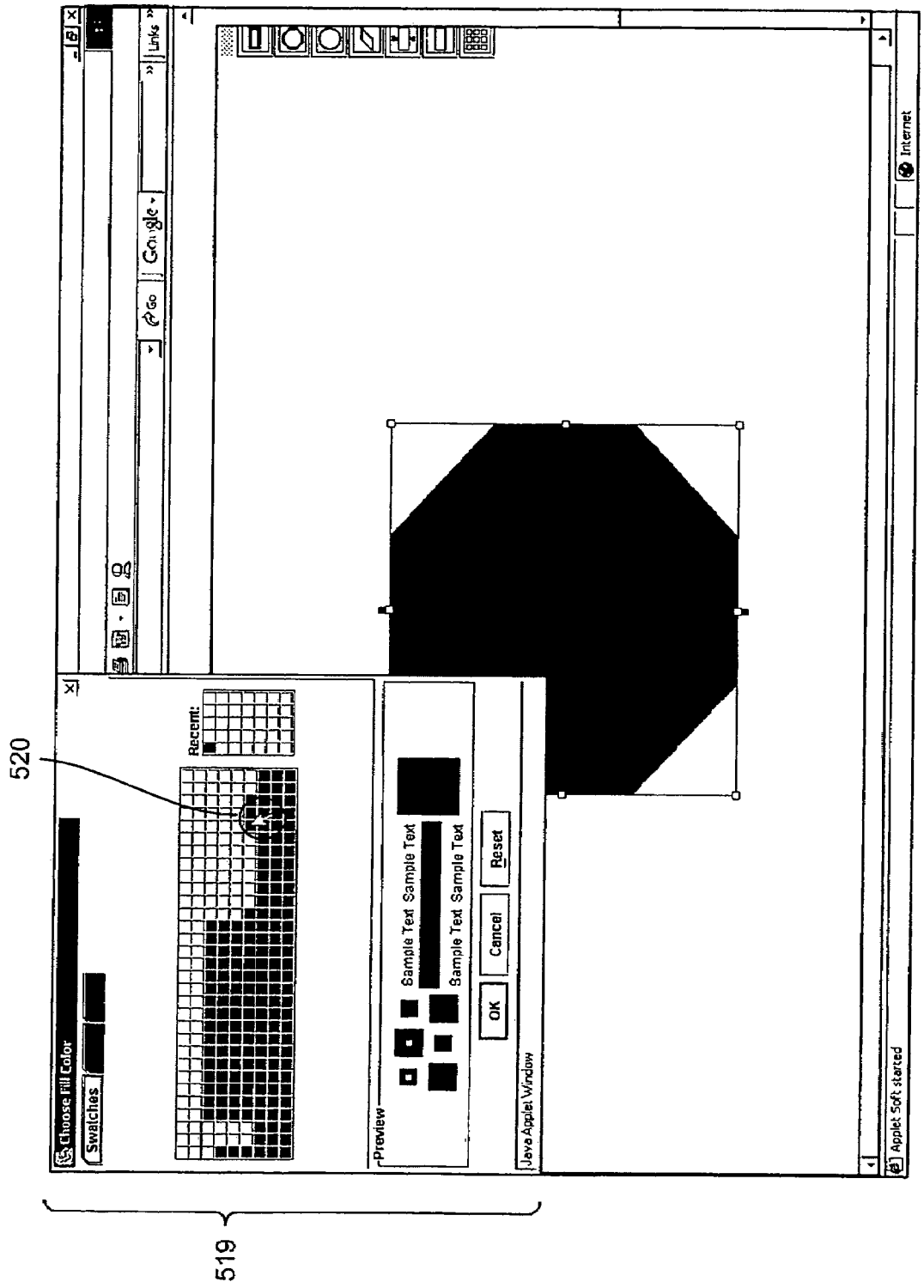
FIG. 5G illustrates changing the fill color of a node.

The fill color of the node can be changed in the same way as the border line color. After clicking on "Fill Color" button 506 in the properties window at 504, as illustrated in FIG. 5C, a separate color palette window will be displayed, as illustrated at 519 in FIG. 5G, and the user can choose the desired fill color by moving cursor 520 to and clicking on the desired color. After the color is selected from the general palette, the fill color can be fine-tuned in the same manner as the border line color, as illustrated in FIGS. 5E and 5F.

Figure 5H:
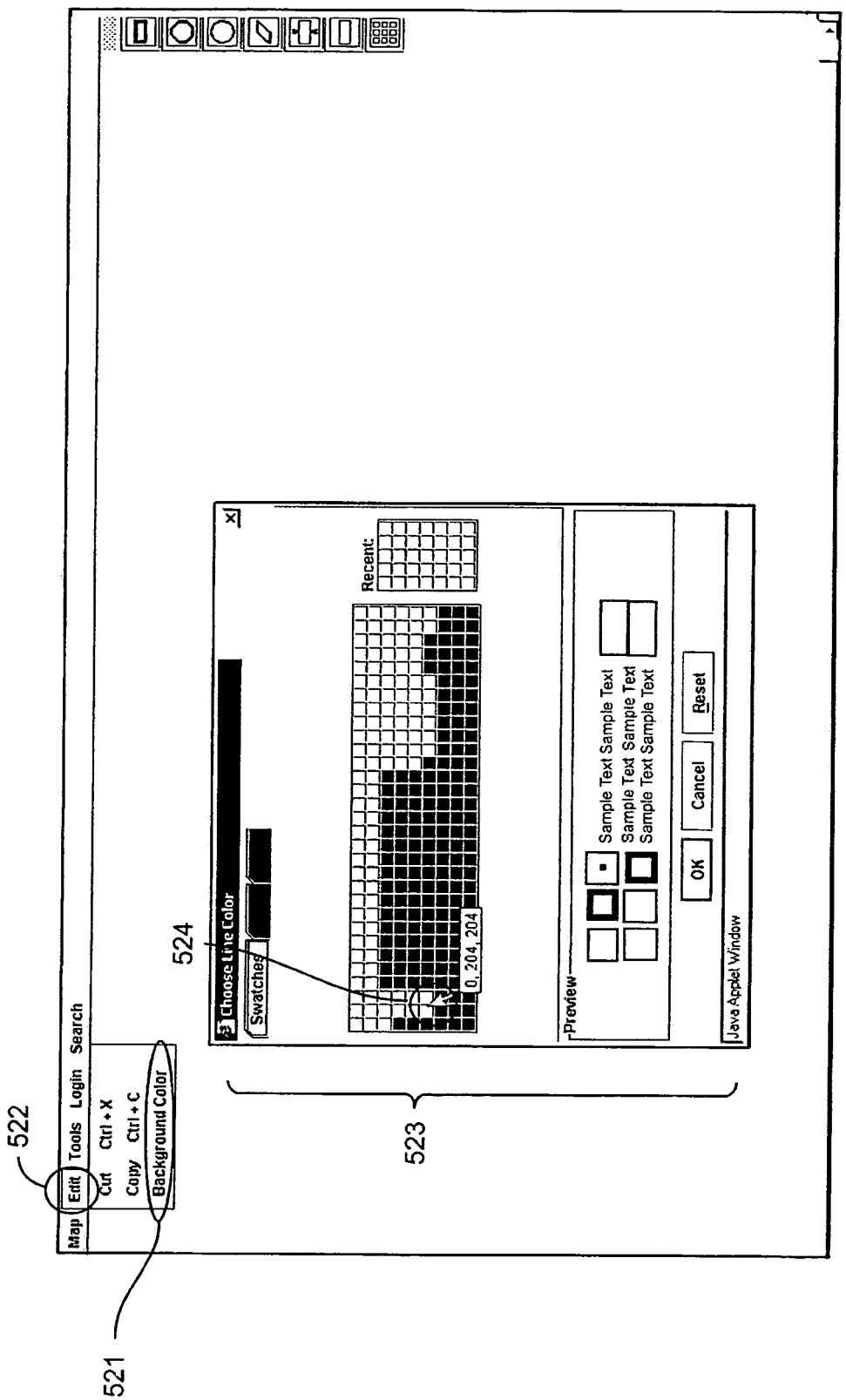
FIG. 5H illustrates changing the background color of the semantic network.

The background color of the semantic network can also be changed by selecting "Background Color" option 521 from the Edit menu at 522, as illustrated in FIG. 5H. This will bring up separate color palate 523 from which the user can select a background color by moving cursor 524 to and clicking on the desired color. After the color is selected from the general palette, the background color can be fine-tuned in the same manner as the border line and fill colors, as illustrated in FIGS. 5E and 5F.

(b) Adding Text

Figure 5I:
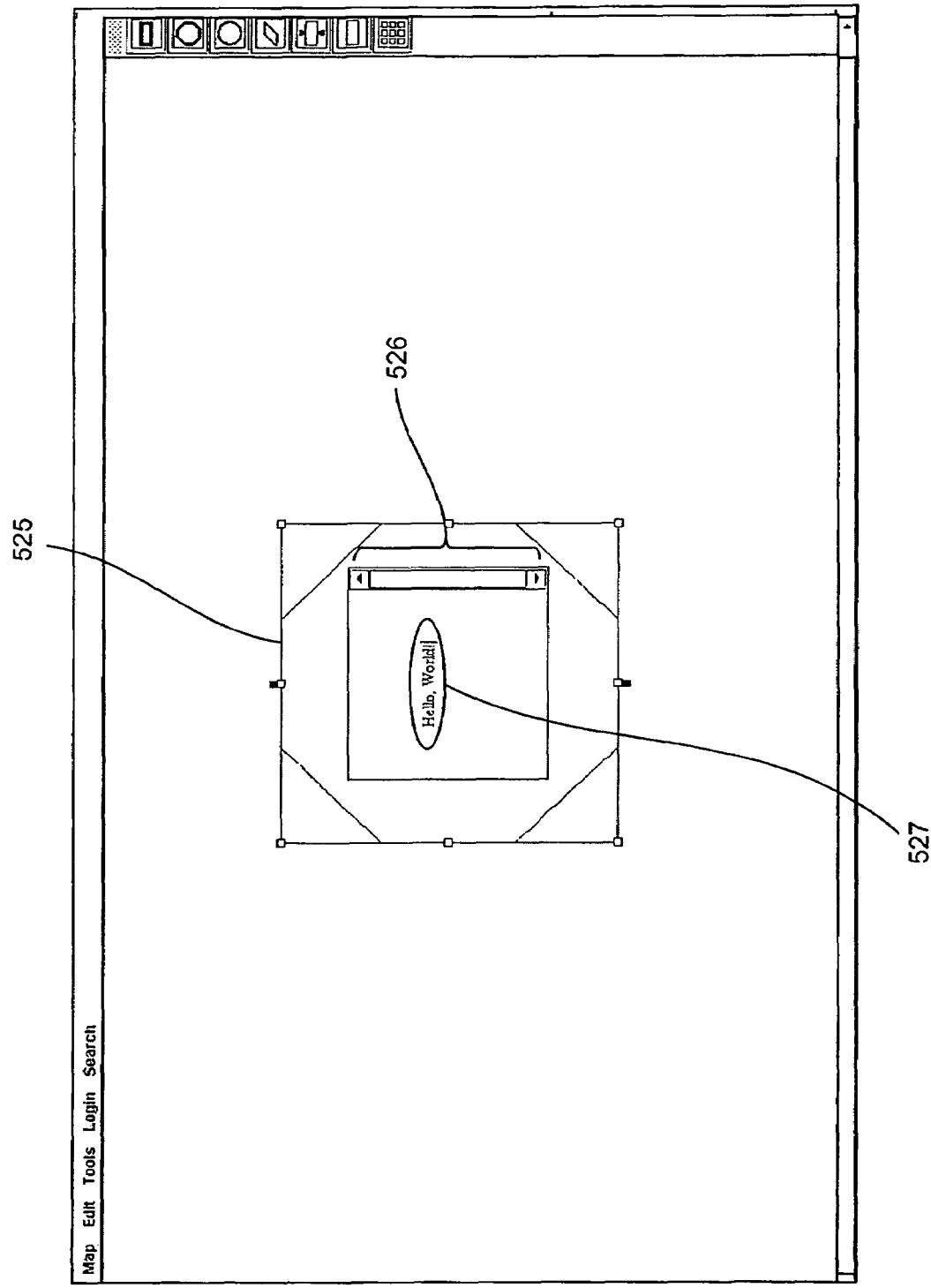
FIG. 5I illustrates adding text to a node.
Figure 5J:
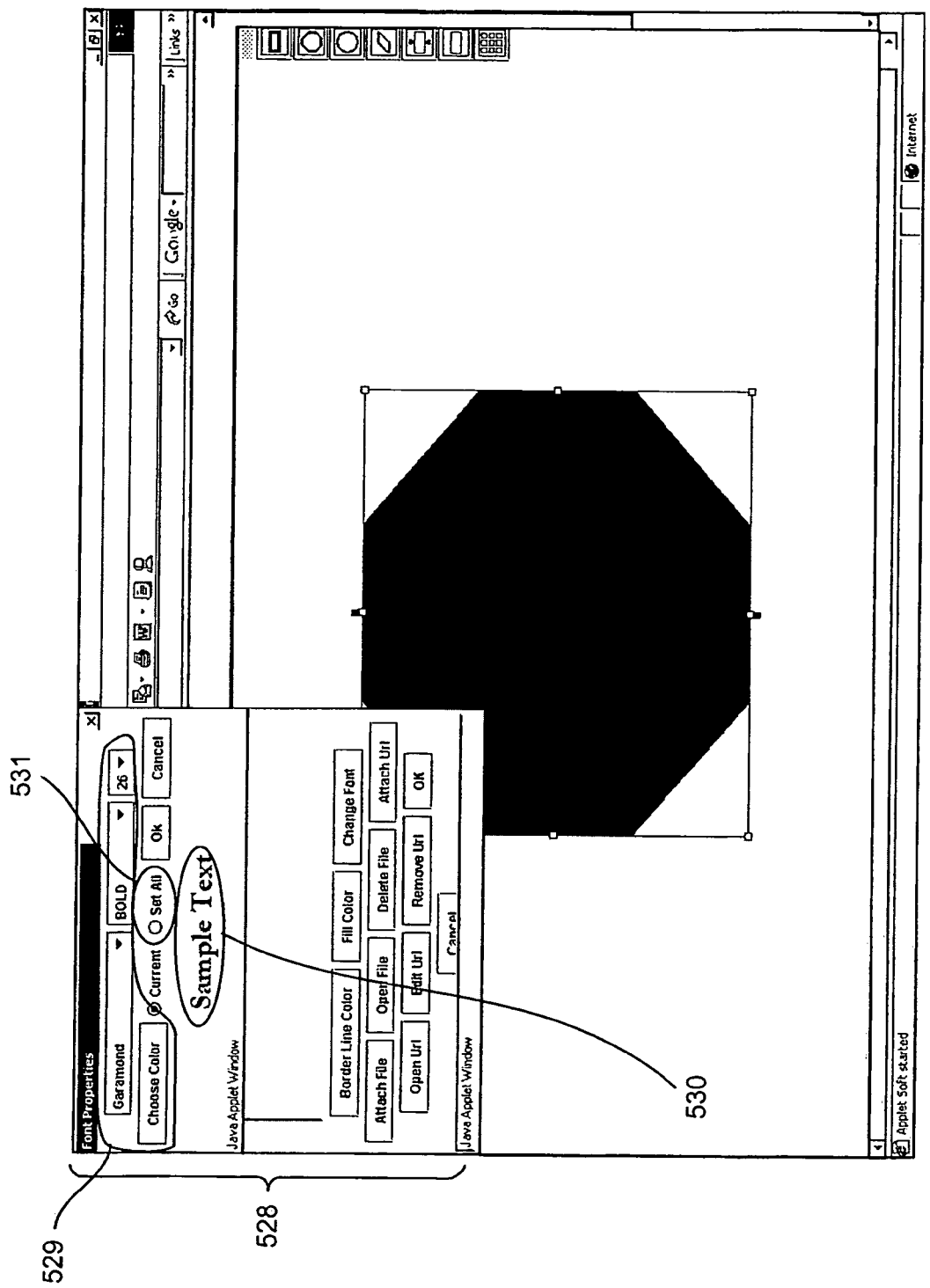
FIG. 5J illustrates changing the font in a node.

Text can be added within any node. This can be achieved by first clicking on node 525 to reveal a text box within the node at 526, as illustrated in FIG. 5I. Then, the desired text at 527 can be entered in the text box at 526. The properties of this text can be changed. By clicking on "Change Font" button 507 of the properties window at 504, illustrated in FIG. 5C, a separate dialog box appears, as illustrated at 528 in FIG. 5J. In dialog box 528, the user can select a desired font, style, size and color of all text using the appropriate buttons at 529 within the current node. The Sample Text at 530 within dialog box 528 provides the user with immediate visual feedback whenever a change is made. The user also has the option of applying these changes to the text elements within all the nodes by selecting "Set All" button 531 in dialog box 528.

(c) Resizing, Repositioning, Copying and Pasting

Nodes can be moved and repositioned by clicking on the node itself and dragging it to the new desired position. Nodes can also be resized. As illustrated at 532A-532H in FIG. 5K, every node has eight drag points, represented by small, white boxes positioned around the border of node 533. Single-clicking on node 533 will cause these drag points to appear. Node 533 can be resized by clicking and dragging on any of its drag points at 532A-532H. The two drag points on the top and bottom of the node at 532B and 532F cause it to be resized in a vertical direction. The two drag points on the left and right of the node at 532D and 532H cause it to be resized in a horizontal direction. The four drag points on the diagonals at 532A, 532C, 532E, and 532 G, allow the user to resize the node evenly in all directions.

Figure 5K:
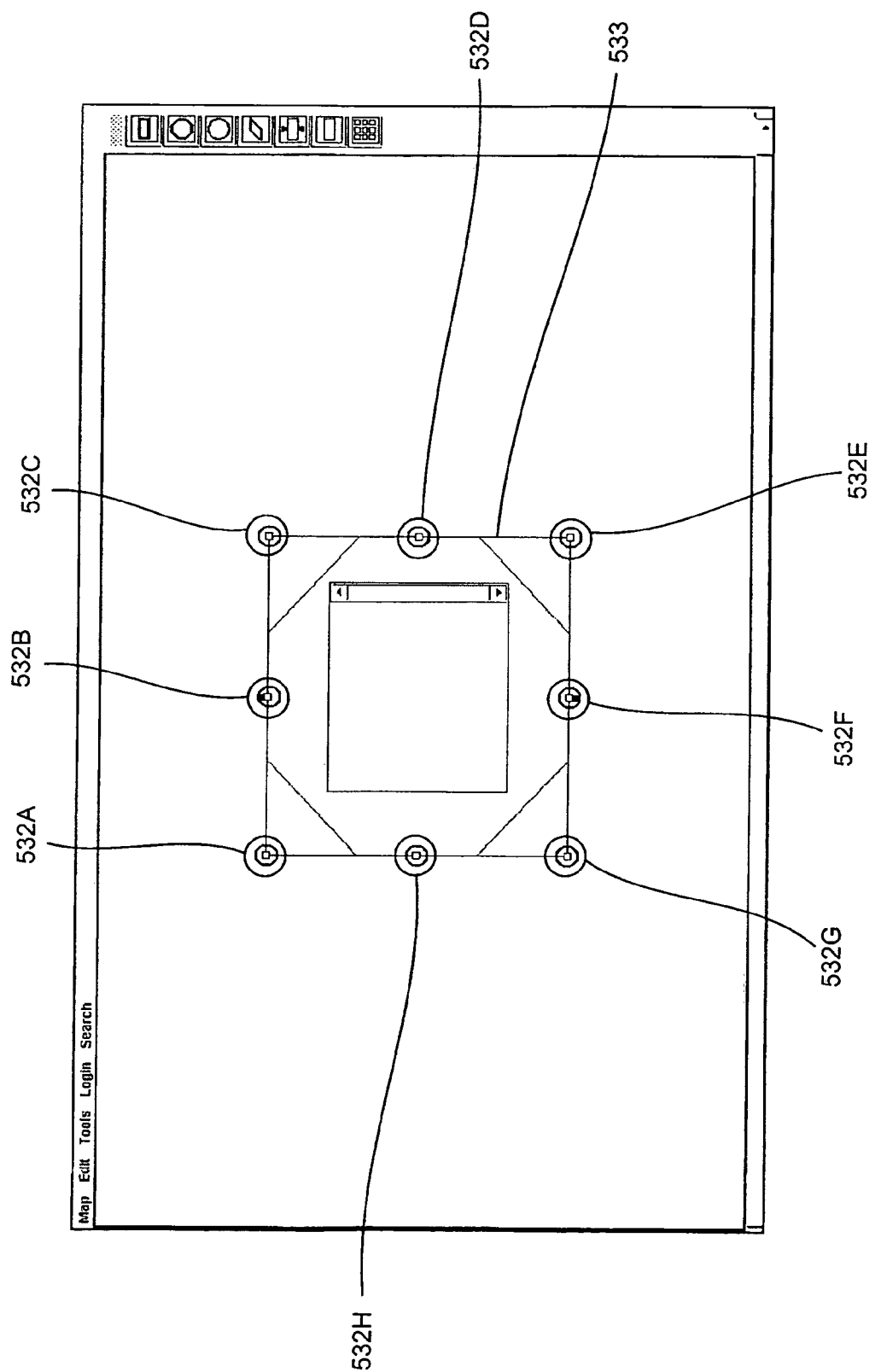
FIG. 5K illustrates eight drag points of a node.
Figure 5L:
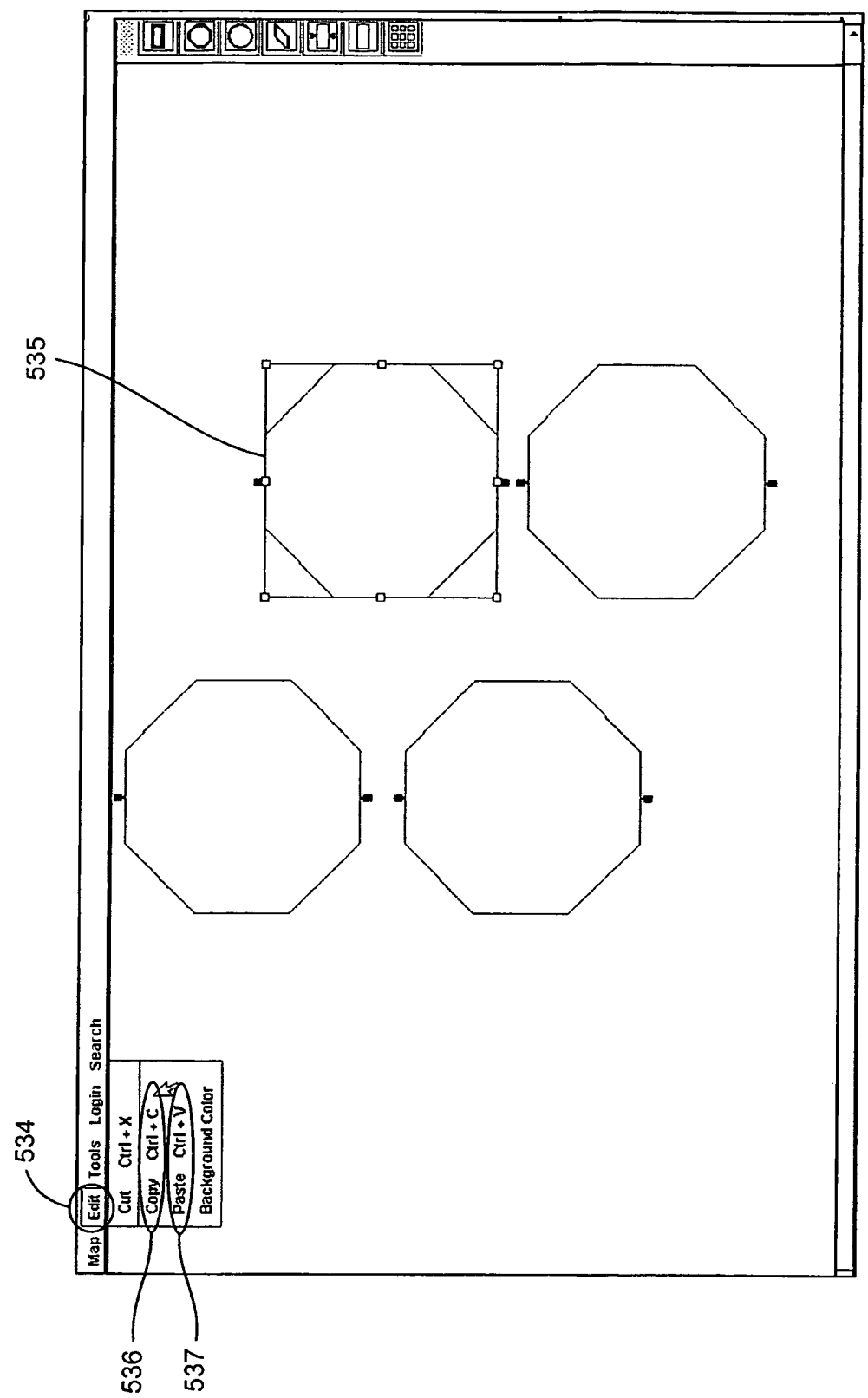
FIG. 5L illustrates copying and pasting a node.

Nodes can be copied and pasted multiple times in the same semantic network, or across different semantic networks. This can be achieved either through keyboard shortcuts, or through options under the Edit menu at 534, as illustrated in FIG. 5L. For example, a user can select node 534 by clicking on that node; next, the user can select Copy at 536 and then Paste at 537 from the Edit menu at 534 to create a copy of node 534.

2. Semantic Link Creation and Connection Properties

Figure 6A:
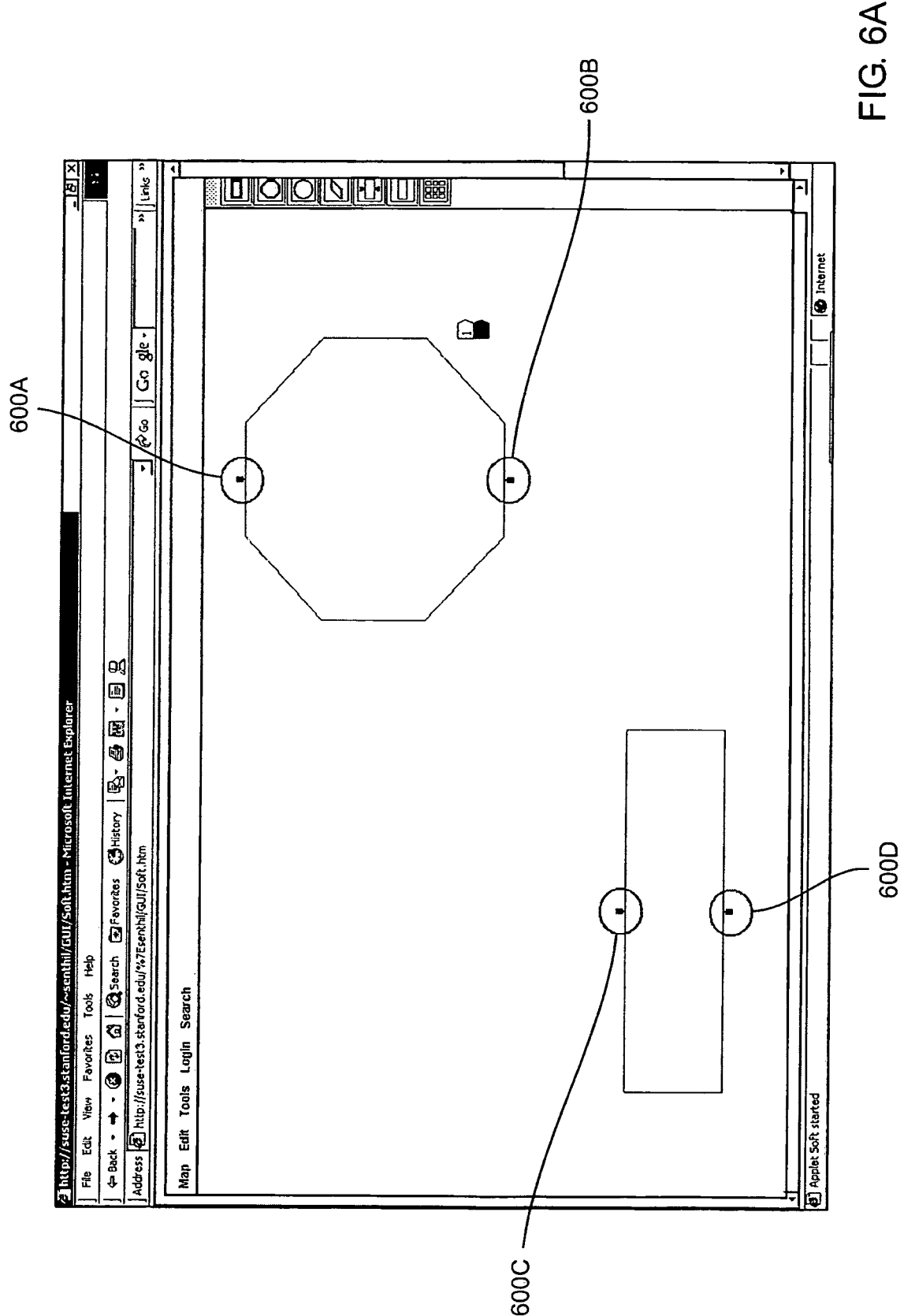
FIG. 6A illustrates node connection points.
Figure 6B:
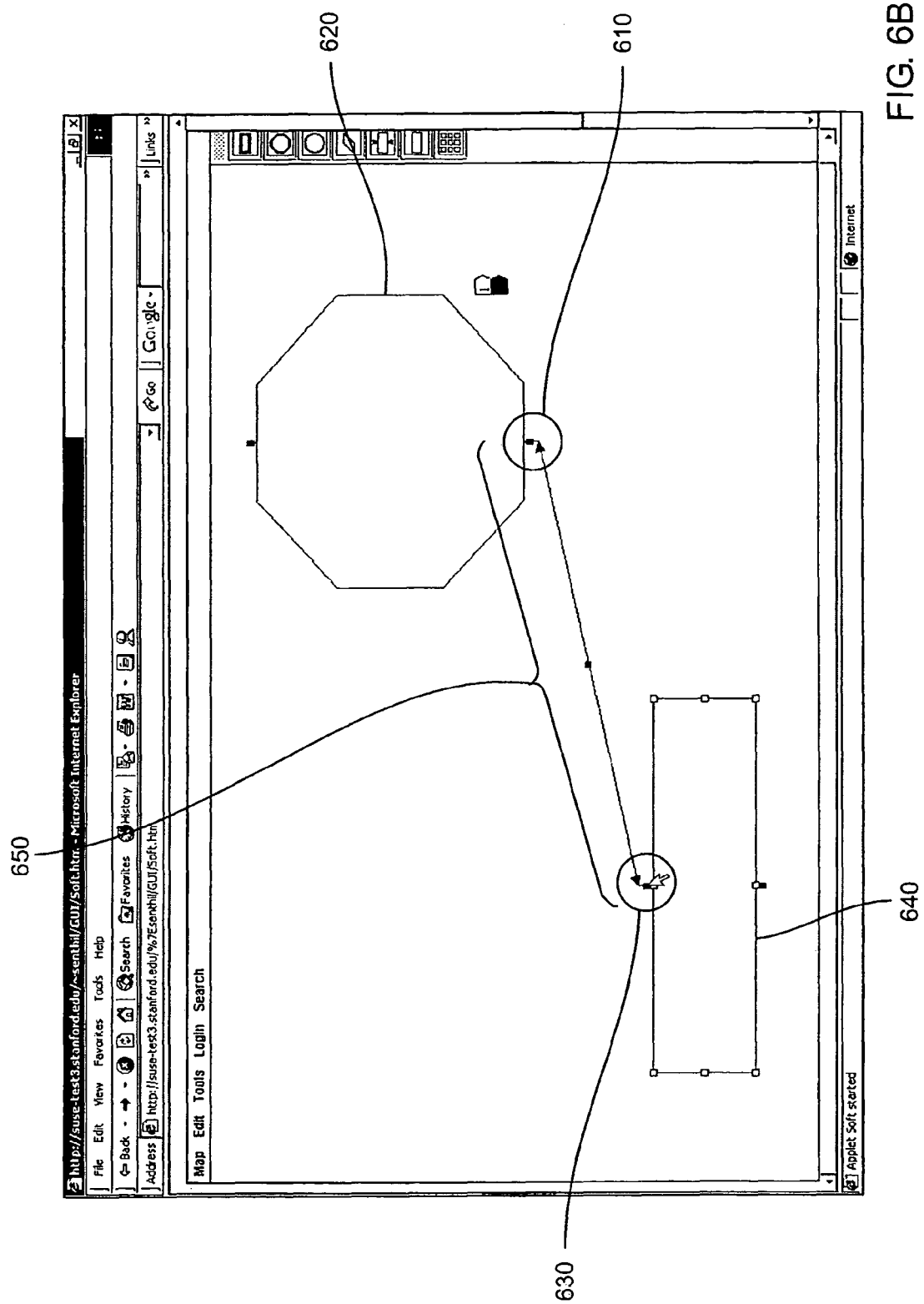
FIG. 6B illustrates establishing a connection between two nodes.

At 100-120, nodes can be connected to one another via semantic links to visually represent the relationships that exist between them and the information they contain. Every node contains two connector points where it can be connected to another node, one at the top of the node and one at the bottom, as illustrated at 600A-600D in FIG. 6A. Clicking within connection point 610 of node 620 and dragging the mouse to connection point 630 of node 640 will establish connection or semantic link 650 between the two nodes, as illustrated in FIG. 6B.

Figure 7A:
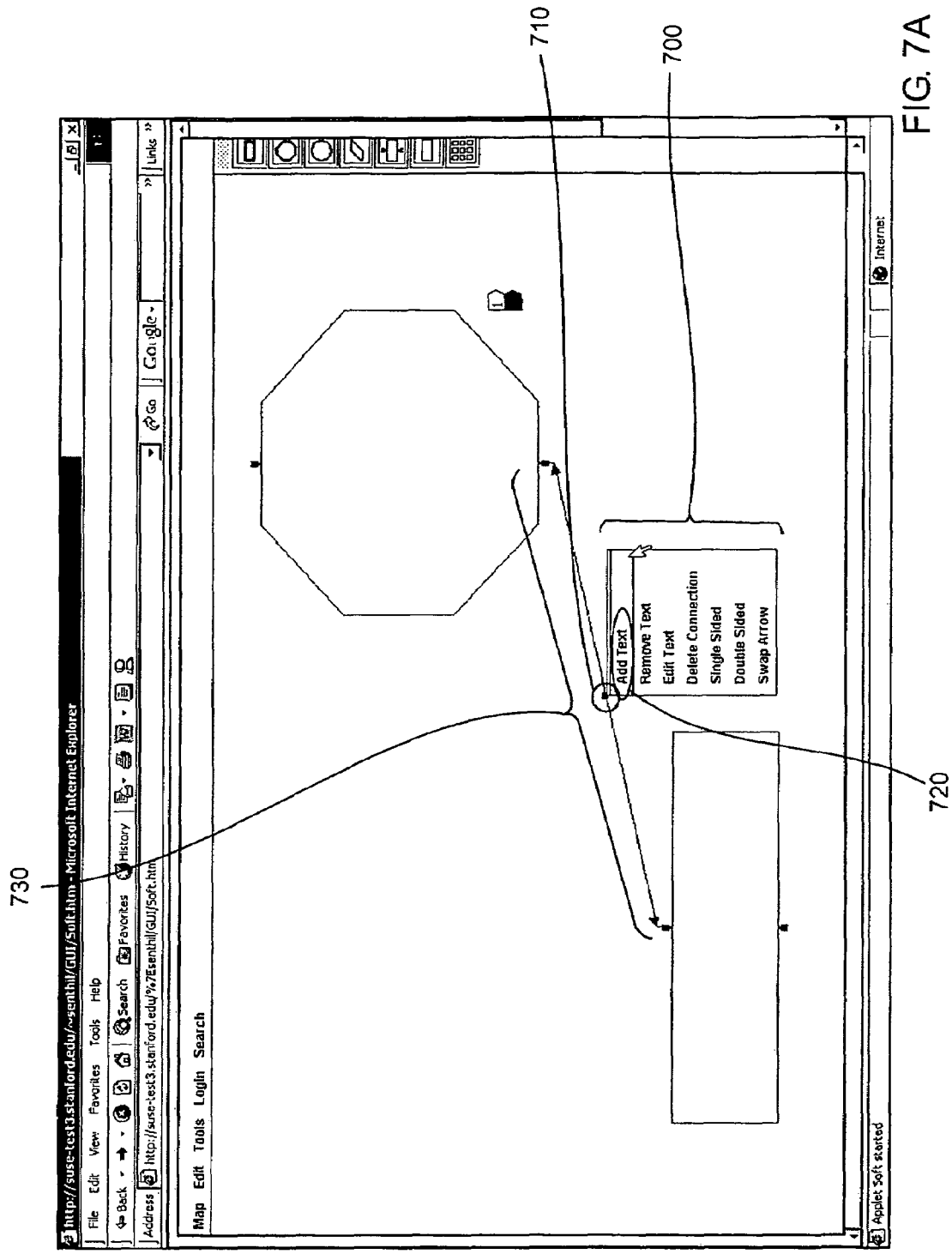
FIG. 7A illustrates connection properties.
Figure 7B:
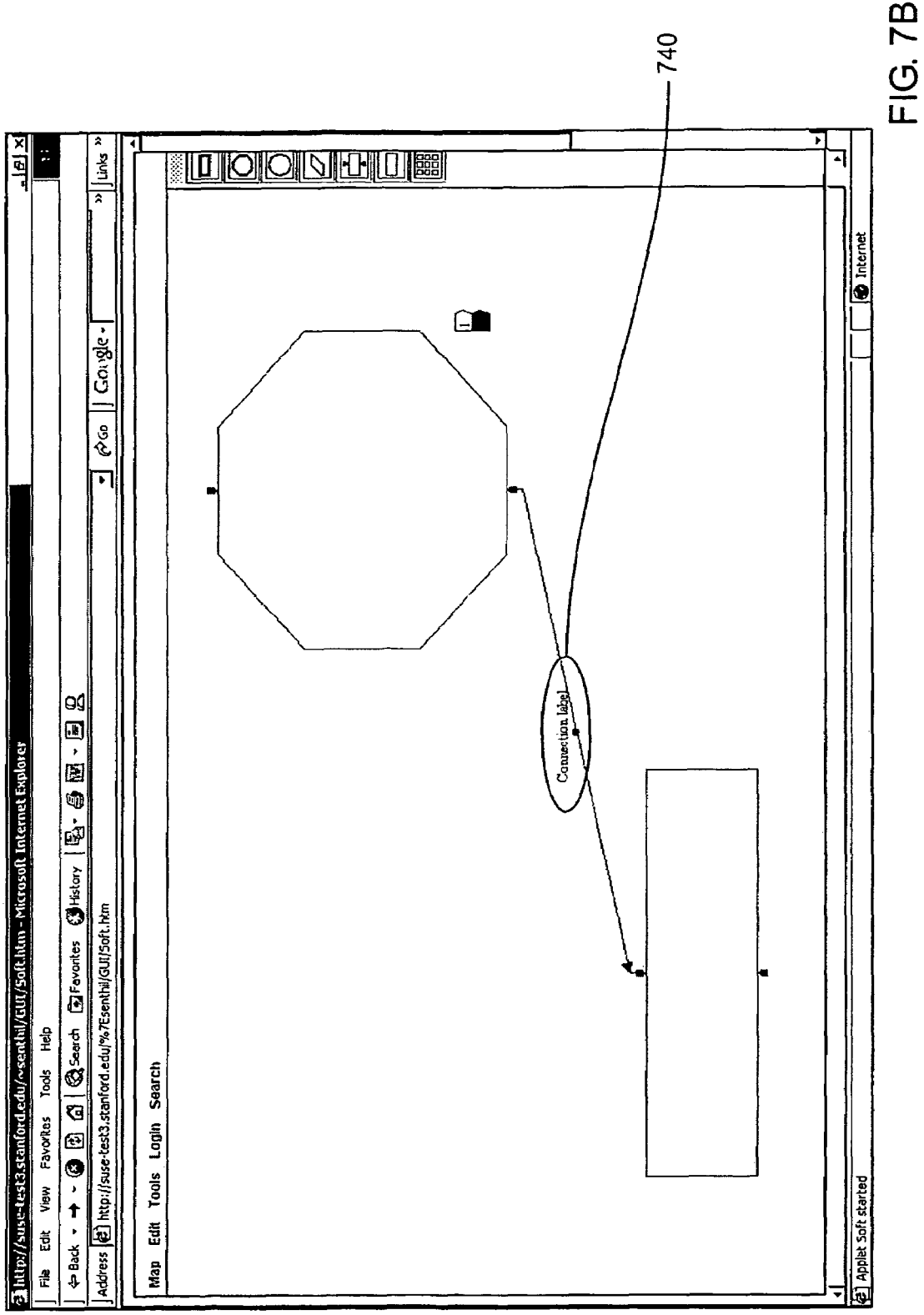
FIG. 7B illustrates adding text to a connection.
Figure 7C:
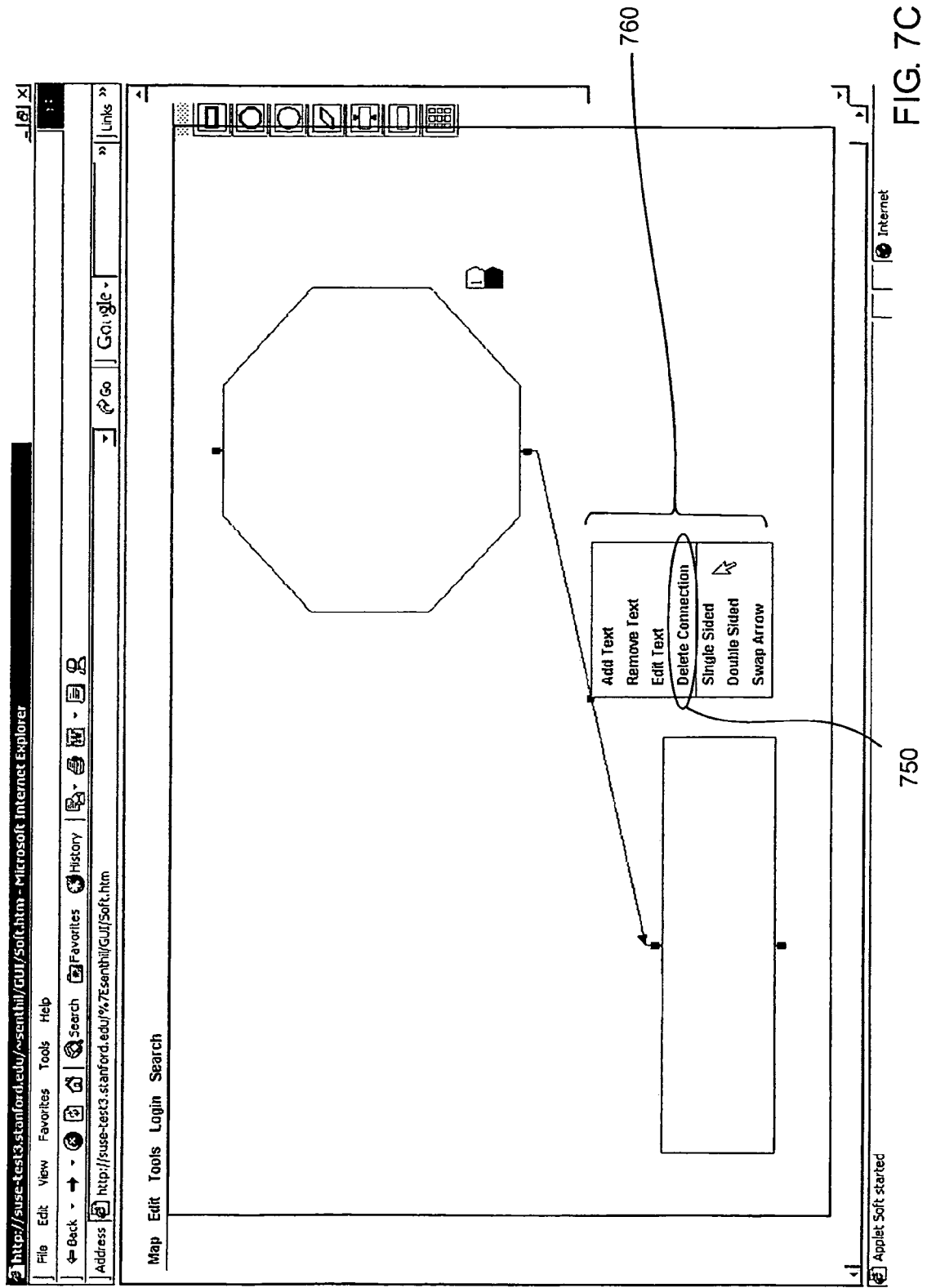
FIG. 7C illustrates creating a unidirectional connection.
Figure 7D:
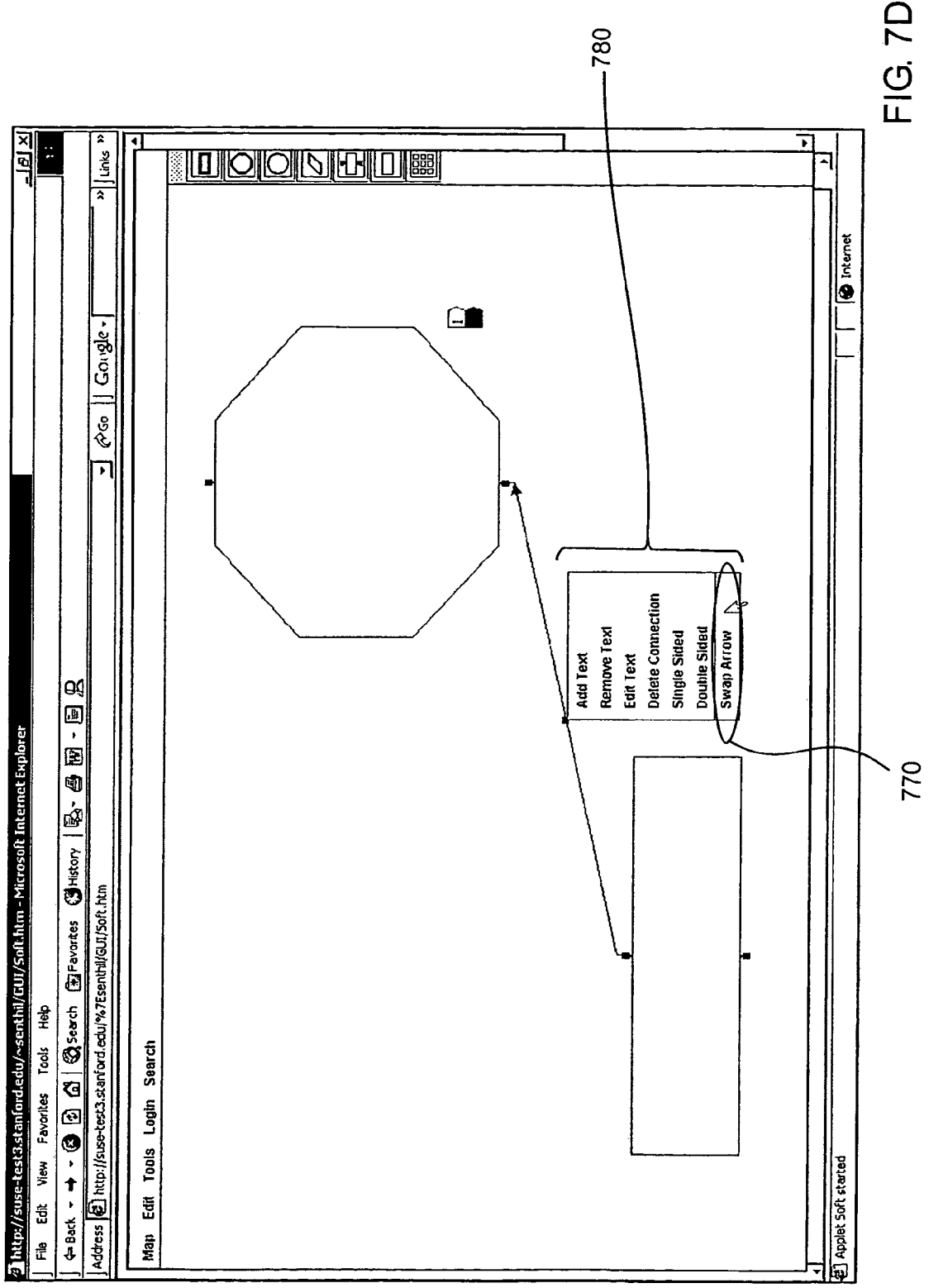
FIG. 7D illustrates swapping the direction of the arrow in a connection.

Each connection has certain properties associated with it. Specifically, a connection can have text associated with it, and can be unidirectional or bi-directional. As illustrated in FIG. 7A, these properties can be modified using dialog box 700 which is brought up by right-clicking on the blue box at the center of the connection at 710. At 110, the relationship between the nodes is labeled. Selecting "Add Text" option 720 will bring up text box 740 where the user can enter the text to be displayed with the connection, as illustrated in FIGS. 7A and 7B. At 120, a user defines the hierarchical relationship between nodes which can be done by selecting the appropriate directional arrow for the connection. The sample connection or semantic link at 730 in FIG. 7A defaults to bi-directional arrows. It can be made unidirectional, as illustrated in FIG. 7C, by selecting "Single Sided" option 750 in dialog box 760. The direction of the arrow can be swapped by selecting "Swap Arrow" option 770 in dialog box 780, as illustrated in FIG. 7D.

3. Attaching Non-Restricted Multimedia Objects to Nodes

At 130-170, a user goes through the process of attaching multimedia objects, including but not limited to, image files, sound files, and Uniform Resource Locators to nodes. At 130, a user selects these multimedia objects from remote locations on the network. At 140-160, a user accesses the multimedia objects, if the user has access privileges to do so, and then attaches them to nodes. At 170, the number and file type of the multimedia objects attached to each node is indicated.

(a) Selecting Multimedia Objects

One example of selecting multimedia objects, as described in 130, is illustrated in FIGS. 8A-8D. In this embodiment of the present invention, image libraries are used as general repositories for image files. A user may choose to upload an image to one of these libraries if the user is expecting to reuse the image in different nodes, or across different semantic networks. In this embodiment, there are three different types of image libraries: a user's personal image library, a shared library where users can post images to share and download images to use, and a common image library which is maintained by a system administrator.

Figure 8A:
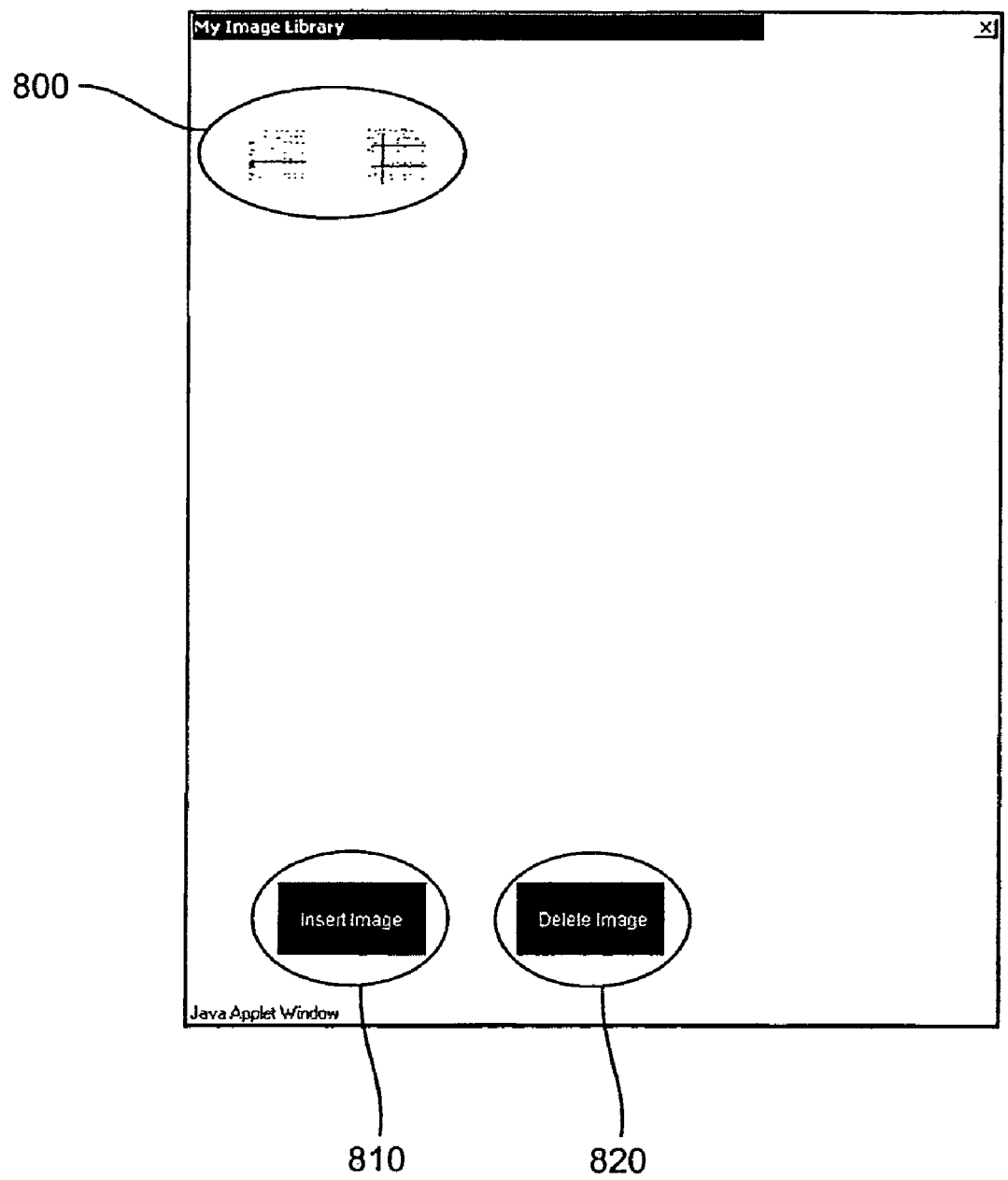
FIG. 8A illustrates a user's personal image library.
Figure 8B:
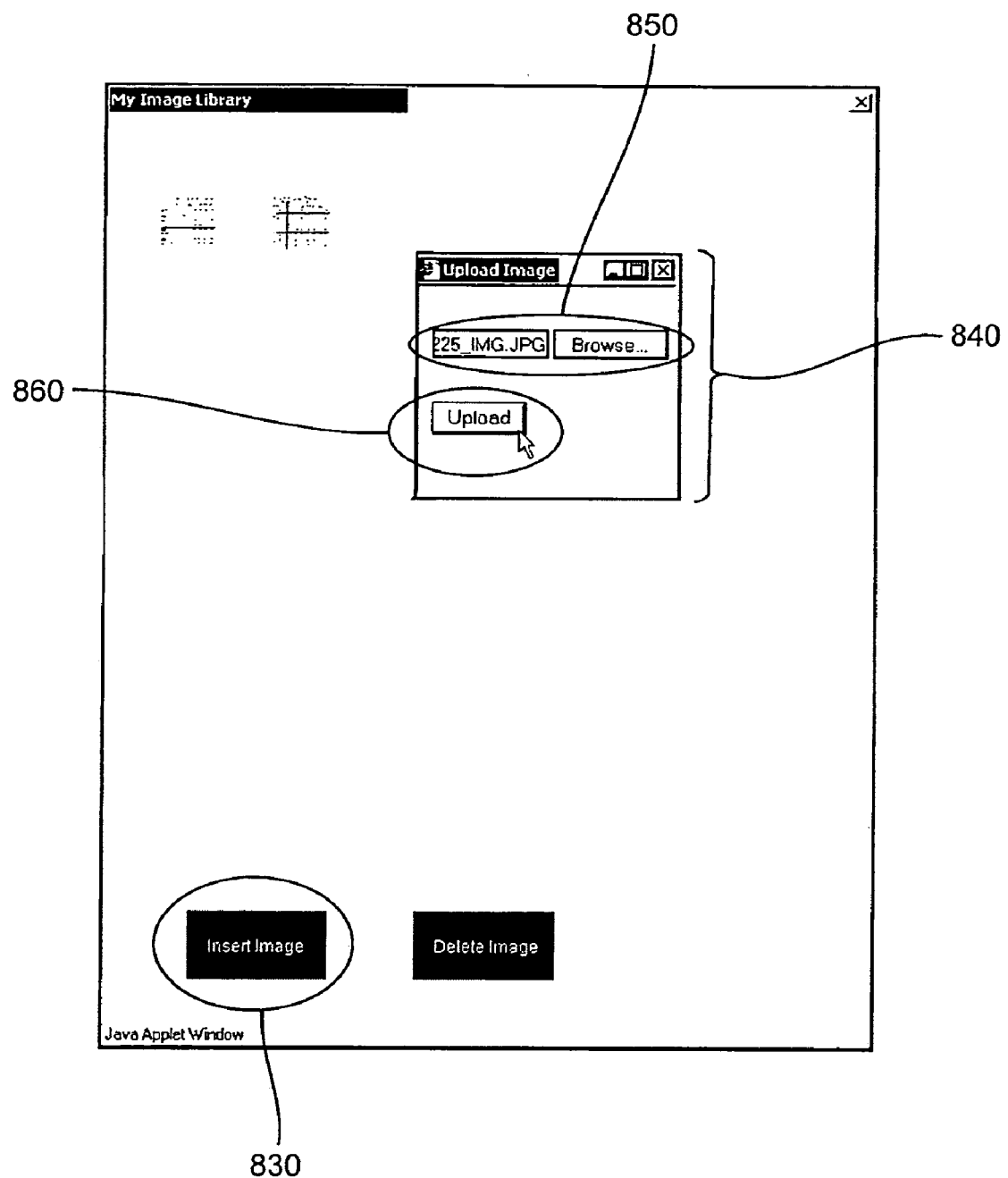
FIG. 8B illustrates uploading an image to a user's personal image library.
Figure 8C:
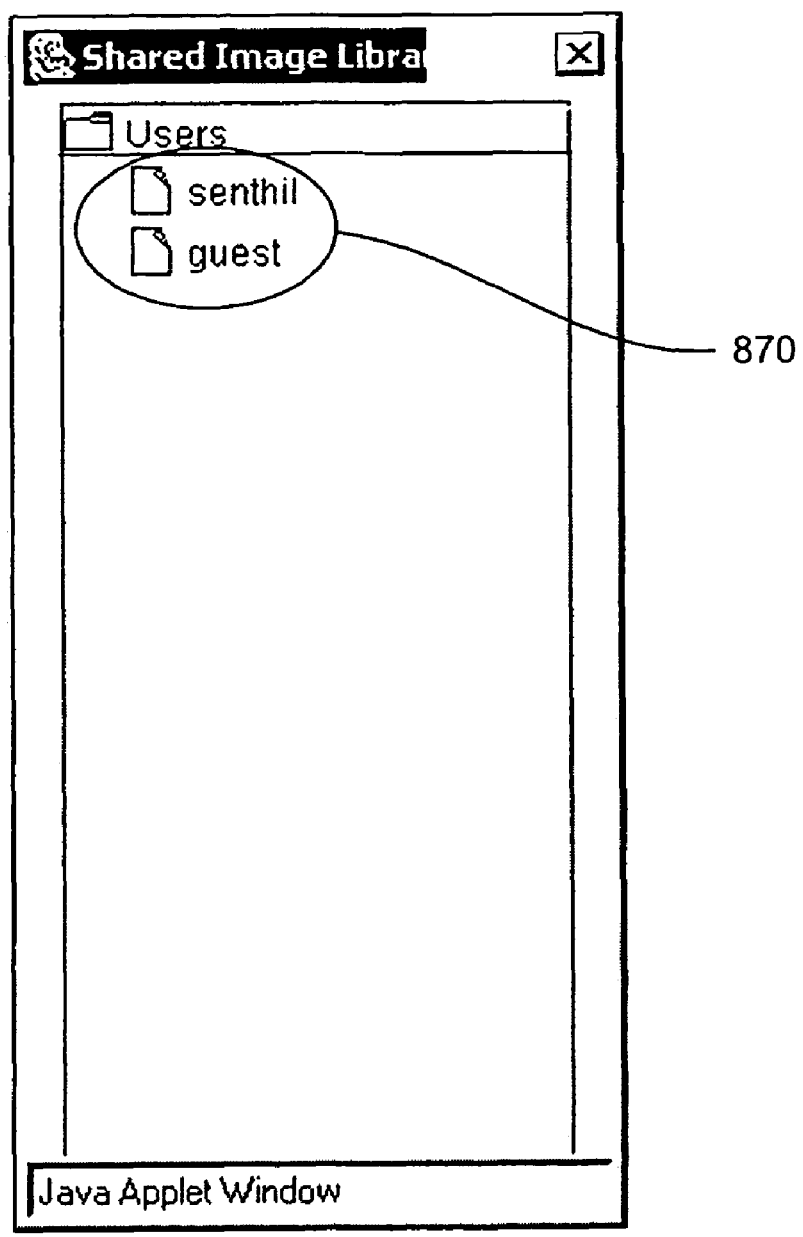
FIG. 8C illustrates a list of users with personal image libraries that have been made available for access.

The user's personal image library can be used to upload image files. These image files can then be easily accessed and used in nodes and semantic networks. To open the personal image library, select "My Image Library" from the Tools menu. Doing so opens a window displaying the current contents of image library 800, as well as buttons to add and remove images at 810, as illustrated in FIG. 8A. Clicking "Insert Image" button 830 opens dialog box 840 to allow the user to browse for the desired file at 850, and then upload that file to the image library using the "Upload" button 860, as illustrated in FIG. 8B. A user may choose to restrict access privileges to its own personal image library or specific image files within this library.

Figure 8D:
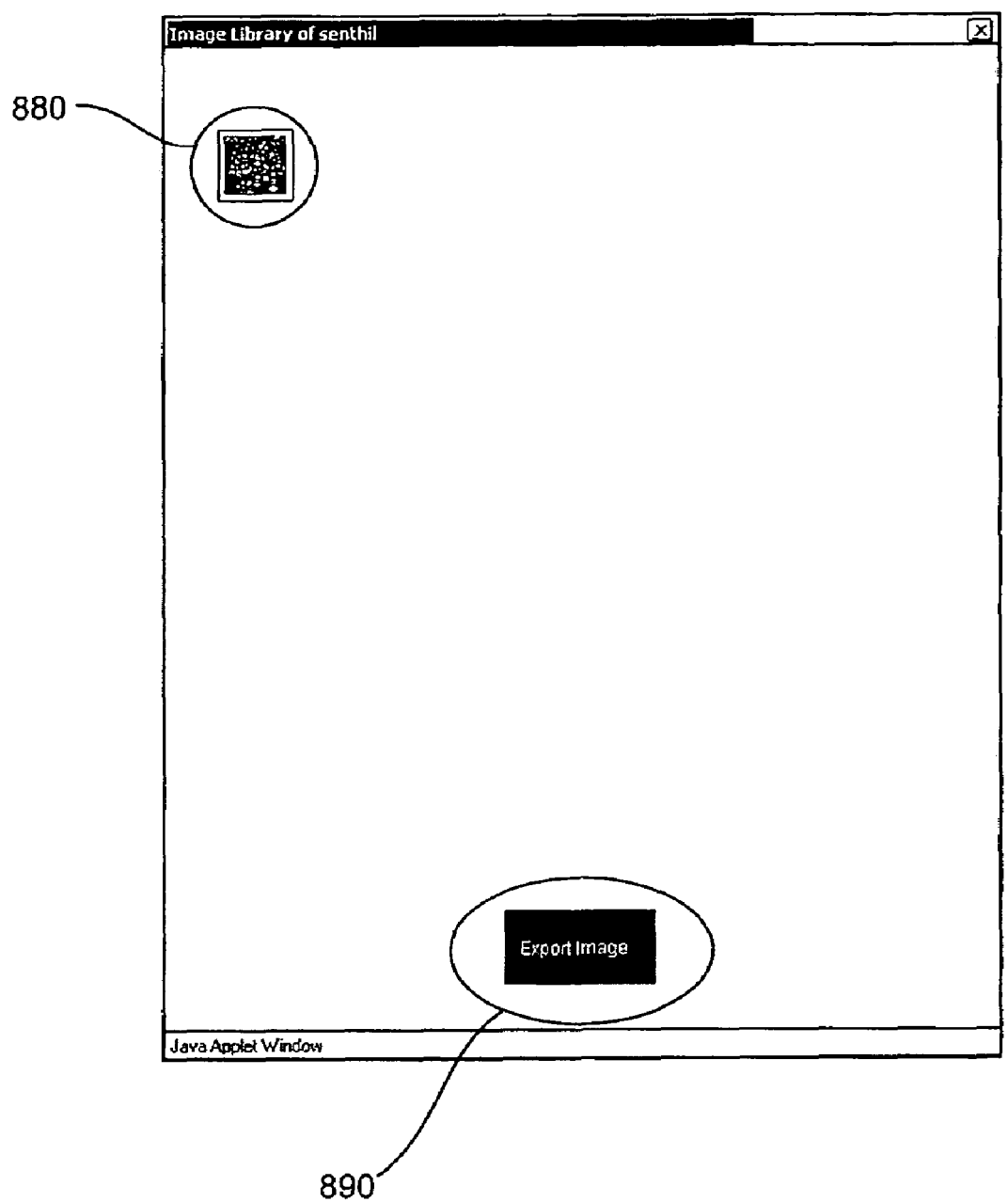
FIG. 8D illustrates a shared user's personal image library that has been made available for access.

The shared image library allows a user to access other users' image libraries, and then download images into the user's own personal library. Selecting "Shared Image Library" from the Tools menu brings up a listing of other users who have personal image libraries that have been made available for access, as illustrated at 870 in FIG. 8C. As illustrated in FIG. 8D, selecting a user from the list will open another window displaying the content of that user's image library at 880 with an option to export any of the images to the current user's own image library. Selecting image file 880 and then clicking "Export Image" button 890 will copy the image to the current user's own personal image library.

The common image library is maintained by the system administrator who has sole access to add or remove images from this library. All other users have export access to this library, meaning that they can use any image files in the library in their own semantic networks. Selecting "Common Image Library" from the Tools menu opens up the common image library. Choosing an image in the library and then clicking "Export Image" will copy the image to the current user's own personal image library.

(b) Attaching Multimedia Objects to Nodes

Figure 9A:
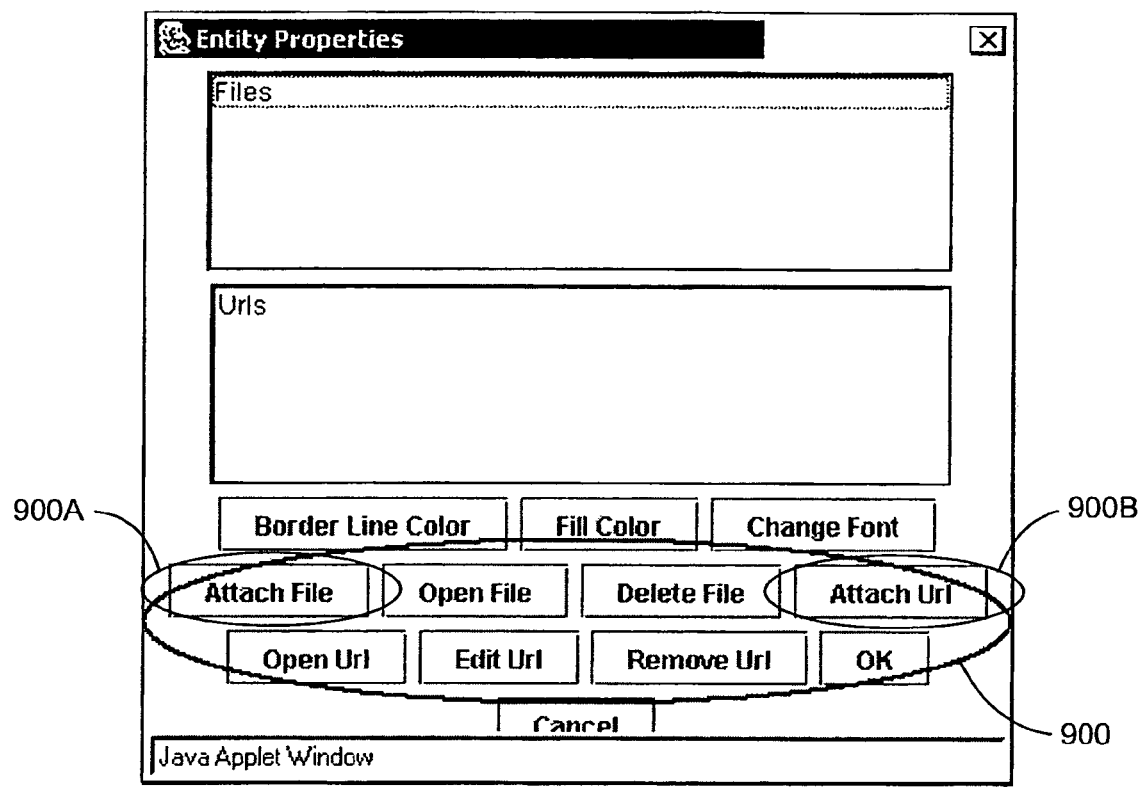
FIG. 9A illustrates file and URL attachment options, including adding, removing, and opening attached files and URLs.
Figure 9B:
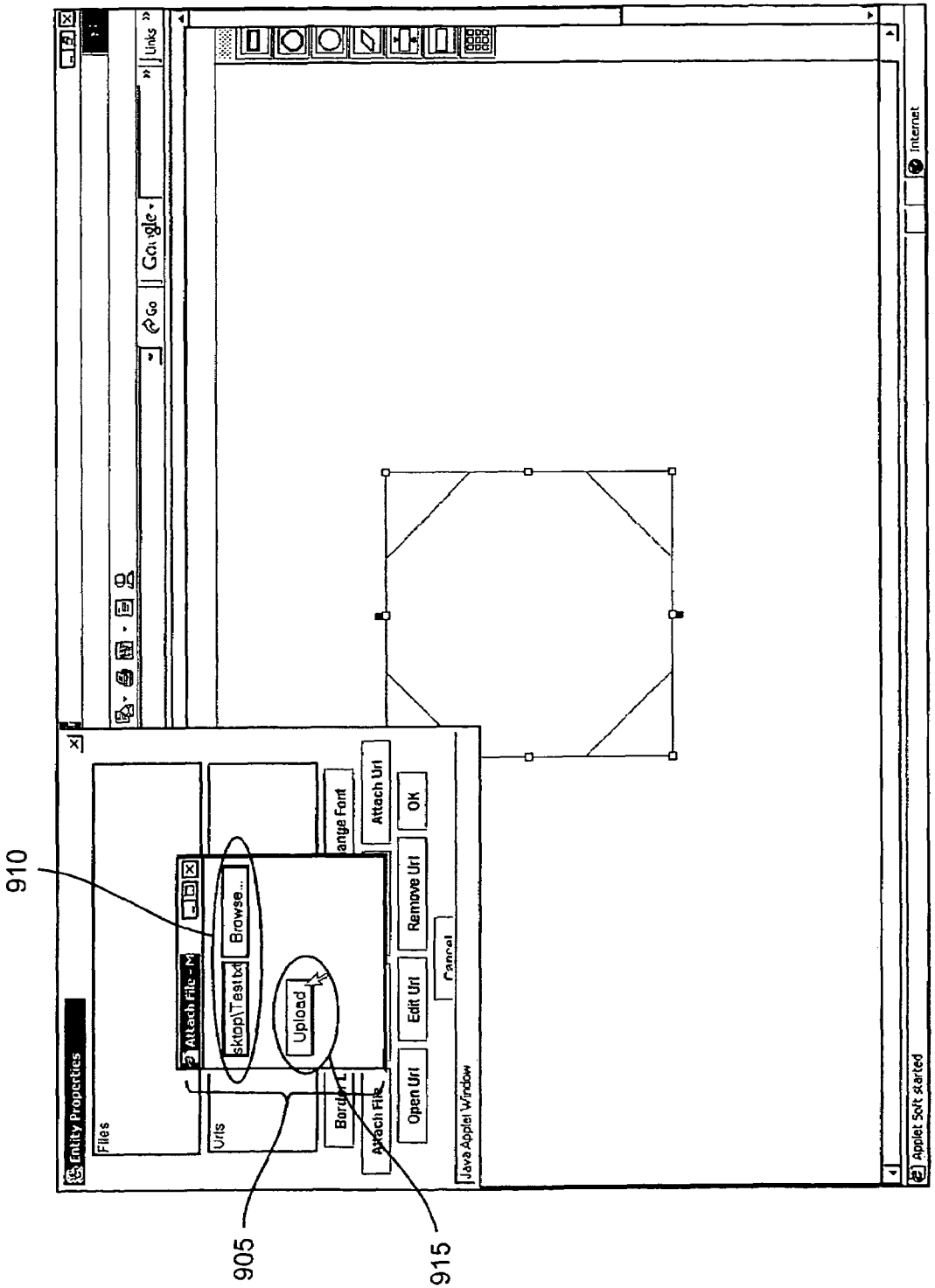
FIG. 9B illustrates browsing and uploading a file to attach it to a node.
Figure 9C:
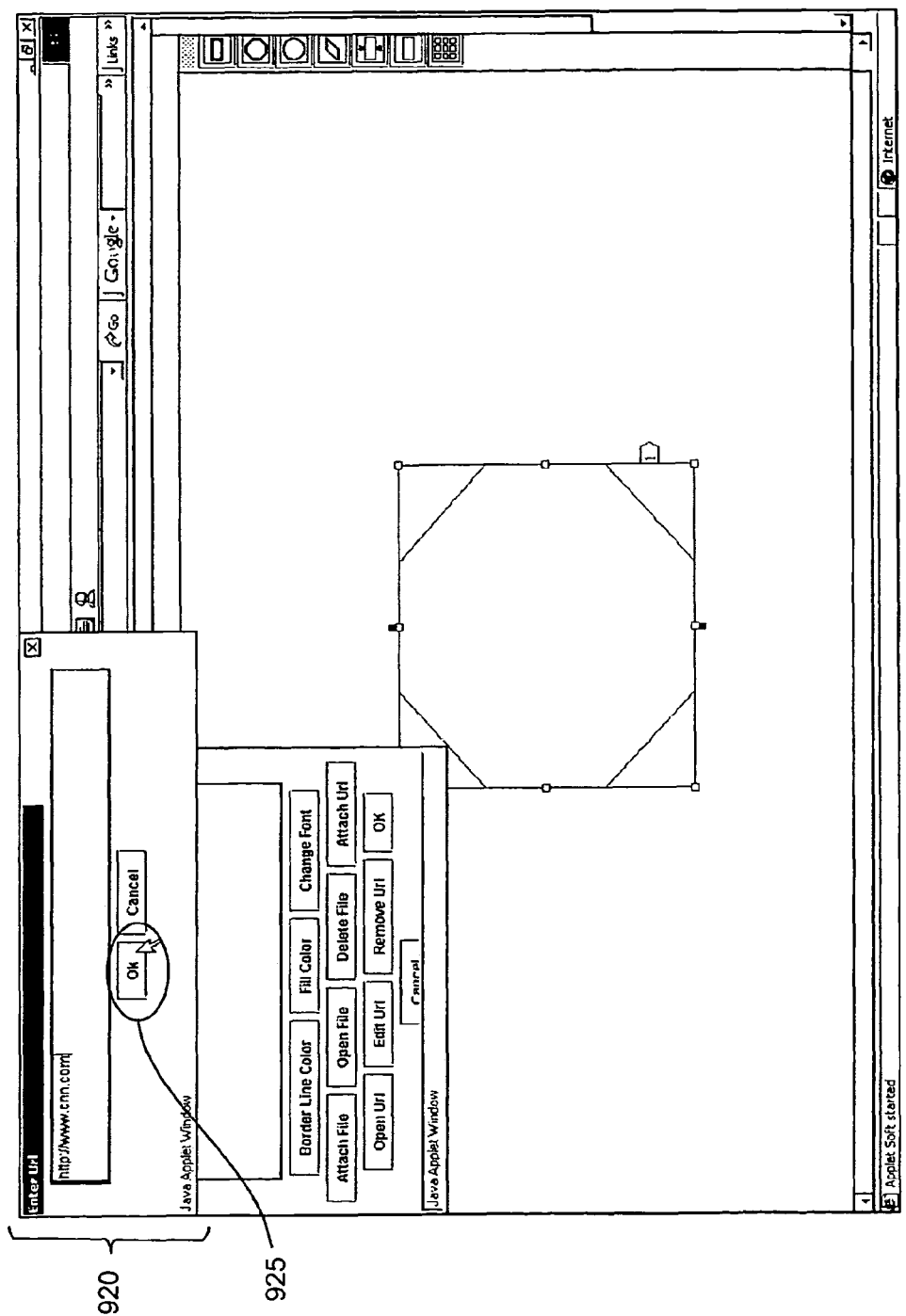
FIG. 9C illustrates entering a URL in a dialog box to attach it to a node.

At 160, any number of multimedia objects, including but not limited to, files and URLs, can be attached to a node from the node's properties window. Right-clicking on a node brings up its property window which reveals options to add, remove, and open any attached files and URLs, as illustrated in FIG. 9A. Selecting "Attach File" button 900A will bring up dialog box 905 where the user can browse through that user's local directory at 910 and find the desired file to attach to the node, as illustrated in FIG. 9B. This file can then be uploaded to a server by clicking the "Upload" button 915 and saved with the node. Selecting "Attach URL" button 900B from the properties window brings up dialog box 920 where the user can enter a URL to attach to the node by clicking the "OK" button 925, as illustrated in FIG. 9C.

(c) Indicating Number and File Type of Attached Multimedia Objects

Figure 9D:
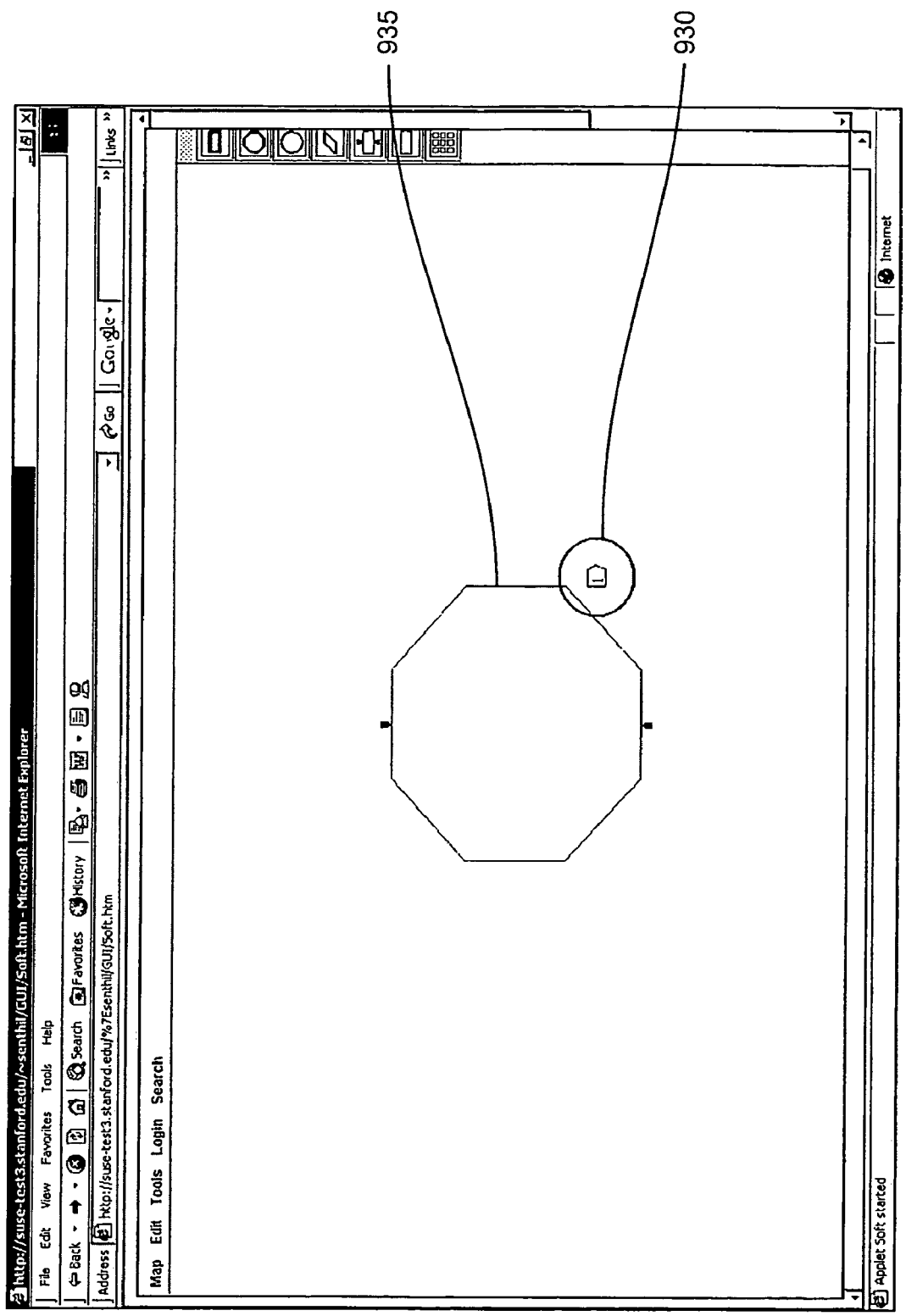
FIG. 9D illustrates a file counter on a node, indicating the number of files attached to that node.
Figure 9E:
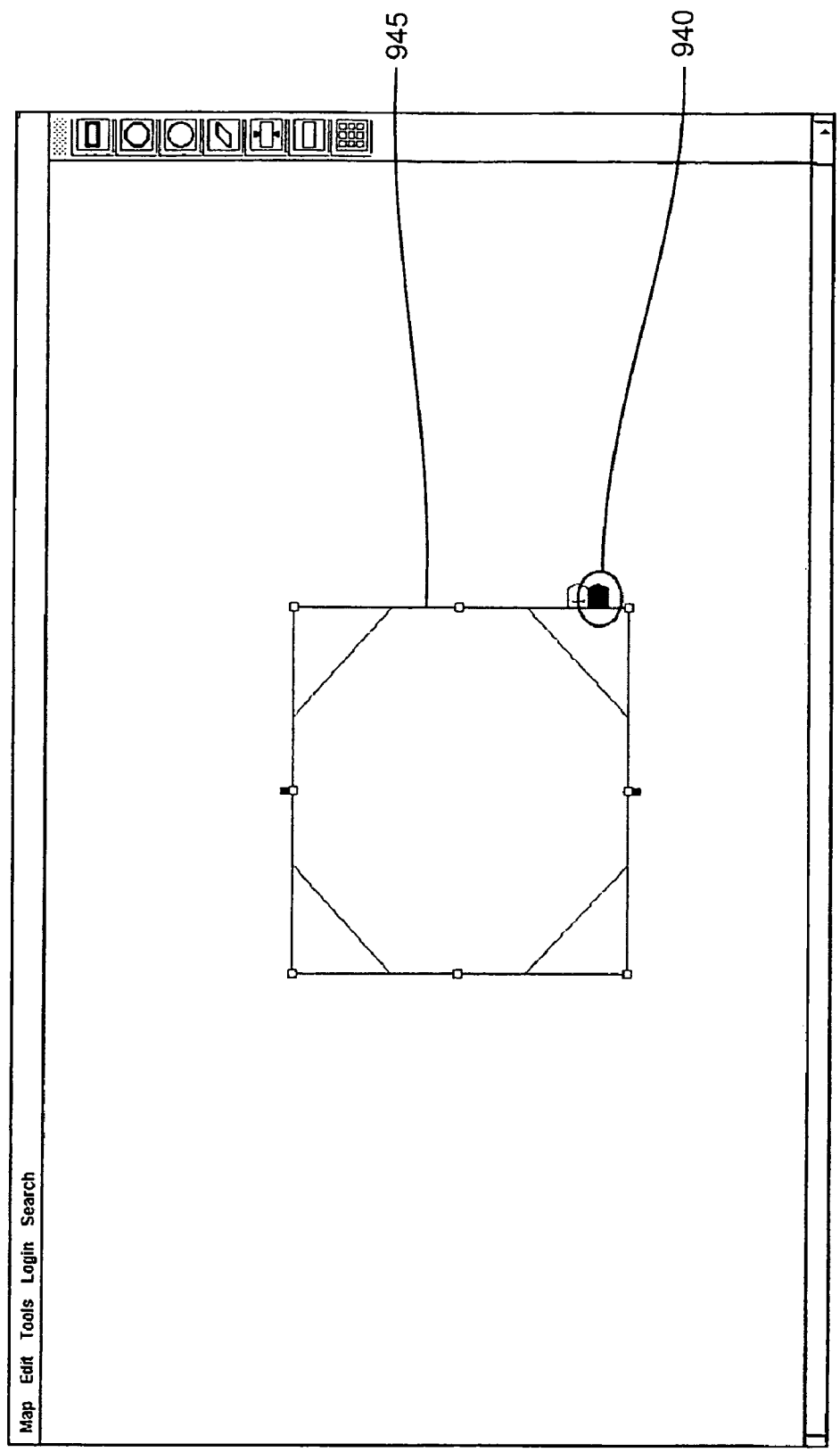
FIG. 9E illustrates a URL counter on a node, indicating the number of URLs attached to that node.
Figure 9F:
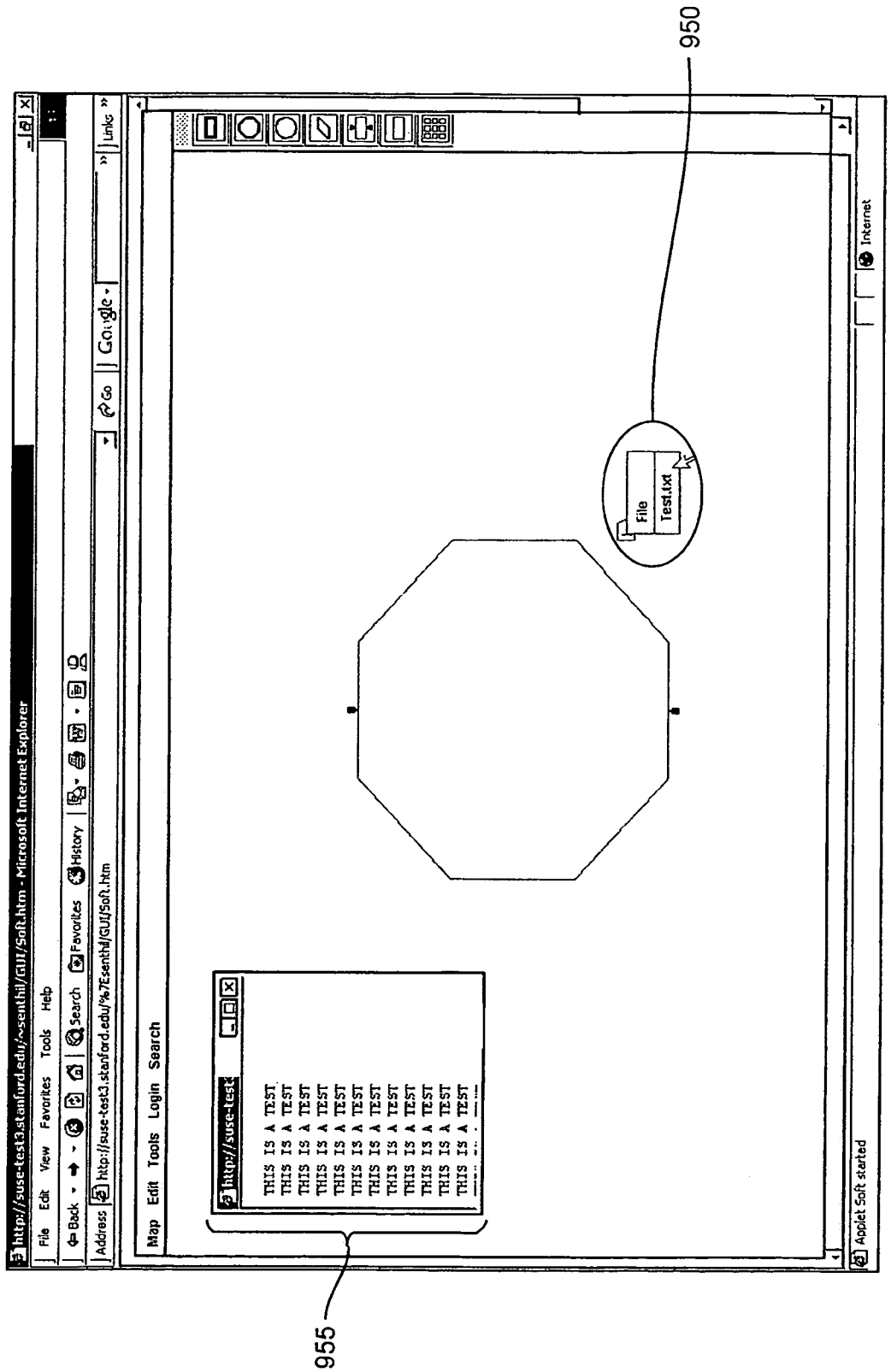
FIG. 9F illustrates a file counter on a node, including the list of files associated with that node as well as a file that was opened directly from the file counter.
Figure 9G:
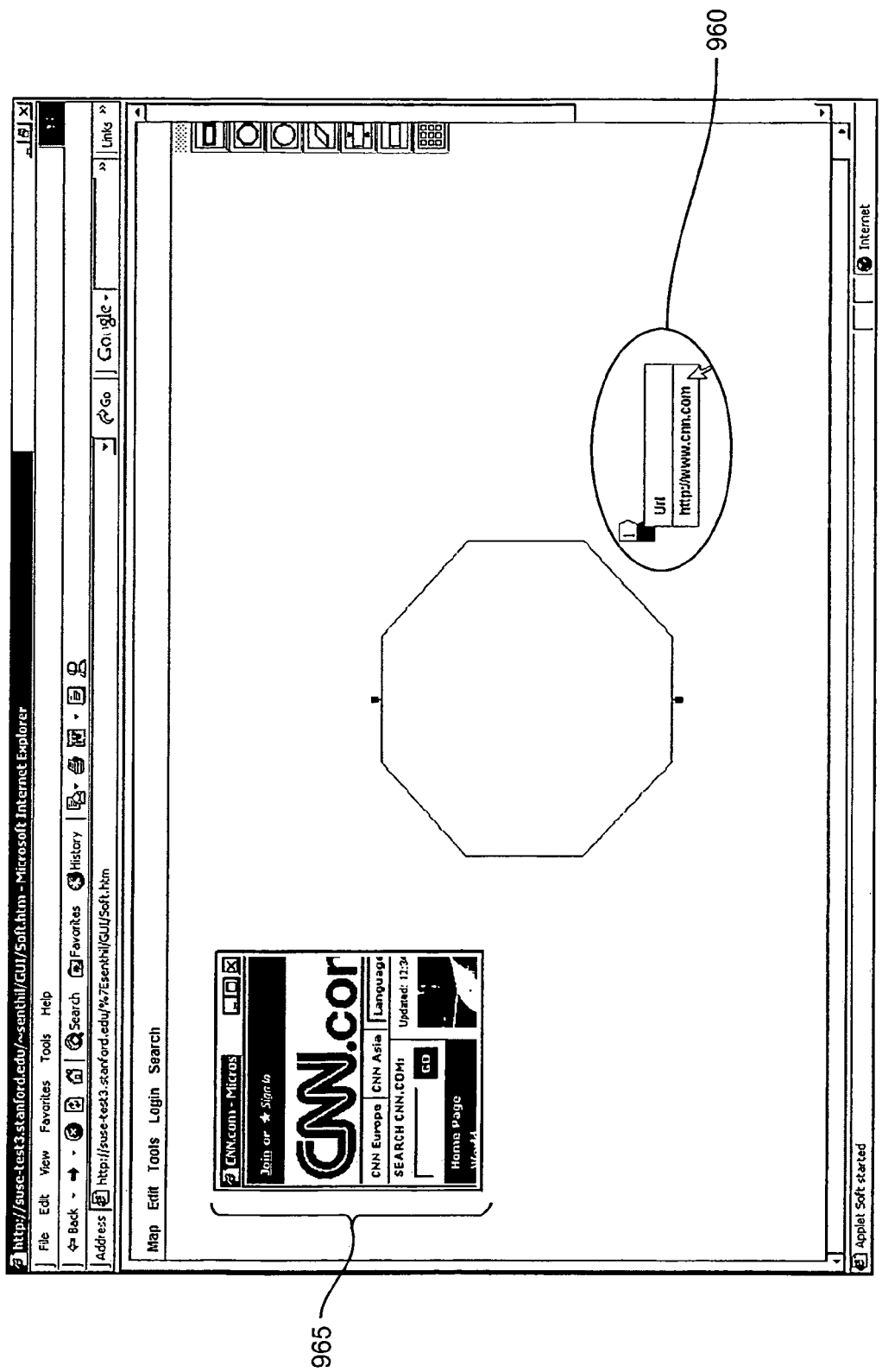
FIG. 9G illustrates a URL counter on a node, including the list of URLs associated with that node as well as a browser window associated with a particular URL that was opened directly from the URL counter.
Figure 9H:
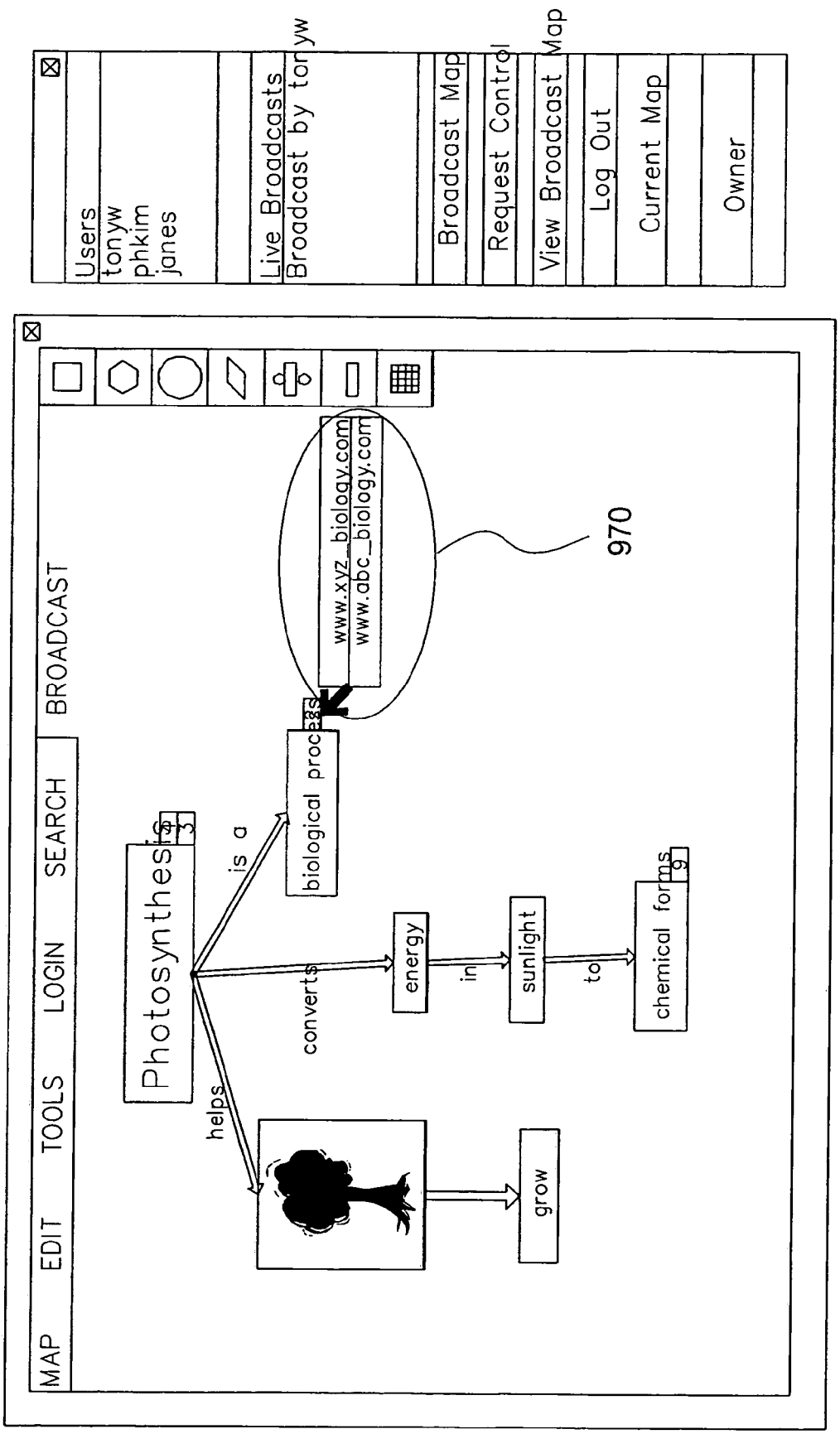
FIG. 9H illustrates file and URL counters on nodes in a semantic network and the list of URLs associated with the URL counter attached to the "biological process" node.

At 170, the number and file type of multimedia objects attached to each node is indicated. FIG. 9D illustrates counter 930 that appears on the side of node 935, indicating the number of files attached to that node. FIG. 9E illustrates that a separate counter at 940 appears on the side of node 945, indicating the number of URLs are attached to that node. Right-clicking on a particular counter will display a list of that counter's associated files or URLs, as illustrated at 950, 960, and 970 in FIGS. 9F, 9G, and 9H. Selecting a particular file or URL from the list opens the contents of that file or URL in a new window, as illustrated at 955 and 965 in FIGS. 9F and 9G.

4. Providing Shared View of Semantic Network

Figure 10:
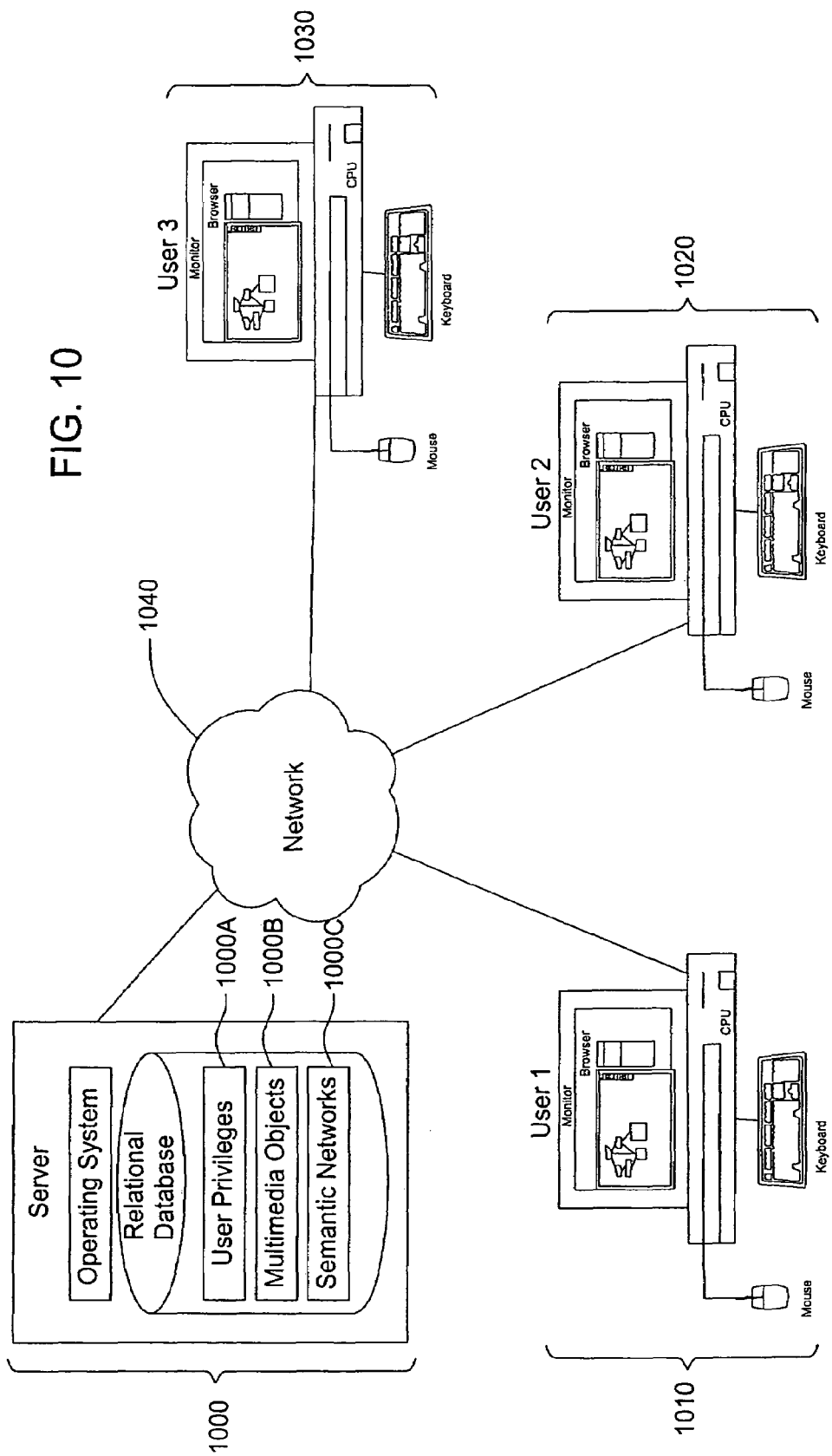
FIG. 10 illustrates a configuration that provides a shared view of the semantic network via a network.

At 180, users are provided with a shared view of the semantic network in a platform-independent software environment. An embodiment of the present invention is implemented to run in web browsers as a Java applet that communicates with a mySQL database and is accessible via any computer with J2SE 1.4.x installed. One example of a configuration for this shared view is illustrated in FIG. 10, discussed in further detail below in connection with FIG. 20.

B. Storing and Accessing Semantic Networks

Figure 2:
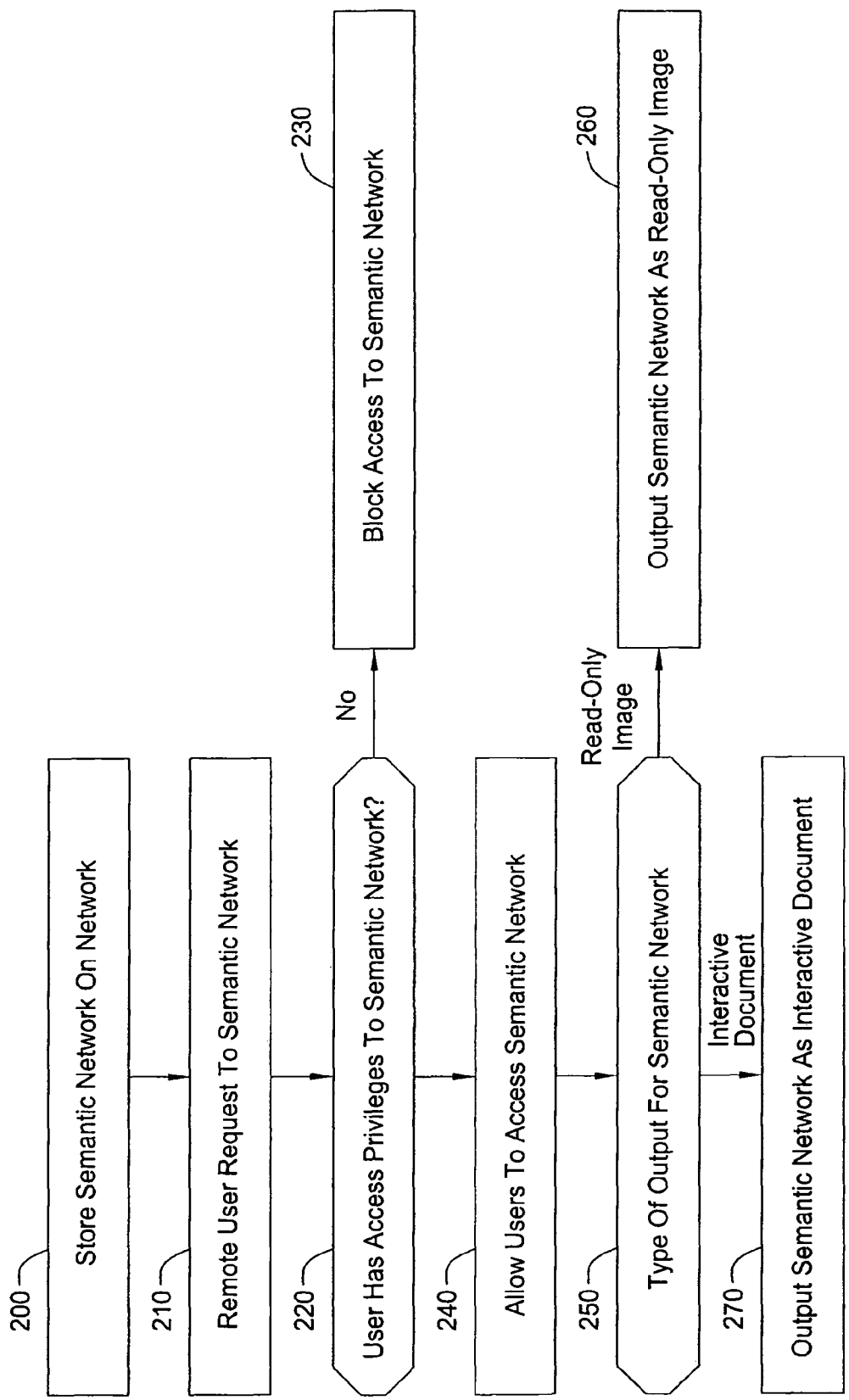
FIG. 2 is a flow diagram illustrating a method for storing and accessing semantic networks in accordance with a preferred embodiment of the present invention.

FIG. 2 is a flow diagram illustrating a method for storing and accessing semantic networks in accordance with a preferred embodiment of the present invention. Broadly, this process consists of: 1) storing the semantic network on a network; 2) granting access to a semantic network based on a set of user access privileges; and 3) outputting the semantic network in various formats.

1. Storing the Semantic Network on a Network

Figure 14:
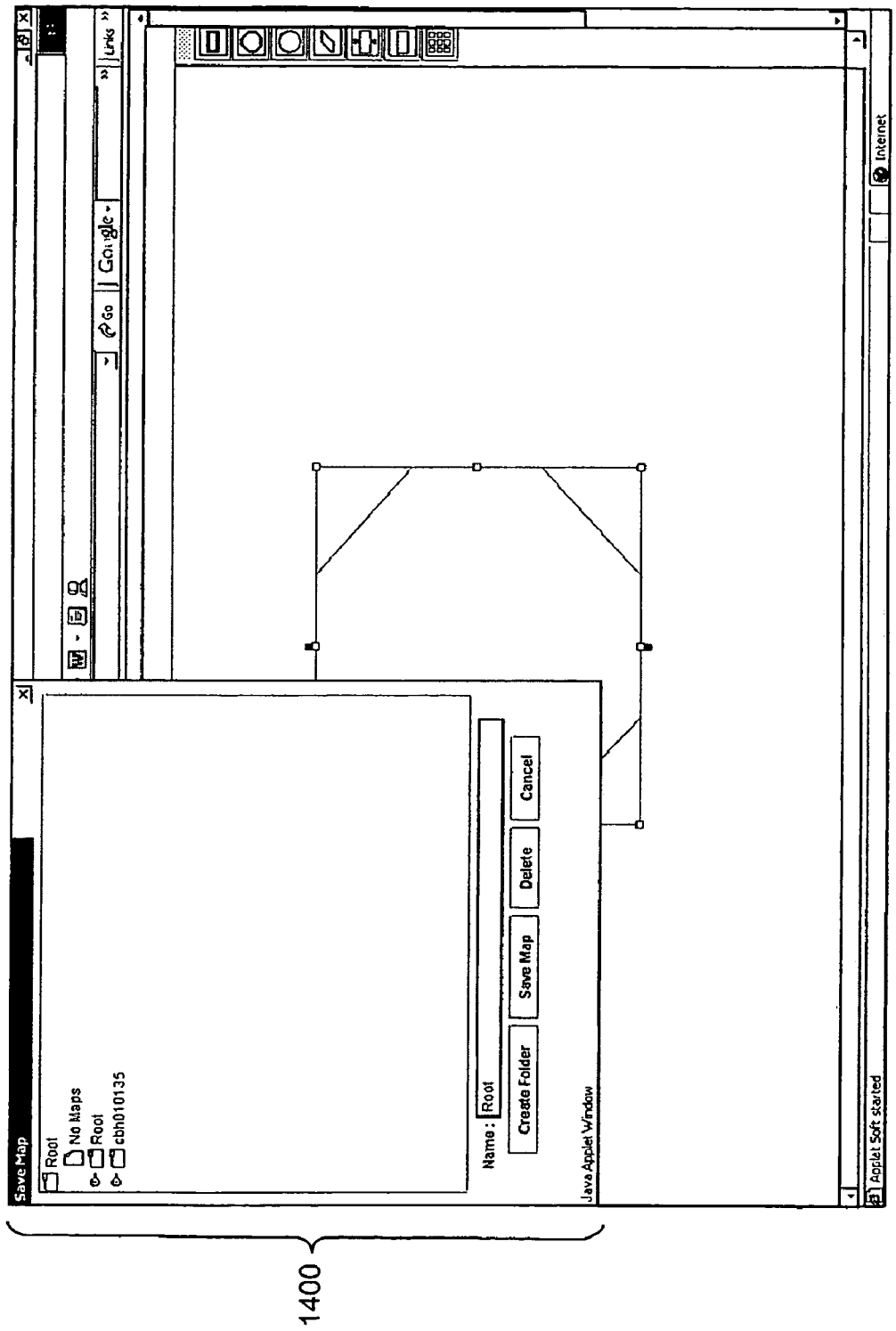
FIG. 14 illustrates saving a semantic network.
Figure 15:
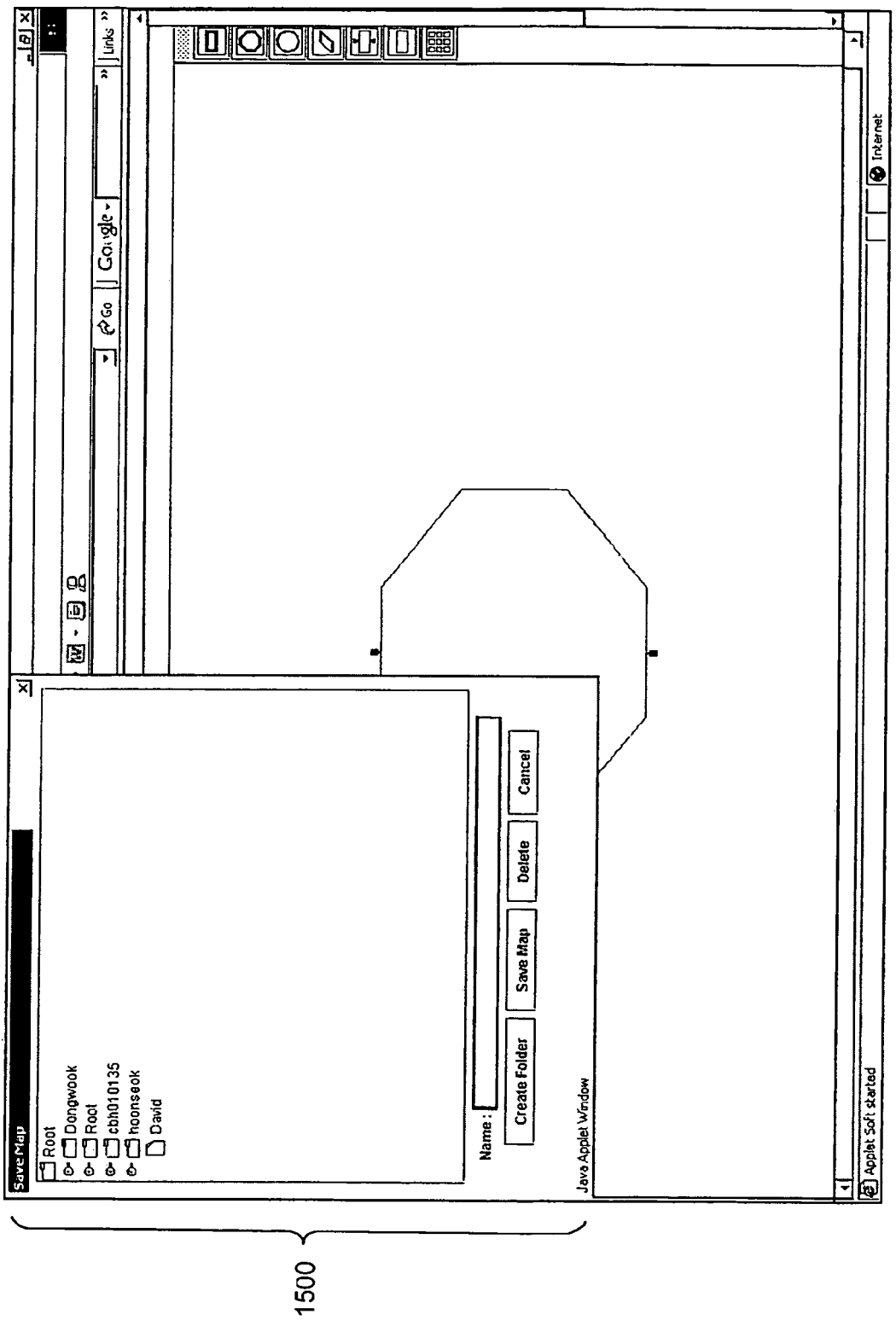
FIG. 15 illustrates opening a shared semantic network.

At 200, a user stores the semantic network by saving it to a remote location on the network. In one embodiment of the present invention, the semantic network is stored in a relational database. In a further aspect of this embodiment, a user can use the relational database to determine whether certain relationships are present within the semantic network. FIG. 14 illustrates another embodiment where the user selects standard save options found under the Map menu to store the semantic network. If the semantic network has already been saved before, selecting "Save Map" will save the map under its current name and file location. If the map has not been saved before, selecting "Save Map As" will bring up dialog box 1400 where the user can select where to save the map, creating new folders, if necessary. Users can open a saved map by selecting "Open Map" under the map menu. This opens window 1500 displaying a list of semantic networks that the user can select to open, as illustrated in FIG. 15.

Figure 16:
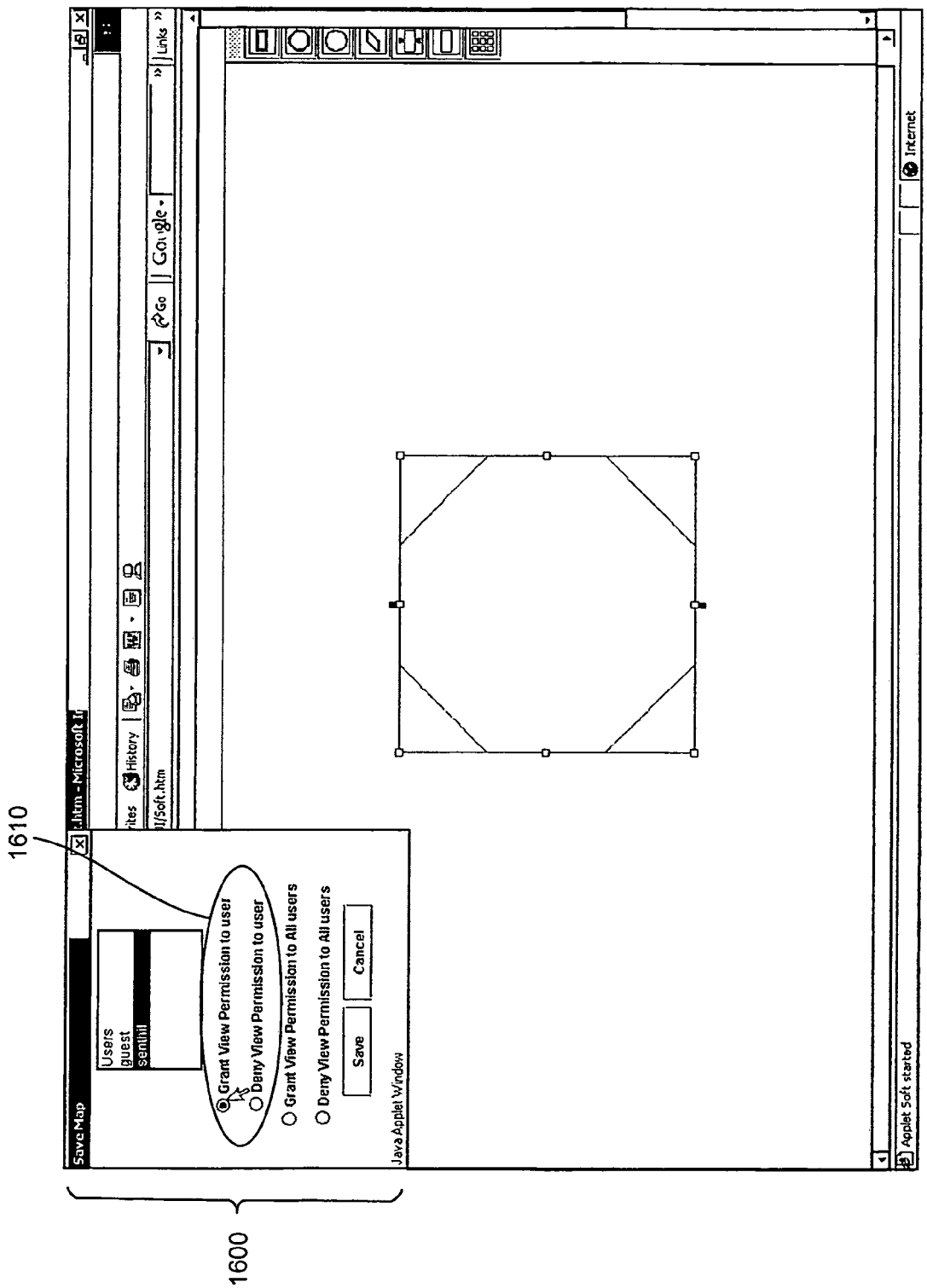
FIG. 16 illustrates granting view permissions to a specific user.
Figure 17:
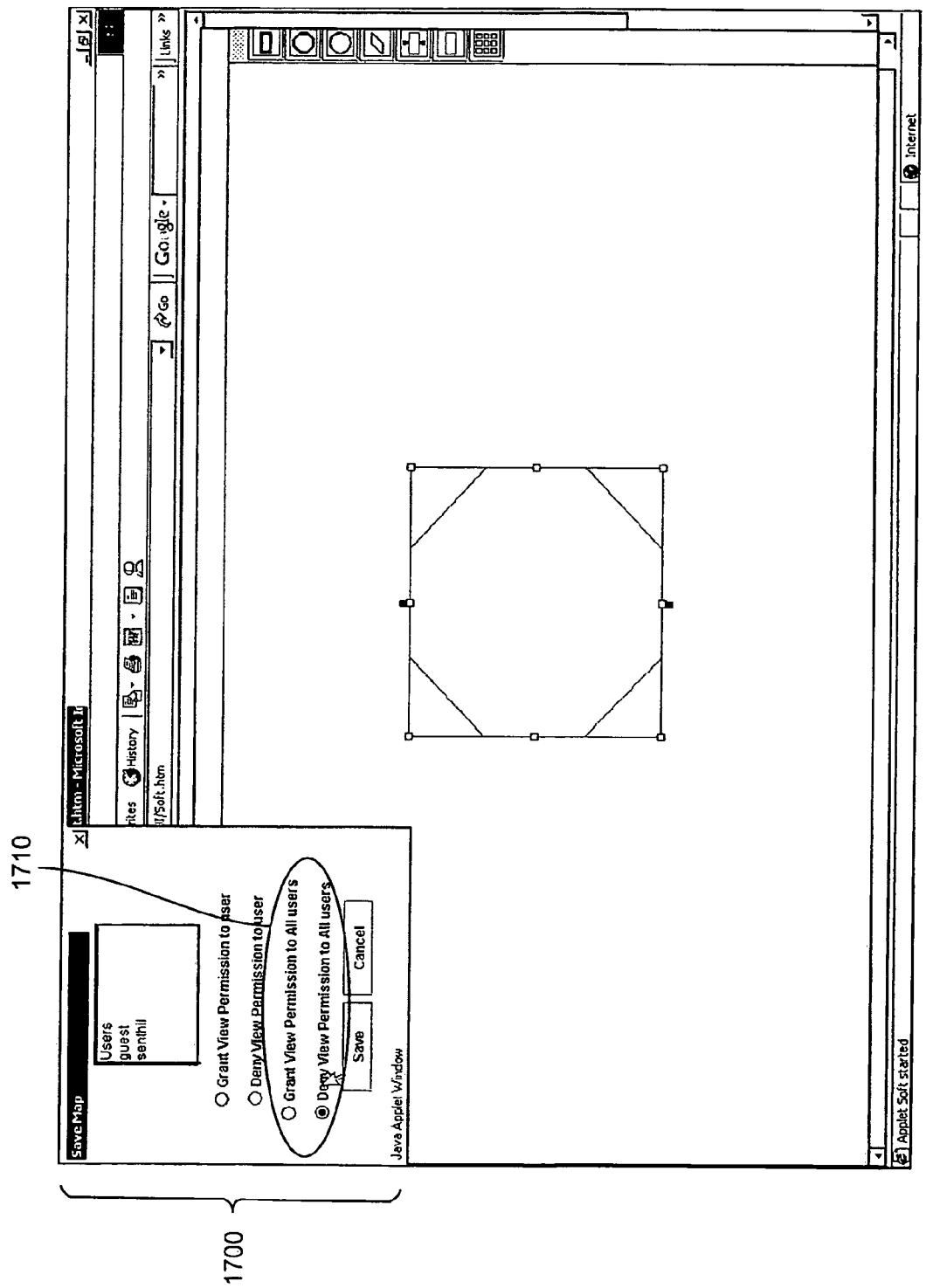
FIG. 17 illustrates denying view permission to all users.

2. Granting Access to a Semantic Network Based on a Set of User Access Privileges At 210 to 240, a set of user access permissions are used to determine whether a particular user can have access to a particular semantic network. A user can control who has access to view and/or modify the semantic network that the current user authored. Permission can be set globally or at the user-level. In an embodiment of the present invention, to set the view permissions for the currently open semantic network, a user selects "Set Access Permissions" from the Map menu. As illustrated in FIGS. 16 and 17, this brings up a separate window at 1600 and 1700 that allows the current user to grant or deny permissions to specific users at 1600, or grant or deny permission to all users at 1710. Shared semantic networks can be accessed by selecting the "Open Shared Maps" option under the Map menu which brings up a window displaying all shared semantic networks.

3. Outputting the Semantic Network in Various Formats

Figure 18:
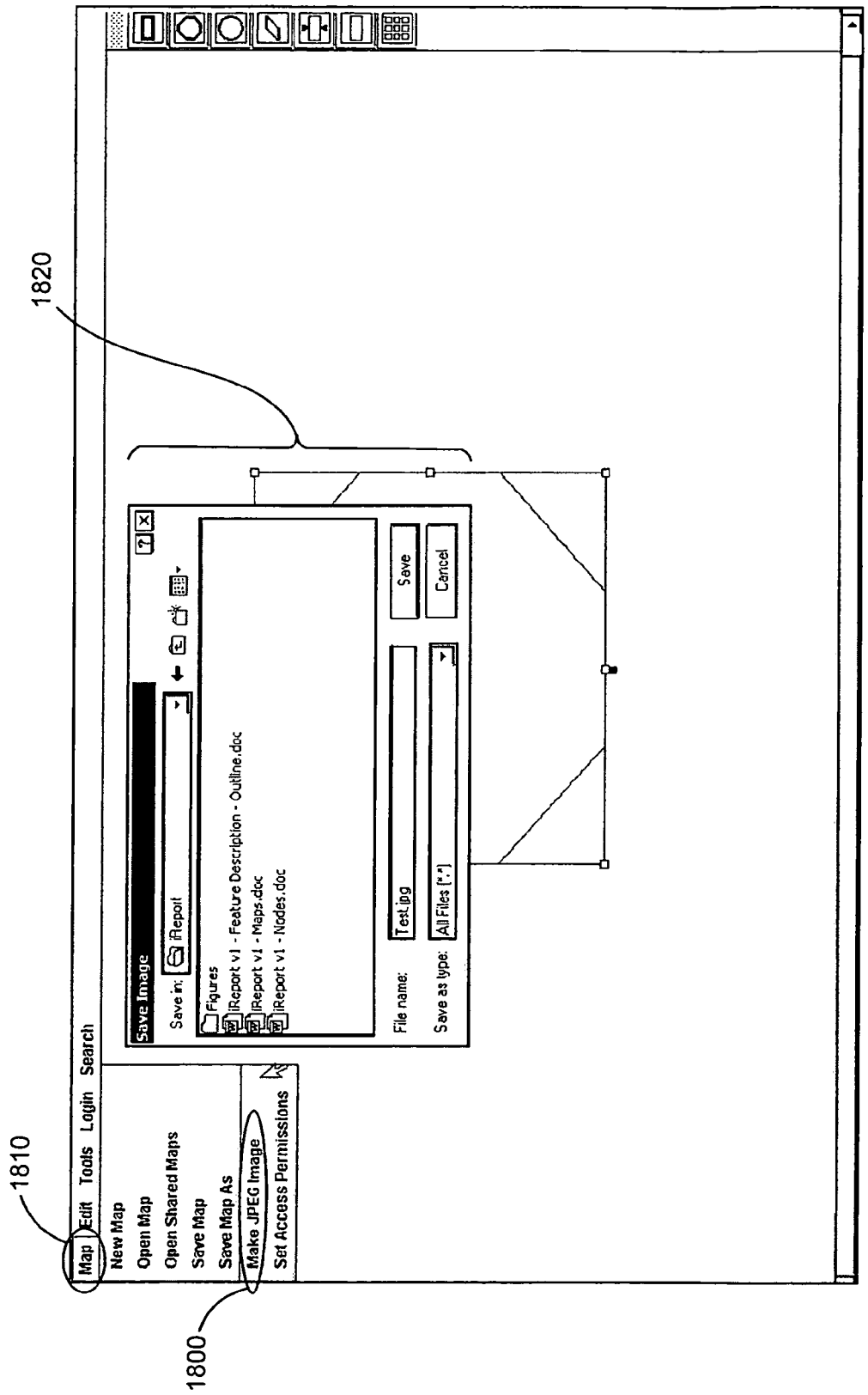
FIG. 18 illustrates saving a semantic network as a JPEG image file.
Figure 19:
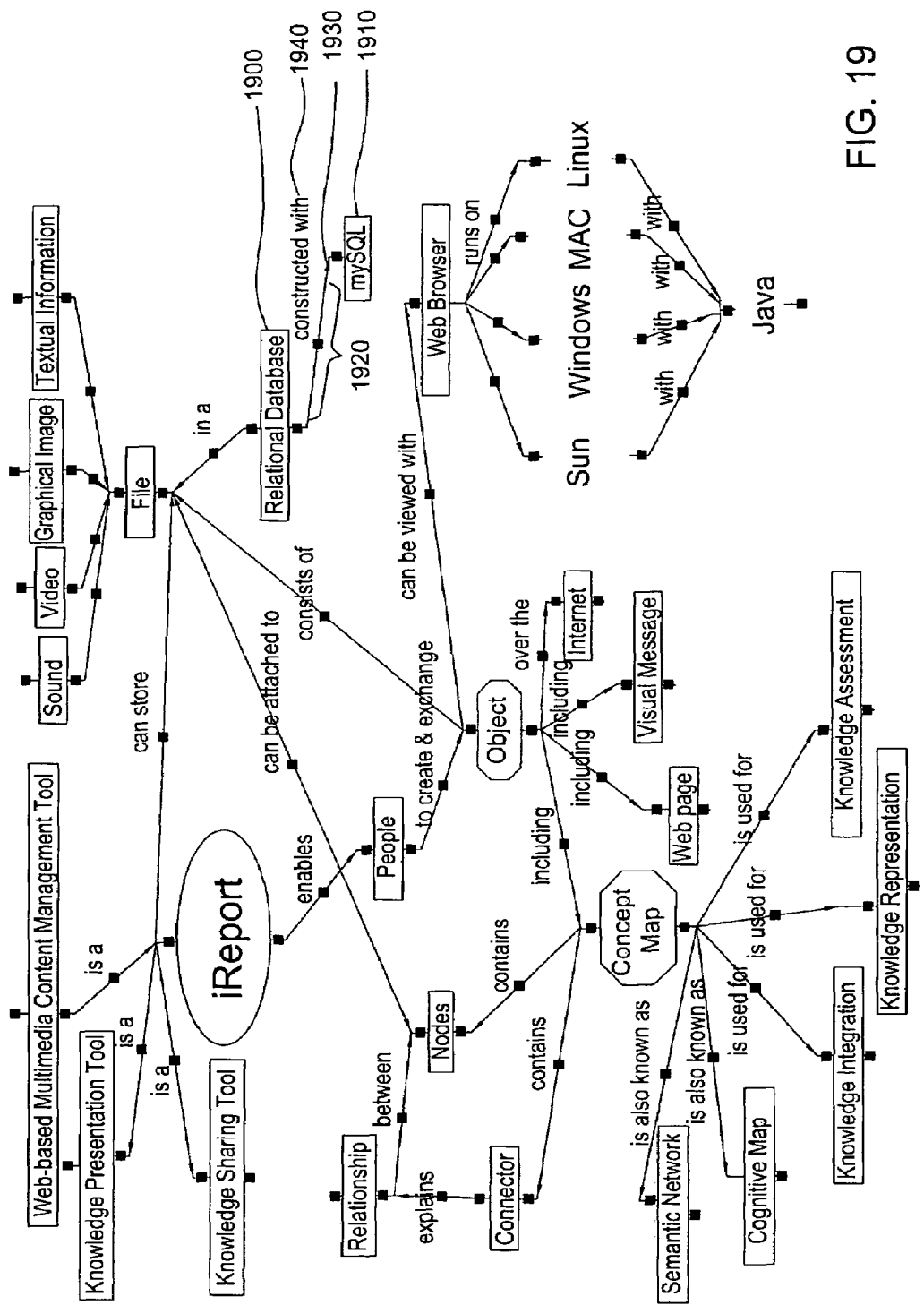
FIG. 19 illustrates a sample snapshot image of a semantic network.

At 250 to 270, the semantic network can be outputted in various formats. At 270, a user can output a semantic network as an interactive document. One example of this is to generate a unique URL for the semantic network. At 260, a user can also output a semantic network as a read-only image. One example of this is to save the semantic network as a JPEG image file, creating a visual snapshot of its contents. As FIG. 18 illustrates, a user can select "Make JPEG Image" option 1800 from the Map menu at 1810 which causes a separate window to appear at 1820 where the user can select the name and file location to save the image to. FIG. 19 illustrates a sample snapshot image of a semantic network made up of nodes and connections called semantic links. For example, node 1900 is connected to node 1910 by semantic link 1920 which includes pointer flag 1930 and label 1940 to define the relationship between these nodes.

C. Collaborative Authoring and Viewing

Figure 3:
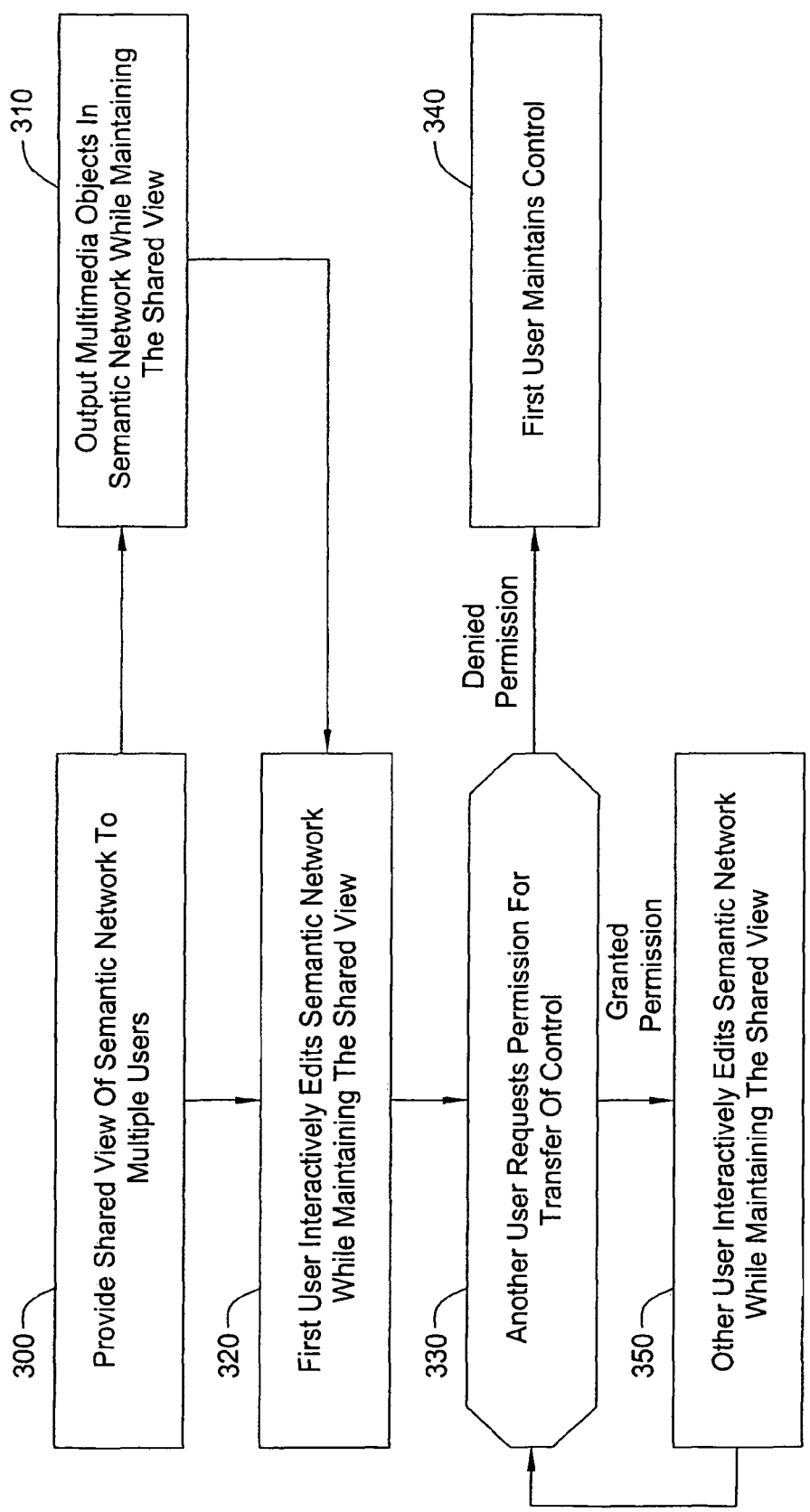
FIG. 3 is a flow diagram illustrating a method for collaboratively authoring and viewing a semantic network, including the multimedia objects within the semantic network in accordance with a preferred embodiment of the present invention.

FIG. 3 is a flow diagram illustrating a method for collaboratively authoring and viewing a semantic network, including the multimedia objects within the semantic network in accordance with a preferred embodiment of the present invention. This synchronous multi-casting feature enables a group of users to watch a semantic network while the author is constructing the semantic network real-time, and it allows a participant to take over control of the semantic network to permit collaborative authoring. Broadly, this process consists of: 1) providing a shared view of the semantic network to multiple users; 2) outputting multimedia objects in the semantic network while maintaining the shared view; 3) interactively editing the semantic network while maintaining the shared view; and 4) interactively transferring control of the semantic network among users.

1. Providing a Shared View of the Semantic Network

Figure 11:
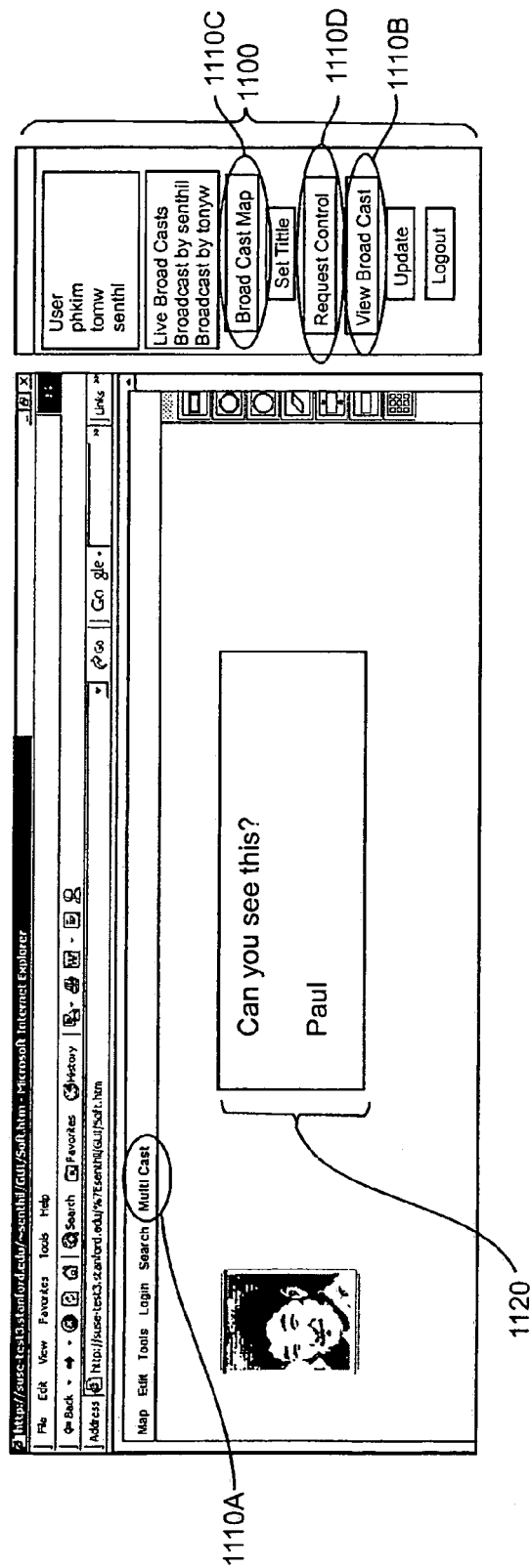
FIG. 11 illustrates a shared view of a semantic network or multimedia document which can be used for collaborative authoring.

At 300, a shared view of the semantic network is provided to multiple users in a platform-independent software environment. FIG. 11 illustrates an example of a this shared view: clicking "Multi-Cast" button 1110A on the general tool bar brings up a window on the right hand-side of the screen at 1100; clicking "Broadcast Map" button 1110C, makes the author's (in this case Paul's) semantic network viewable to other users during construction of the semantic network; another user (in this case Tony) at a different location, clicks on the equivalent of "Multi-Cast" button 1110A on the general tool bar which brings up a window like the one illustrated by at 1110A; then, Tony chooses Paul's broadcasting stream and clicks on the equivalent of "View Broadcast" button 1110B.

2. Outputting Multimedia Objects

Figure 12:
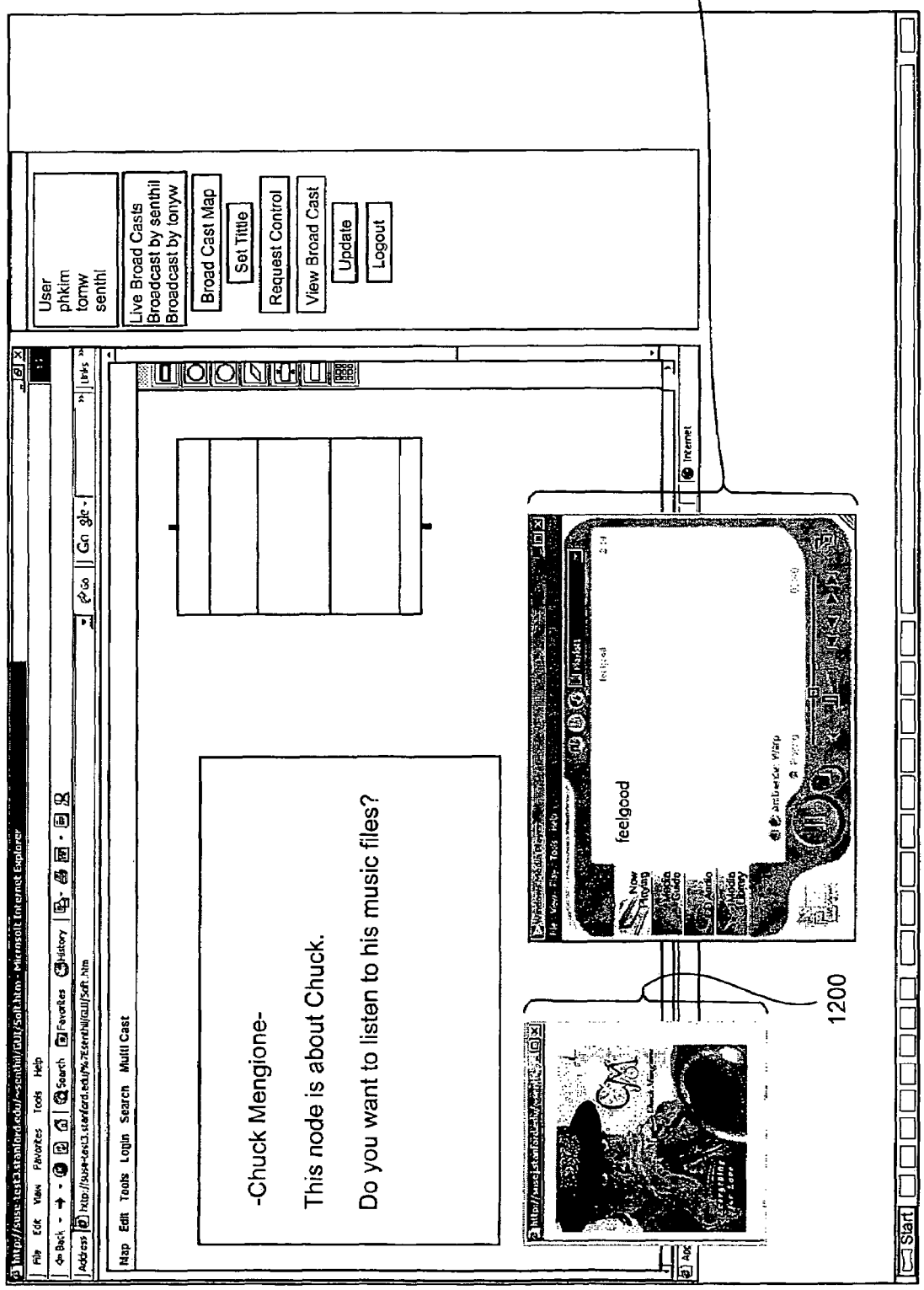
FIG. 12 illustrates a user's computer that invoked a browser window and Windows Media Player since the author accessed and opened a URL and MP3 file that were attached to a node in a semantic network or multimedia document.

At 310, multimedia objects, including but not limited to image files, audio files, and URLs, are outputted in the semantic network while maintaining the shared view. When a user is providing a shared view of a semantic network and accesses and opens a multimedia object, the other users also listen and/or view the multimedia objects. In an embodiment of the present invention, the other users can only do so if they have applications that will handle the resources being accessed and opened by the author. For example, if the author accesses and plays an MP3 file, the other users' computers will invoke an application such as WinAmp or Windows Media Player to play the MP3 file. FIG. 12 illustrates a user's computer that invoked a browser window at 1200 and Windows Media Player at 1210 since the author accessed and opened a URL and MP3 file that were attached to a node in a semantic network.

3. Interactively Editing the Semantic Network

At 320, the author interactively edits the semantic network while maintaining the shared view. This includes creating and manipulating nodes, creating and defining semantic links, and attaching multimedia objects to nodes.

4. Interactively Transferring Control of the Semantic Network

Figure 13A:
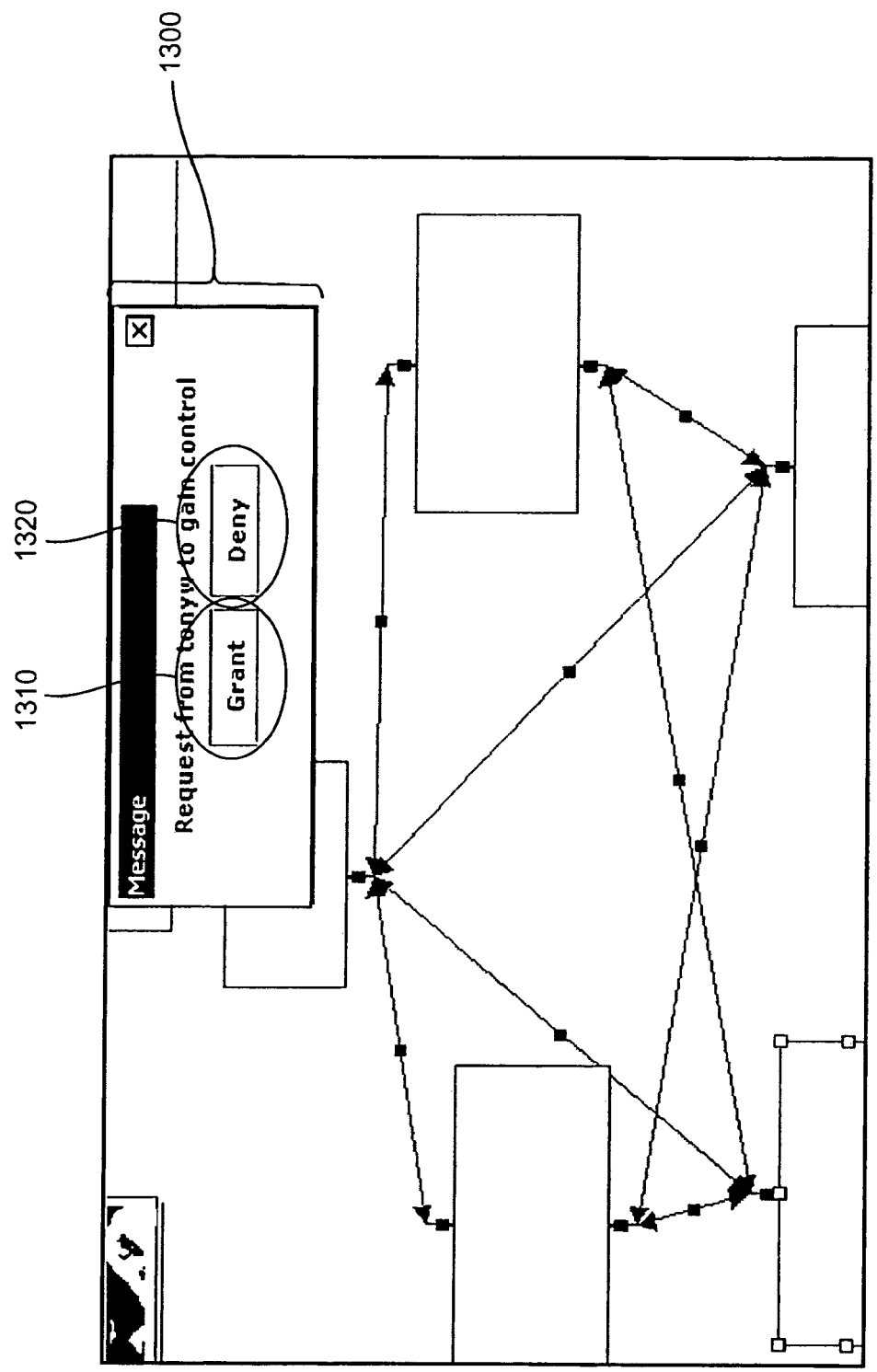
FIG. 13A illustrates a request to transfer control of the semantic network or multimedia document to another user.
Figure 13B:
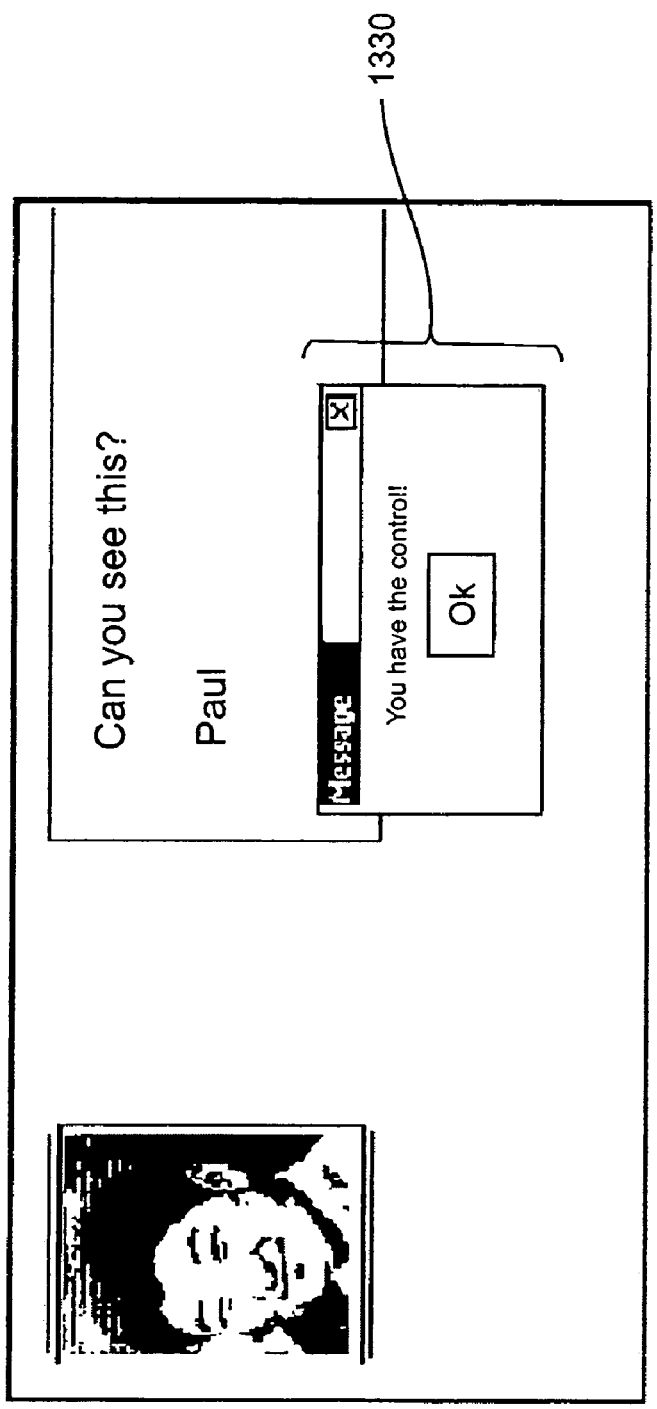
FIG. 13B illustrates the confirmation of a transfer of control of the semantic network.

At 330-350, the author may elect to transfer control of the semantic network to allow for collaborative authoring. FIGS. 11, 13A, and 13B illustrate an example of how control can be transferred. When a user other than the author (in this case Tony), clicks on "Request Control" button 1110D in FIG. 11, the author (in this case Paul) sees a pop-up screen as shown at 1300 in FIG. 13A. FIG. 13A displaying a message asking Paul to transfer control to Tony. Once Paul grants permission by clicking on "Grant" button 1310 in FIG. 13A, Tony will have control and Paul will view what Tony does on Paul's map. FIG. 13B illustrates the pop-up screen at 1330 which appears on Tony's screen showing that Tony now has control. If Paul denies permission by clicking on "Deny" button 1320 in FIG. 13A, Paul will maintain control. During a single session, control may be transferred several times to enhance the collaborative nature of the authoring process.

5. Example of a Network of Electronic Devices

FIG. 10 provides an example of a network of electronic devices for practicing the preferred embodiments herein. Workstations 1010, 1020, and 1030 are connected to each other and Server 1000 through Network 1040 which can be a private network or public network (e.g., the Internet). Server 1000 contains User Privileges at 1000A, Semantic Networks at 1000C, and Multimedia Objects at 1000B.

Figure 20:
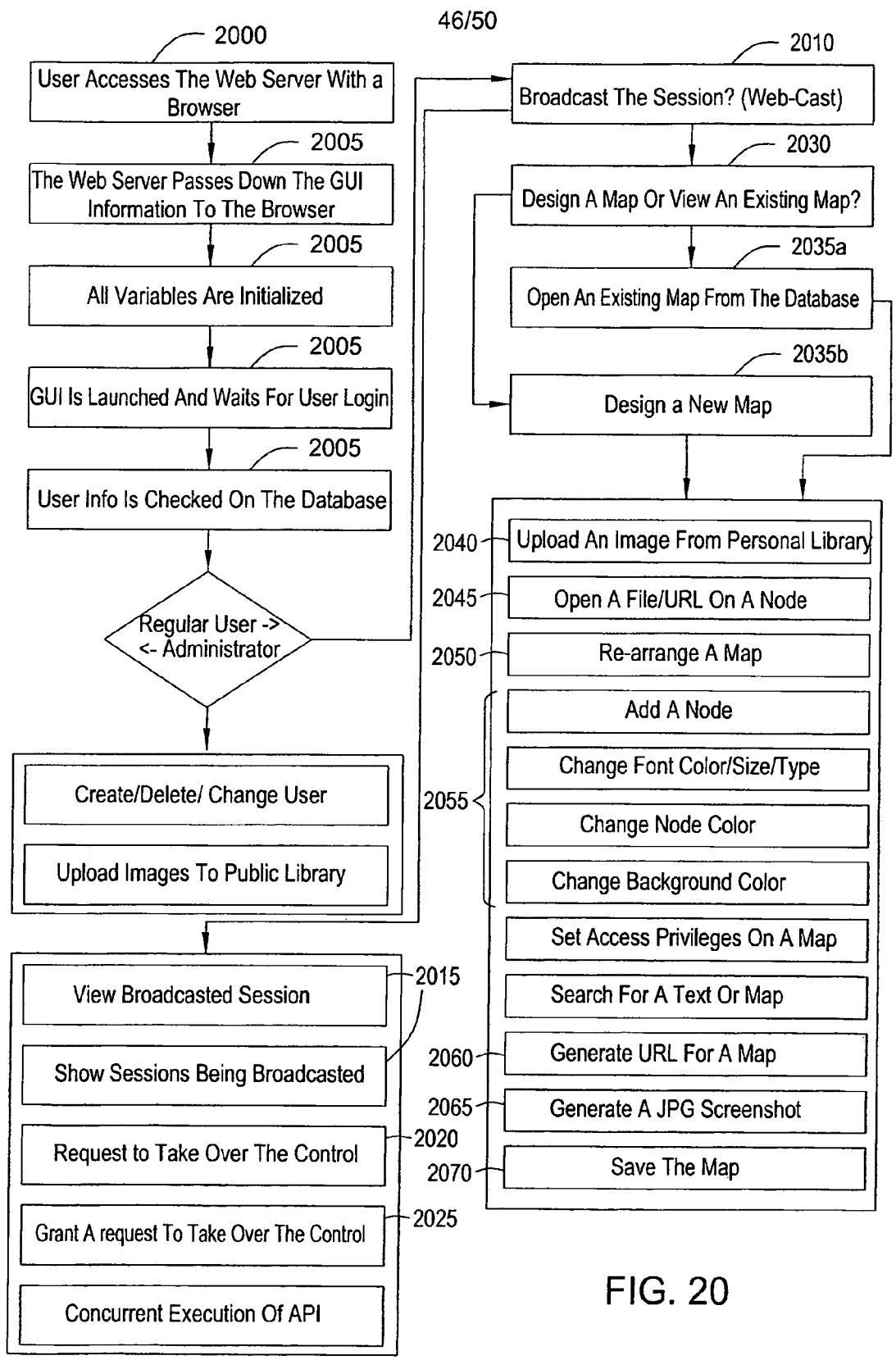
FIG. 20 illustrates a flow diagram outlining tasks that can occur in the preferred embodiment.

FIG. 20 is a flow diagram outlining tasks that can occur in the preferred embodiment and can be used to further explain the interaction of Workstation 1010, Workstation 1020, Workstation 1030, and Server 1000 in FIG. 10. For example, at 2000, Workstation 1010 access Server 1000 using a browser. At 2005, Server 1000 checks User Privileges 1000A to determine whether the user at Workstation 1010 is authorized. If the user at Workstation 1010 is authorized, Server 1000 grants access to use the system.

At 2010-2025, a collaborative authoring option is enabled to allow multiple workstation to view and/or edit the semantic network. At 2010, the Workstation 1010 provides a shared view to Workstations 1020 and 1030 by electing to broadcast the session. At 2015, Workstations 1020 and 1030 opt to view the session being authored at Workstation 1010. At 2020, Workstation 1020 requests control of the session from Workstation 1010. At 2025, Workstation 1010 grants this requests, which transfers control of the session to Workstation 1020.

At 2030, Workstation 1020 decides whether to design a new semantic network or to open an existing semantic network from the database. At 2035A, Workstation 1020 opts to open an existing semantic network from the database, and so Workstation 1020 accesses Server 1000 to do so. Server 1000 checks User Privileges 1000A to determine whether Workstation 1020 has valid access privileges; if so, Server 1000 grants access to Workstation 1020 to open the desired semantic network stored on Server 1000 at 1000B. Instead of opening an existing semantic network, Workstation 1020 could have opted to design a new map at 2035B.

At 2045 to 2055, Workstation 1020 interactively edits the existing semantic network. This process appears simultaneously on the screens of Workstations 1020, 1010, and 1030. At 2045, Workstation 1020 opens a file attached to a node as illustrated in FIGS. 9A-9C. At 2050, Workstation 1020 rearranges the nodes on the semantic network as illustrated in FIGS. 5K and 5L. At 2020, Workstation 1030 now requests control of the semantic network from Workstation 1020. Workstation 1020 denies this request, and so Workstation 1020 maintains control. At 2055, Workstation 1020 creates and manipulates a new node as well as changes the background color of the semantic network as illustrated in FIGS. 5A-5J.

Next, Workstation 1020 decides that it would like to attach a multimedia object, in this case, an image to this new node. At 2040, Workstation 1020 accesses Server 1000 to find an appropriate multimedia object from 1000C. In this case, Workstation 1020 would like to access an image from a personal image library as illustrated in FIGS. 8A and 8B. Server 1000 checks to ensure that Workstation 1020 has the correct access privileges at 1000A, and if so, grants access to Workstation 1020's personal image library. Workstation 1020 selects an appropriate image and attaches it to the node as illustrated in FIG. 8B.

At 2060-2070, Workstation 1020 stores the semantic network on Server 1000 in several ways, as illustrated in FIG. 2. At 2070, Workstation 1020 saves the semantic network by storing the saved version at 1000B in Server 1000. At 2060, Workstation 1020 generates a URL associated with the semantic network which is stored on Server 1000. At 2065, Workstation 1020 generates a snapshot image of the semantic network in a JPEG file which is stored on Server 1000.

D. Collaborative Authoring of Multimedia Documents

FIG. 4 is a flow diagram illustrating a method for collaboratively authoring multimedia documents in a platform-independent software environment in accordance with a preferred embodiment of the present invention. This method is similar to the methods relating to semantic networks; however, it involves any type of multimedia document rather than a semantic network. At 400, a shared view of the multimedia document is provided to multiple users via a network in a platform-independent software environment. FIG. 11 illustrates a shared view of a multimedia document for collaborative authoring. For example, at 1120, the author (in this case Paul) has entered text which is also displayed on another user's (in this case Tony) screen. At 410, the author interactively edits the multimedia document while maintaining the shared view. At 420 to 440, the author may elect to transfer control of the multimedia document to allow for collaborative authoring. FIGS. 11, 13A, and 13B illustrate an example of how control can be transferred. A user other than the author can request a transfer of control by click on "Request Control" button 1110D in FIG. 11. If the author denies permission to transfer control by clicking "Deny" button 1320 in FIG. 13A, the author maintains control. If the author grants permission by clicking "Grant" button 1310 in FIG. 13A, control is transferred to another user. FIG. 13B illustrates the pop-us screen at 1330 which appears on the other user's screen showing that such user now has control. During a single session, control may be transferred several times to enhance the collaborative nature of the authoring process.

At 450, a user selects multimedia objects from remote location on the network. At 460-480, a user accesses the multimedia objects, if the user has access privileges to do so, and then includes the multimedia objects in the multimedia document. At 490, the multimedia objects are outputted in the multimedia document while maintaining the shared view. FIG. 12 illustrates a user's computer that invoked a browser window at 1200 and Windows Media Player at 1210 since the author accessed and opened a URL and MP3 file that were attached to a multimedia document.

Similar to semantic networks: 1) multimedia documents can be stored at a remote location on the network, 2) access to the multimedia documents can be controlled by a set of user access permissions; and 3) multimedia documents can be outputted in various formats including interactive documents and read-only images.

E. Linking Semantic Networks

In some embodiments, it may be desirable to link semantic networks. For example, the multimedia object attached to a node may comprise a hyperlink to all or part of another semantic network. This makes it easier for users or viewers to recognize other semantic networks as valuable or helpful, where the "value" of a semantic network increases as it is linked to by other semantic networks.

Figure 21:
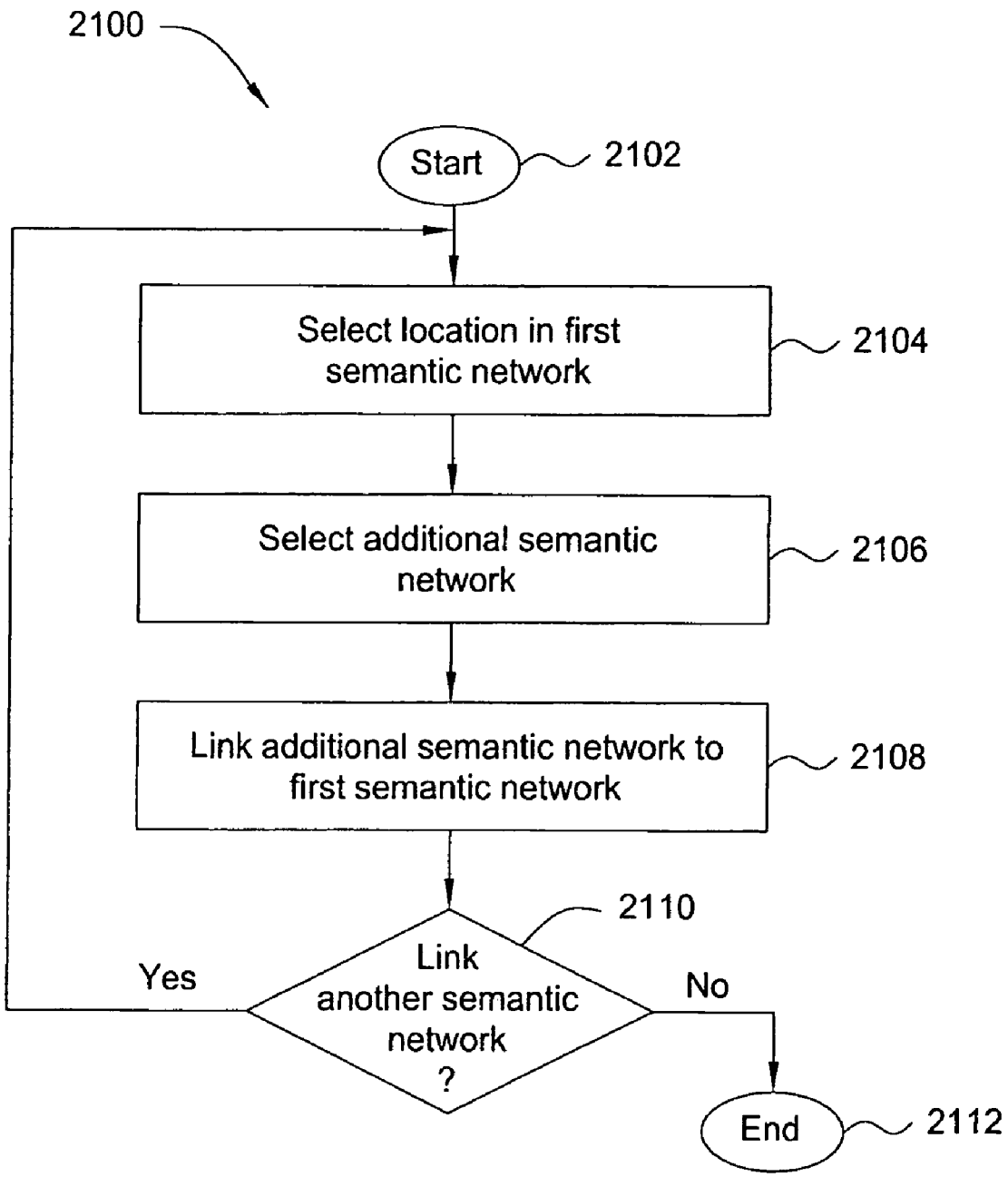
FIG. 21 is a flow diagram illustrating one embodiment of a method for linking semantic networks.

FIG. 21 is a flow diagram illustrating one embodiment of a method 2100 for linking semantic networks. The method 2100 may be implemented, for example, within a first semantic network, where the author of the first semantic network wishes to link the first semantic network to at least one other semantic network.

The method 2100 is initialized at step 2102 and proceeds to step 2104, where the method 2100 selects a location in the first semantic network to which to link an additional (second) semantic network. In one embodiment, the location is a node within the first semantic network, the selected node being a node to which the author wishes to attach the additional semantic network (e.g., as a multimedia object). In another embodiment, the selected location is a URL within the first semantic network. In a further embodiment, the author may wish to attach more than one other semantic network to the selected location.

In step 2106, the method 2100 selects the additional semantic network. The second semantic network may be selected, for example, by browsing a list of semantic networks that are available for linking.

In step 2108, the method 2100 attaches or links the additional semantic network to the selected node or location within the first semantic network. This may be accomplished, for example, by clicking a button on a graphical user interface. In one embodiment, selection of the semantic network automatically grabs the URL of the selected semantic network and generates a hyperlink thereto.

In step 2110, the method 2100 determines whether any other semantic networks should be linked to the first semantic network. If the method 2100 concludes in step 2110 that another semantic network should be linked to the first semantic network, the method 2100 returns to step 2104 and selects another node within the first semantic network to which to link the next semantic network. The method 2100 then proceeds as described above to attach another semantic network to the selected node. In one embodiment, the selected node is the same node originally selected (i.e., more than one other semantic network may be linked to a single node in the first semantic network). Alternatively, if the method 2100 concludes in step 2110 that no more semantic networks should be linked to the first semantic network, the method 2100 terminates in step 2112.

The method 2100 therefore enables an author of a semantic network to link to other semantic networks, for example through nodes (where the linked-to semantic networks are attached as multimedia objects). This allows an author to create subsets of semantic networks within larger semantic networks (e.g., similar to the way in which secondary World Wide Web pages may be linked to a common "home page"). Thus, interlinked semantic networks may be used to build a knowledge base. As described above, this makes it easier for users or viewers to recognize other semantic networks as valuable or helpful, where the "value" of a semantic network increases as it is linked to by other semantic networks.

F. Rating and Tagging Semantic Networks

In some embodiments, a semantic network includes a rating feature that allows users or viewers to rate the semantic network (e.g., in terms of the semantic network's value or helpfulness). Thus, the rating feature functions as a means of peer review.

Figure 22:
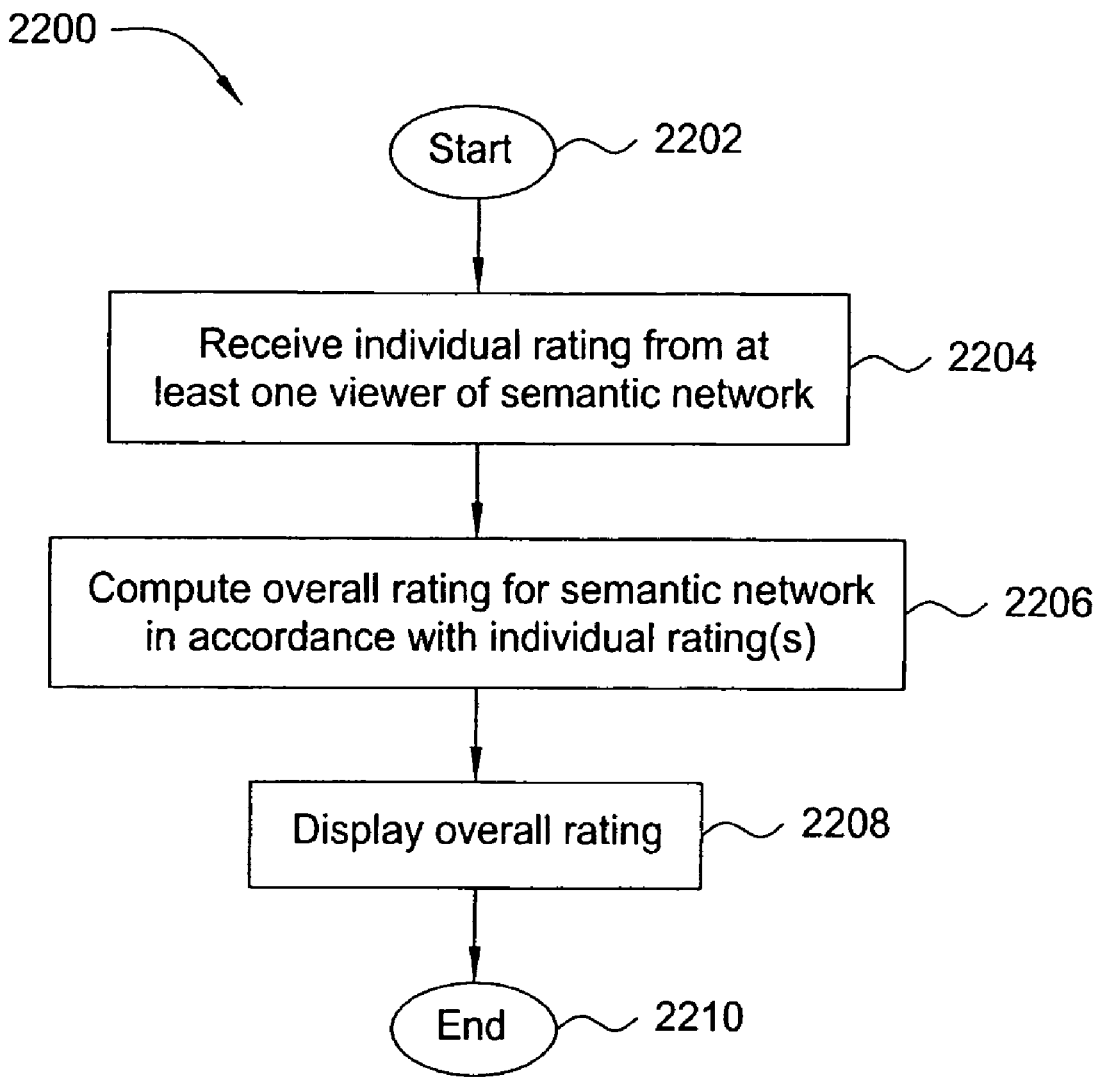
FIG. 22 is a flow diagram illustrating one embodiment of a method for rating a semantic network.

FIG. 22 is a flow diagram illustrating one embodiment of a method 2200 for rating a semantic network. The method 2200 may be implemented, for example, at a semantic network in order to establish a rating that users or viewers can view in order to ascertain a measure of the semantic network's potential value.

The method 2200 is initialized at step 2202 and proceeds to step 2204, where the method 2200 receives an individual rating from at least one user or viewer of the semantic network. For example, the individual rating may comprise a scaled value, where the user or viewer is asked to rate the semantic network on a scale from one to x. In another embodiment, the individual rating comprises a "tag" (i.e., metadata associated with the semantic network, such as keywords or other text). In another embodiment still, the individual rating comprises a hyperlink to the semantic network that is created by another user (i.e., a user other than the author of the semantic network). In one embodiment, only users or viewers within a community relevant to the subject matter of the semantic network are asked to provide a rating of the semantic network, so that the ratings reflect some measure of expertise relative to the given subject matter.

In step 2206, the method 2200 computes an overall rating, R, for the semantic network, accounting for the at least one individual rating received in step 2204. In one embodiment, the overall rating is computed as the average of all of the received individual ratings. In another embodiment, the overall rating is computed as a percentage of people in a relevant group (e.g., relevant to subject matter with which the semantic network is at least partially concerned) that link to the semantic network (e.g., "sixty percent of group X link to this semantic network").

In a further embodiment still, the overall rating for the semantic network accounts for respective ratings of the individuals who have rated the semantic network. That is, a rating given to the semantic network is partially weighted in accordance with an author rating (AR) of the individual providing the rating. Additionally, the overall rating for the semantic network may account for an average rating of other semantic networks authored by the author of the semantic network.

A user's author rating (AR) is simply the mean of the scores or ratings earned by the user's contributions to the semantic network system. For example, if User A has authored three semantic networks in the system, and Map 1 has an overall rating of 7 (on a scale of 1-10), Map 2 has an overall rating of 8 and Map 3 has an overall rating of 9, whereas User's A's author rating is 8. When User A in turn provides an evaluation rating (ER) of User B's semantic network, the evaluation rating is weighted by User A's author rating. Thus, in this embodiment, the overall individual rating (IR) for User B's semantic network (i.e., the overall rating of the semantic network as rated by others users) can be expressed as:

$$IR = \frac{\sum_{i=1}^{n}(AR_i)(ER_i)}{\sum_{i=1}^{n}AR_i} \quad (\text{EQN. 1})$$

where n is the total number of other users providing evaluation ratings for the given semantic network. The author rating of an individual providing a rating is a significant factor in the overall rating, because an evaluation by an expert with a credible level of relevant expertise should be considered more reliable than an evaluation by an individual with less expertise.

To calculate an overall ranking, R, for the semantic network, where the overall ranking accounts not just for the overall individual rating (IR), but also for the author rating of the semantic network's author (i.e., an overall ranking of the author's other semantic networks), one can then calculate:

$$R = \frac{IR + AR + \text{Relevancy}}{3} \quad (\text{EQN. 2})$$

where the relevancy of the semantic network is defined as the mean of the linkage rate (i.e., the percentage of the relevant domain that links to the semantic network). Since a semantic network is a schema representative of a knowledge domain, knowledge is not considered knowledge unless it has relevancy to a community of domain experts and unless the knowledge is rated by this community. Thus, the embodiment represented by EQN. 5 considers author rating, overall individual rating and linkage rate as important factors in contributing to the overall rating of a semantic network.

Referring back to FIG. 22, in step 2208, the semantic network displays the calculated overall rating in a visible manner, so that users or viewers can easily ascertain the semantic network's rating. In one embodiment, the overall rating of a semantic network is visibly conveyed by modifying at least one of: a node in the semantic network, a semantic link in the semantic network, a hyperlink in the semantic network, one or more fonts used in the semantic network or one or more colors used in the semantic network. For example, the color of a node in the semantic network that is attached to a multimedia object may be increased (or decreased) to reflect an increased (or decreased) rating of the multimedia object. The method 2200 then terminates in step 2210.

As described above, the method 2200 allows users, such as users within a relevant community, to rate a given semantic network so that others can quickly ascertain a measure of the semantic network's value or usefulness. This allows users or viewers to quickly access information at different levels of specificity within the semantic network. Thus, the understanding or prior knowledge of the semantic network that is required to process the information therein is reduced. Such methods may also aid in peer review of semantic networks, for example, where tags could be utilized to convey feedback (e.g., comments, suggestions, etc.) to the author of the semantic network.

G. Group Building

In some embodiments, it is possible to build communities or groups within a semantic network. Membership in such a group may be public (i.e., anyone can join) or private (i.e., membership by invitation or password only). In some embodiments, where group membership is private, a mechanism may be in place for prospective new members of a group to apply for or request membership.

Thus, the present invention may be implemented, for example, within an educational or corporate environment, in order to organize and share knowledge among a plurality of users.

H. Graphical User Interface

A graphical user interface for displaying and/or building a semantic network in accordance with the present invention may be implemented in a variety of manners.

Figure 24:
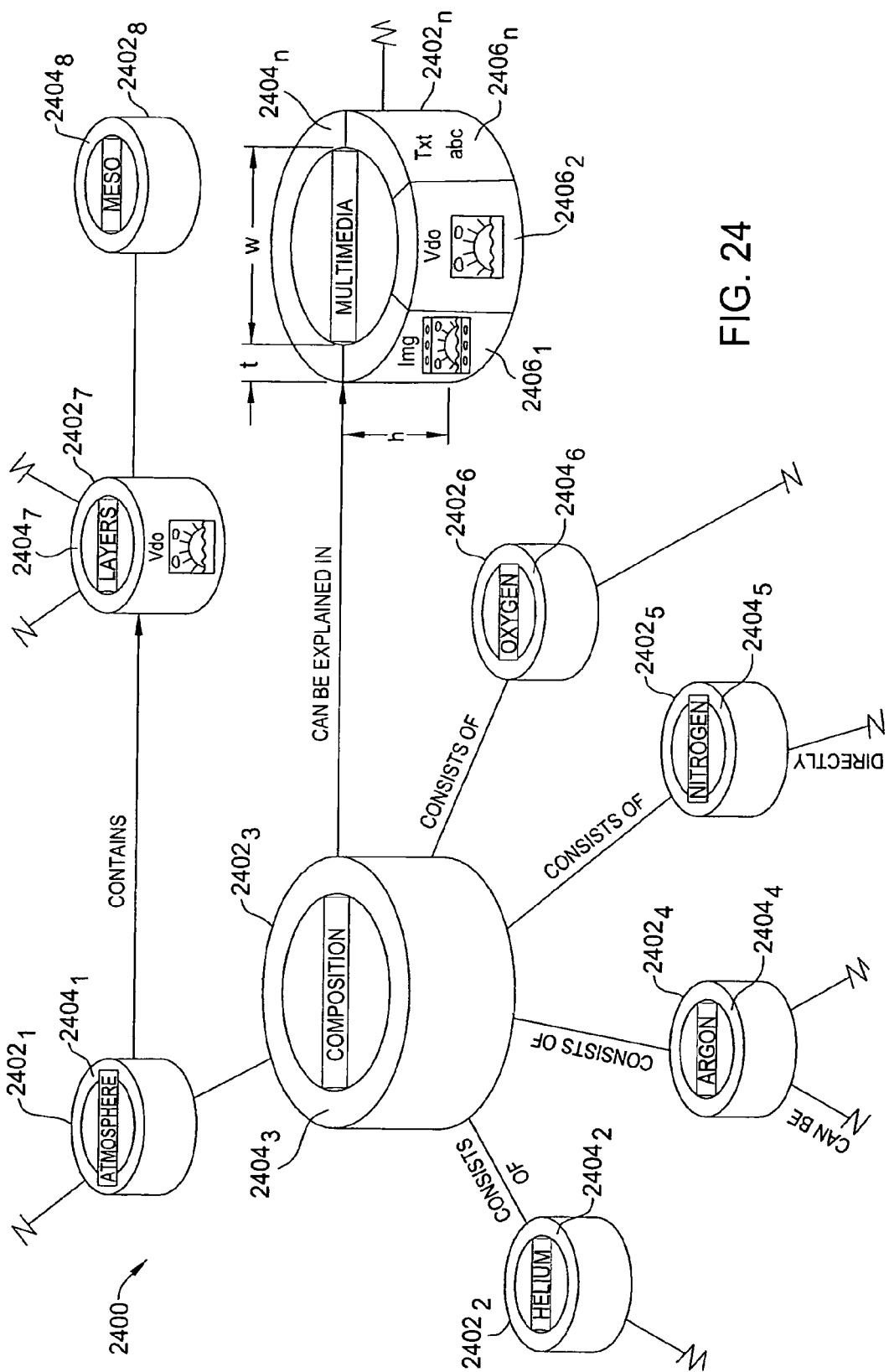
FIG. 24 is a schematic diagram illustrating an exemplary semantic network.

FIG. 24, for instance, is a schematic diagram illustrating an exemplary semantic network 2400. As illustrated, the semantic network 2400 comprises a plurality of nodes $2402_1$-$2402_n$ (hereinafter collectively referred to as "nodes 2402"). In the embodiment illustrated in FIG. 24, nodes 2402 that are associated with a common group, topic or domain are depicted in the same color (e.g., where the color is applied to all or part of the node 2402). In one embodiment, gradations of this color can be used to depict the relative relevancy to the group, topic or domain (e.g., where a darker shade of the color indicates a greater degree of relevancy).

In one embodiment, each node 2402 includes a border $2404_1$-$2404_n$ (hereinafter collectively referred to as "borders 2404"). In one embodiment, a node's border 2404 is positioned around the perimeter of the node. In one embodiment, a thickness, t, of the border 2404 indicates a number of links originating from the associated node 2402. For example, the thickness, t, may increase with the number of links originating from the associated node. In a further embodiment, the border 2402 may be divided into sections $2406_1$-$2406_n$ (hereinafter collectively referred to as "sections 2406"), where each section is associated with a multimedia file attachment (e.g., text, images, video, sound files, etc.) attached to the node 2402. In this embodiment, selecting (e.g., by clicking on) a given section 2406 will open the attached multimedia file. In one embodiment, an icon depicted in a section 2406 indicates the file type of the content attached to the section 2406.

In one embodiment, a width, w (or diameter), of a node 2402 indicates a number of files attached to the node 2402. For example, the width, w, of the node 2402 may increase with the number of files attached to the node 2402.

In one embodiment, a height, h, of a node indicates a user rating of the files or contents associated with the node 2402. For example, the height, h, of the node 2402 may increase with the value of the associated content (as rated by other users).

In one embodiment, any of the visualization effects associated with the graphical user interface (e.g., node color, border thickness, node height, sections, file type icons, etc.) can be turned off, individually or in combination with all other visualization effects. For example, if a user turns off the node height feature, but leaves all other visualization effects in place, all nodes 2402 will be shown as flat, two-dimensional nodes with the rest of the visualization features remaining. In this embodiment, sections 2406 and file type icons are depicted below the associated node 2402. In a further embodiment still, all nodes have a default setting for the visualization effects (e.g., default node color A and default node height x).

I. Computer Readable Media

Figure 23:
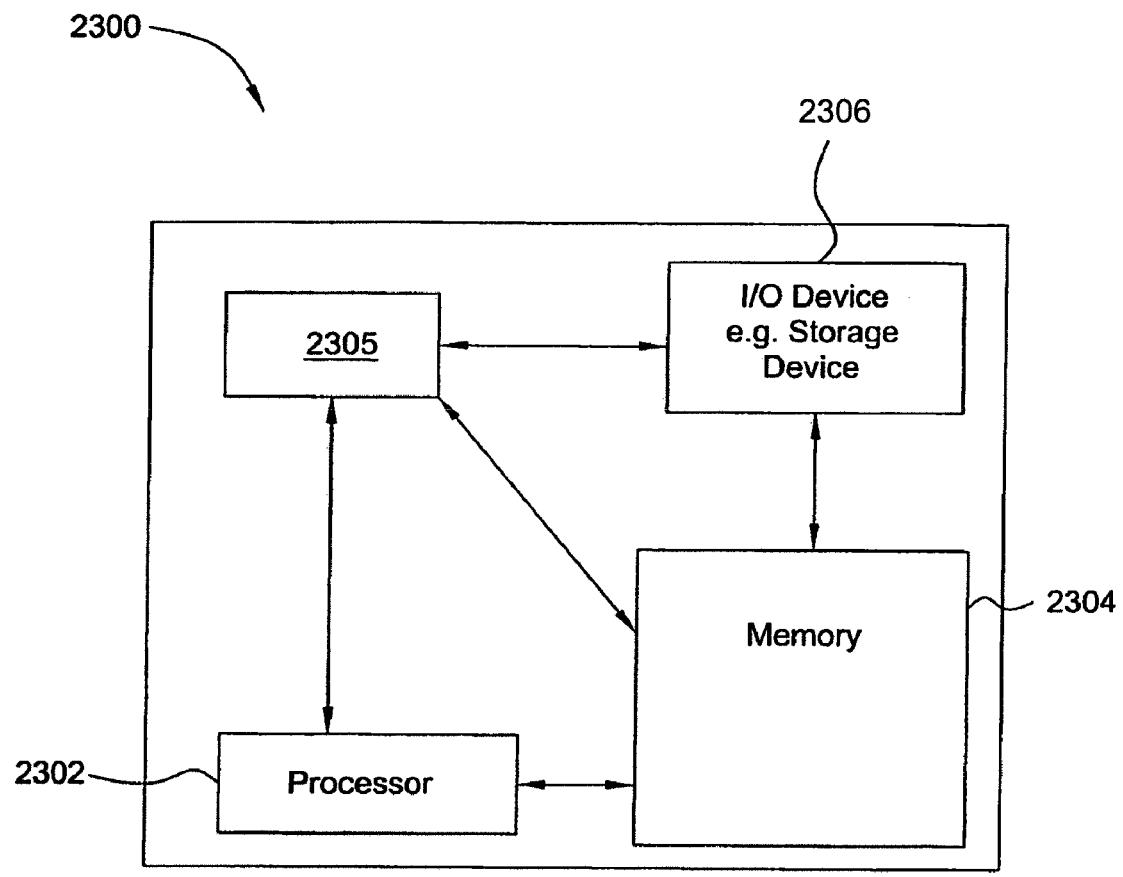
FIG. 23 is a high level block diagram of the present multimedia organization method that is implemented using a general purpose computing device.

FIG. 23 is a high level block diagram of the present multimedia organization method that is implemented using a general purpose computing device 2300. In one embodiment, a general purpose computing device 2300 comprises a processor 2302, a memory 2304, a multimedia organization module 2305 and various input/output (I/O) devices 2306 such as a display, a keyboard, a mouse, a modem, a network connection and the like. In one embodiment, at least one I/O device is a storage device (e.g., a disk drive, an optical disk drive, a floppy disk drive). It should be understood that the multimedia organization module 2305 can be implemented as a physical device or subsystem that is coupled to a processor through a communication channel.

Alternatively, the multimedia organization module 2305 can be represented by one or more software applications (or even a combination of software and hardware, e.g., using Application Specific Integrated Circuits (ASIC)), where the software is loaded from a storage medium (e.g., I/O devices 706) and operated by the processor 2302 in the memory 2304 of the general purpose computing device 2300. Additionally, the software may run in a distributed or partitioned fashion on two or more computing devices similar to the general purpose computing device 2300. Thus, in one embodiment, the multimedia organization module 2305 for storing, organizing, sharing and rating multimedia objects described herein with reference to the preceding figures can be stored on a computer readable medium or carrier (e.g., RAM, magnetic or optical drive or diskette, and the like).

J. Other Embodiments

Other embodiments are within the scope of the following claims.

What is claimed is:

1. A method for rating multimedia objects, the method comprising:

interactively defining a first semantic network, including a plurality of nodes and semantic links connecting the nodes, in response to user input indicating selection of a graphical symbol to represent one or more of the plurality of nodes, to the user input indicating selection of at least one multimedia object for attachment to the graphical symbol, and further in response to the user input indicating selection of one or more semantic links between the graphical symbol and at least a further graphical symbol;

receiving feedback regarding the first semantic network from at least one viewer of the first semantic network;

calculating a rating indicative of a value of the first semantic network in accordance with the received feedback; and using a processor-based circuit for generating computer-readable data representing a visual display of the first semantic network, the visual display including the graphical symbols and the indication of selection of one or more semantic links between the graphical symbols.

2. The method of claim 1, wherein the feedback comprises a scaled value.

3. The method of claim 2, wherein the calculating comprises:
calculating an average value in accordance with one or more scaled values received from one or more viewers of the first semantic network.

4. The method of claim 1, wherein the feedback comprises a hyperlink from a second semantic network to the first semantic network.

5. The method of claim 4, wherein the calculating comprises:
calculating a percentage of individuals within a given group who establish a hyperlink to the first semantic network.

6. The method of claim 1, wherein the received feedback used to calculate the rating is received from at least one member of a group associated with subject matter to which the first semantic network is at least partially concerned.

7. The method of claim 1, further comprising:
displaying the rating in a visible manner in the first semantic network.

8. The method of claim 7, wherein the displaying comprises visually modifying at least one of: a node in the first semantic network, a semantic link in the first semantic network, a hyperlink in the first semantic network, one or more fonts used in the first semantic network or one or more colors used in the first semantic network.

9. A computer-readable medium containing an executable program for rating multimedia objects, where when the program is executed by a processor, the processor is caused to perform the steps of:
interactively defining a first semantic network, including a plurality of nodes and semantic links connecting the nodes, in response to user input indicating selection of a graphical symbol to represent one or more of the plurality of nodes, to the user input indicating selection of a multimedia object for attachment to the selected graphical symbol, and to the user input indicating selection of one or more semantic links between the graphical symbol and at least a further graphical symbol;
receiving feedback regarding the first semantic network from at least one viewer of the first semantic network;
calculating a rating indicative of a value of the first semantic network in accordance with the received feedback; and
generating computer-readable data representing a visual display of the first semantic network, the visual display including the graphical symbol and the indication of selection of one or more semantic links between the graphical symbols.

10. The computer-readable medium of claim 9, wherein the feedback comprises a scaled value.

11. The computer-readable medium of claim 10, wherein the calculating comprises:
calculating an average value in accordance with one or more scaled values received from one or more viewers of the first semantic network.

12. The computer-readable medium of claim 9, wherein the feedback comprises a hyperlink from a second semantic network to the first semantic network.

13. The computer-readable medium of claim 12, wherein the calculating comprises:
calculating a percentage of individuals within a given group who establish a hyperlink to the first semantic network.

14. The computer-readable medium of claim 9, wherein the received feedback used to calculate the rating is received from at least one member of a group associated with subject matter to which the first semantic network is at least partially concerned.

15. The computer-readable medium of claim 9, further comprising:
displaying the rating in a visible manner in the first semantic network.

16. The computer-readable medium of claim 15, wherein the displaying comprises visually modifying at least one of: a node in the first semantic network, a semantic link in the first semantic network, a hyperlink in the first semantic network, one or more fonts used in the first semantic network or one or more colors used in the first semantic network.

17. A system for rating multimedia objects, the system comprising:
a first circuit for interactively defining a first semantic network, including a plurality of nodes and semantic links connecting the nodes, in response to a user selecting a graphical symbol to represent one or more of the plurality of nodes, to the user selecting a multimedia object for attachment thereto, and to the user input indicating selection of one or more semantic links between the graphical symbol and at least a further graphical symbol;
a second circuit for receiving feedback regarding the first semantic network from at least one viewer of the first semantic network; and
using a processor-based circuit for calculating a rating indicative of a value of the first semantic network in accordance with the received feedback and, in response thereto, generating computer-readable data for a visual display, including the graphical symbol, of at least one of the first and second semantic networks and the indication of selection of one or more semantic links between the graphical symbols.

18. A method for building a knowledge base, the method comprising:
selecting a first semantic network, the first semantic network comprising a first plurality of nodes connected by a first plurality of semantic links, in response to a user selecting a graphical symbol to represent one or more of the plurality of nodes, to the user selecting a multimedia object for attachment thereto, and to the user input indicating selection of one or more semantic links between the graphical symbol and at least a further graphical symbol;
selecting a second semantic network, the second semantic network comprising a second plurality of nodes connected by a second plurality of semantic links, at least one of the second plurality of nodes being attached to a multimedia object; and
using a processor-based circuit to link the first semantic network to the second semantic network and, in response thereto, generating computer-readable data for a visual display, including the graphical symbol, of at least one of the first and second semantic networks.

19. The method of claim 18, wherein the linking comprises:
attaching the second semantic network to at least one of the first plurality of nodes as a multimedia object.

20. The method of claim 18, wherein the linking comprises:
establishing a hyperlink to the second semantic network within the first semantic network.

* * * * *

UNITED STATES PATENT AND TRADEMARK OFFICE
CERTIFICATE OF CORRECTION

PATENT NO. : 7,711,689 B2 Page 1 of 1
APPLICATION NO. : 11/521116
DATED : May 4, 2010
INVENTOR(S) : Hong Suk Kim It is certified that error appears in the above-identified patent and that said Letters Patent is hereby corrected as shown below:

Col. 8, line 55: "users at 1600" should read --users at 1610--.

Signed and Sealed this

Twelfth Day of October, 2010

David J. Kappos
*Director of the United States Patent and Trademark Office*